(12) United States Patent
Chiskis et al.

(10) Patent No.: US 10,594,520 B2
(45) Date of Patent: Mar. 17, 2020

(54) SYSTEM AND METHOD UNIFYING LINEAR AND NONLINEAR PRECODING FOR TRANSCEIVING DATA

(71) Applicant: Sckipio Technologies S.I LTD, Ramat Gan (IL)

(72) Inventors: Alexander Chiskis, Tel Aviv (IL); Guy Reina, Givatayim (IL); Rami Verbin, Tel Aviv (IL)

(73) Assignee: Sckipio Technologies S.I LTD, Ramat Gan (IL)

( * ) Notice: Subject to any disclaimer, the term of this patent is extended or adjusted under 35 U.S.C. 154(b) by 0 days.

(21) Appl. No.: 16/474,463

(22) PCT Filed: Dec. 28, 2017

(86) PCT No.: PCT/IL2017/051402
§ 371 (c)(1),
(2) Date: Jun. 27, 2019

(87) PCT Pub. No.: WO2018/122855
PCT Pub. Date: Jul. 5, 2018

(65) Prior Publication Data
US 2019/0349224 A1 Nov. 14, 2019

Related U.S. Application Data

(60) Provisional application No. 62/610,751, filed on Dec. 27, 2017, provisional application No. 62/439,501, filed on Dec. 28, 2016.

(51) Int. Cl.
| | | |
|---|---|---|
| *H04L 25/03* | (2006.01) | |
| *H04B 1/04* | (2006.01) | |
| *H04B 3/32* | (2006.01) | |

(52) U.S. Cl.
CPC ..... *H04L 25/03343* (2013.01); *H04B 1/0475* (2013.01); *H04B 3/32* (2013.01)

(58) Field of Classification Search
CPC ......... H04L 25/03343; H04L 25/03898; H04L 25/03821; H04L 25/0391;
(Continued)

(56) References Cited

U.S. PATENT DOCUMENTS

| | | | |
|---|---|---|---|
| 6,879,639 B1 * | 4/2005 | Verbin | H04L 25/03343 375/285 |
| 7,200,180 B2 * | 4/2007 | Verbin | H04L 25/03057 375/261 |

(Continued)

FOREIGN PATENT DOCUMENTS

| | | |
|---|---|---|
| CN | 106060950 A | 10/2016 |
| WO | 2017118487 A1 | 7/2017 |

OTHER PUBLICATIONS

Examination Report dated Sep. 23, 2019 for Application No. GB1910648.3 (3 pages).

(Continued)

*Primary Examiner* — James M Perez
(74) *Attorney, Agent, or Firm* — Brown Rudnick LLP

(57) ABSTRACT

A method for precoding an information symbol conveying data for transmission between a plurality of transmitters and a plurality of receivers via a plurality of communication channels over a subcarrier frequency, the number of transmitters (N) is different than the number of active receivers (K) for that subcarrier frequency, the method comprising: receiving by said transmitters information pertaining to supportabilities of said receivers to decode non-linearly precoded data; determining a precoding scheme defining for which of said receivers said data to be transmitted by said transmitters shall be precoded using at least one of linear precoding and non-linear precoding, according to said supportabilities; constructing a signal by applying a reversible mapping to said information symbol, said reversible mapping includes elements each respectively associated with a particular one of said receivers, such that those said receivers supporting the decoding of said non-linearly precoded data are capable of reversing said reversible mapping to said information symbol, while for those said receivers not supporting the decoding of said non-linearly precoded data
(Continued)

said information symbol is unaffected by said reversible mapping; constructing a precoder characterized by N≠K such that said precoder is configured to perform regularized generalized inversion of a communication channel matrix.

20 Claims, 21 Drawing Sheets

(58) Field of Classification Search
CPC ........ H04L 2025/03426; H04B 1/0475; H04B 3/32; H04B 7/0452–0486; H04M 11/062; H04M 3/34
See application file for complete search history.

(56) References Cited

U.S. PATENT DOCUMENTS

| | | | | |
|---|---|---|---|---|
| 7,580,490 B2* | 8/2009 | Suh | H04L 25/0228 | 375/260 |
| 7,809,116 B2* | 10/2010 | Rhee | H04B 3/48 | 379/1.03 |
| 7,894,507 B2* | 2/2011 | Kent | H04L 25/0204 | 375/144 |
| 8,279,985 B2* | 10/2012 | Liu | H04L 1/0036 | 375/260 |
| 8,837,268 B2* | 9/2014 | Verbin | H04B 3/542 | 370/201 |
| 8,879,644 B2* | 11/2014 | Reuven | H04B 3/54 | 375/257 |
| 8,952,567 B2* | 2/2015 | Reuven | H04B 3/54 | 307/82 |
| 9,191,067 B2* | 11/2015 | Reuven | H04B 3/54 | |
| 9,425,929 B2* | 8/2016 | Ashikhmin | H04B 7/0452 | |
| 9,503,985 B2* | 11/2016 | Verbin | H04L 5/1469 | |
| 9,509,484 B2* | 11/2016 | Verbin | H04L 5/0007 | |
| 9,900,064 B2* | 2/2018 | Verbin | H04B 3/32 | |
| 9,906,353 B2* | 2/2018 | Verbin | H04L 5/0007 | |
| 9,985,686 B2* | 5/2018 | Maes | H04B 3/32 | |
| 10,057,024 B2* | 8/2018 | Verbin | H04L 5/1438 | |
| 10,164,691 B2* | 12/2018 | Verbin | H04B 3/32 | |
| 10,284,423 B2* | 5/2019 | Reina | H04L 1/0003 | |
| 10,355,990 B2* | 7/2019 | Sterenson | H04L 12/2892 | |
| 2003/0223505 A1* | 12/2003 | Verbin | H04L 25/03057 | 375/261 |
| 2009/0046568 A1* | 2/2009 | Xu | H04B 3/32 | 370/204 |
| 2010/0135374 A1* | 6/2010 | Kozek | H04M 3/304 | 375/227 |
| 2010/0254444 A1* | 10/2010 | Clausen | H04L 5/0042 | 375/220 |
| 2010/0303136 A1* | 12/2010 | Ashikhmin | H04B 3/32 | 375/222 |
| 2010/0315939 A1* | 12/2010 | Verbin | H04B 3/542 | 370/201 |
| 2010/0329444 A1* | 12/2010 | Ashikhmin | H04B 3/32 | 379/406.06 |
| 2011/0075834 A1* | 3/2011 | Ashikhmin | H04B 3/32 | 379/417 |
| 2011/0142111 A1* | 6/2011 | Sands | H04M 11/062 | 375/222 |
| 2012/0161543 A1* | 6/2012 | Reuven | H04B 3/54 | 307/104 |
| 2012/0163435 A1* | 6/2012 | Reuven | H04B 3/54 | 375/222 |
| 2012/0177132 A1* | 7/2012 | Reuven | H04B 3/54 | 375/257 |
| 2013/0156021 A1* | 6/2013 | Ashikhmin | H04L 25/03343 | 370/338 |
| 2014/0119536 A1* | 5/2014 | Strobel | H04B 3/32 | 379/406.01 |
| 2015/0071336 A1* | 3/2015 | Kerpez | H04B 3/32 | 375/227 |
| 2015/0244418 A1* | 8/2015 | Verbin | H04B 3/32 | 370/201 |
| 2015/0280892 A1* | 10/2015 | Verbin | H04L 5/0007 | 370/294 |
| 2015/0282144 A1* | 10/2015 | Tomeba | H04B 7/0456 | 370/329 |
| 2015/0295621 A1* | 10/2015 | Wang | H04B 3/32 | 370/201 |
| 2015/0326380 A1* | 11/2015 | Verbin | H04L 5/1438 | 370/252 |
| 2016/0043786 A1* | 2/2016 | Maes | H04B 3/32 | 375/260 |
| 2016/0119025 A1* | 4/2016 | Strobel | H04M 11/062 | 370/201 |
| 2016/0142255 A1* | 5/2016 | Reina | H04L 41/12 | 370/465 |
| 2016/0156383 A1* | 6/2016 | Nuzman | H04M 3/306 | 375/257 |
| 2016/0173682 A1* | 6/2016 | Lu | H04M 3/18 | 379/406.01 |
| 2016/0191117 A1* | 6/2016 | Vanderhaegen | H04B 3/32 | 370/201 |
| 2016/0286037 A1* | 9/2016 | Emad | H04M 3/34 | |
| 2017/0048035 A1* | 2/2017 | Verbin | H04L 5/1438 | |
| 2017/0054473 A1* | 2/2017 | Jochen | H04B 3/32 | |
| 2017/0070335 A1* | 3/2017 | Verbin | H04L 5/0007 | |
| 2017/0111270 A1* | 4/2017 | Sterenson | H04L 12/00 | |
| 2017/0279490 A1* | 9/2017 | Maes | H04B 3/32 | |
| 2018/0316386 A1* | 11/2018 | Verbin | H04B 3/32 | |
| 2019/0058502 A1* | 2/2019 | Tsiaflakis | H04B 3/32 | |
| 2019/0075202 A1* | 3/2019 | Nuzman | H04M 3/007 | |

OTHER PUBLICATIONS

Airy M. et al, "Practical Costa Precoding for the Multiple Antenna Broadcast Channel", IEEE Global Telecommunications Conference, 2004. GLOBECOM '04.
Ginis G. et al, "A Multi-user Precoding Scheme achieving Crosstalk Cancellation with Application to DSL Systems", Conference Paper in Circuits, Systems and Computers, 1977. Conference Record. 1977 11th Asilomar Conference on Dec. 2000.
Ginis G., "Vectored Transmission for Digital Subscriber Line Systems", IEEE Journal on Selected Areas in Communications, vol. 20, No. 5, Jun. 2002.
Hekrdla M. et al, "Ordered Tomlinson-Harashima Precoding in G.fast Downstream", IEEE Globecom, Selected Areas in Communications:Access Networks and Systems, Dec. 6-10, 2015.
Proakis, Salehi, John Proakis, Masoud Salehi—Digital Communications -5e- (2007)(Section 16.4).
Spencer QH et al, "An Introduction to the Multi-User MIMO Downlink", IEEE Communications Magazine, Oct. 2004.
Strobel R et al, "Zero-Forcing and MMSE Precoding for G.fast", 2015 IEEE Global Communications Conference (GLOBECOM), Dec. 6-10, 2015.
Strobel R et al, "Achievable Rates with Implementation Limitations for G.fast-based Hybrid Copper/Fiber Networks", IEEE International Conference on Communications (ICC), Jun. 8-12, 2015.
Windpassinger C, "Detection and Precoding for Multiple Input Multiple Output Channels", published by Friedrich-Alexander-Universität Erlangen-Nürnberg (FAU), 2004.
Yao W et al, "Improved MMSE Vector Precoding Based on the MBER Criterion", VTC Spring 2009—IEEE 69th Vehicular Technology Conference, Apr. 26-29, 2009.
Zhang R et al, "Expanded Constellation Mapping for Enhanced Far-End-Cross-Talk Cancellation in G.fast" IEEE Communications Letters, Aug. 11, 2016, pp. 56-59.

* cited by examiner

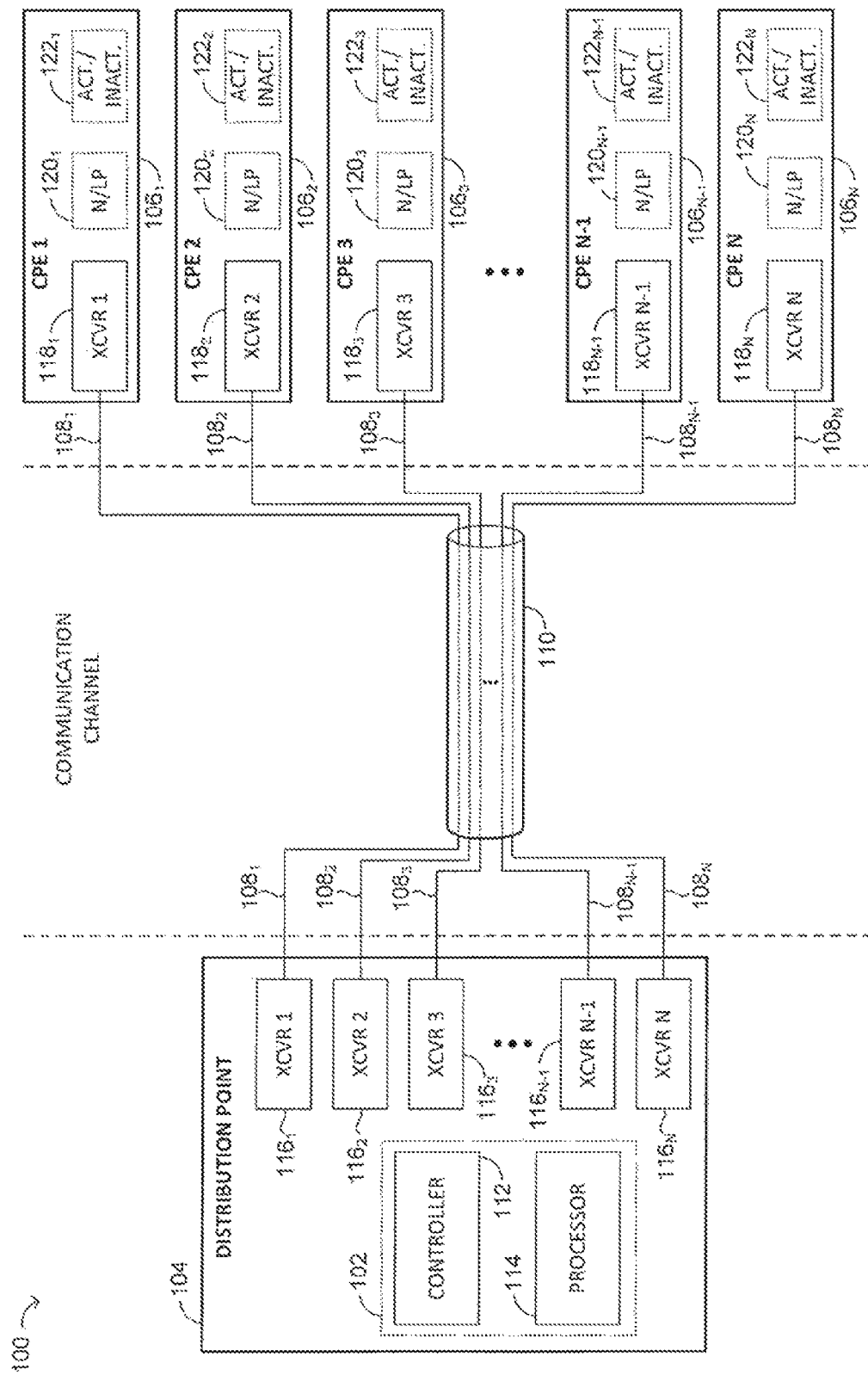

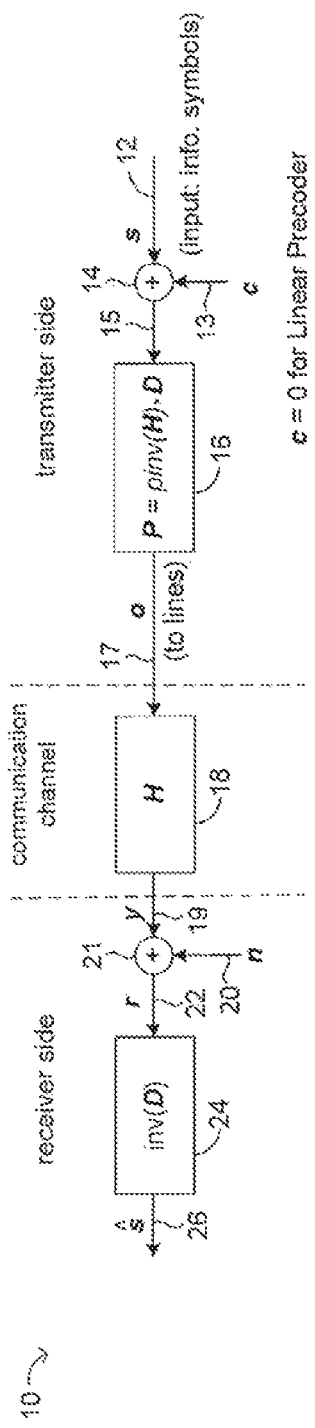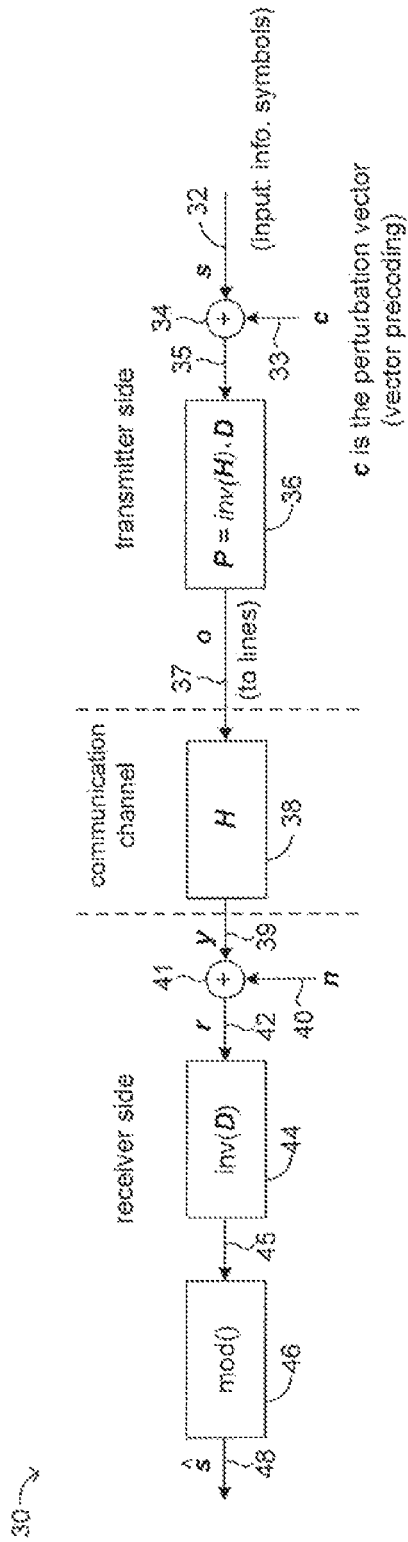
FIG. 2A (PRIOR ART)
FIG. 2B (PRIOR ART)

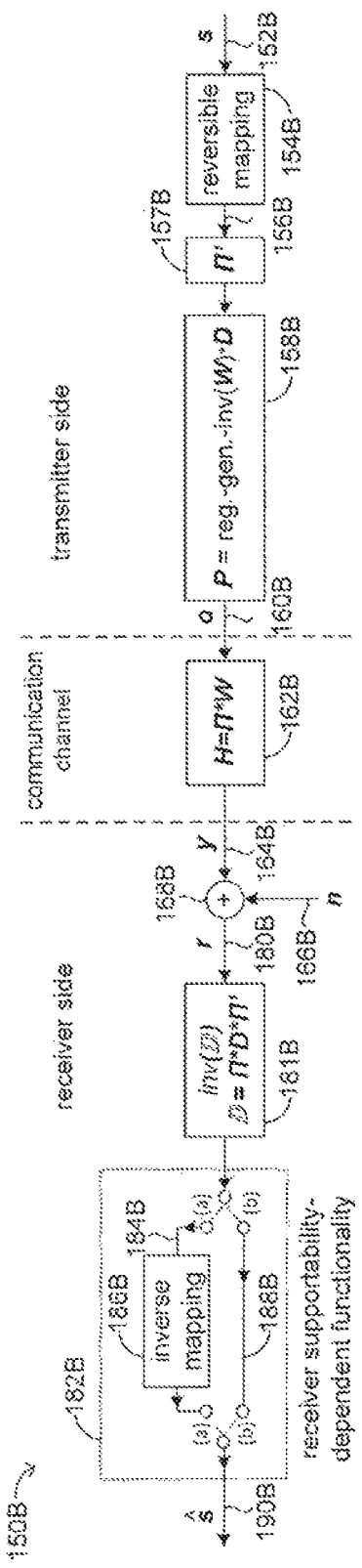
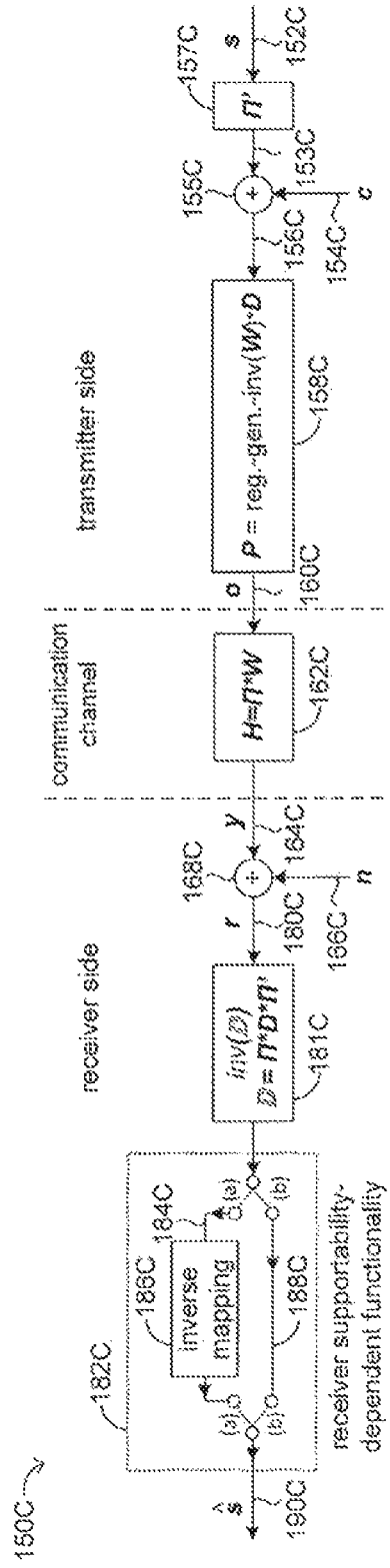

SYSTEM AND METHOD UNIFYING LINEAR AND NONLINEAR PRECODING FOR TRANSCEIVING DATA

FIELD OF THE DISCLOSED TECHNIQUE

The disclosed technique relates to communication systems and methods in general, and to a system and method for employing linear and nonlinear precoding, in particular.

BACKGROUND OF THE DISCLOSED TECHNIQUE

In multi-user communications where a centralized transmitter transmits data to a plurality of independent (e.g., non-cooperative) receivers (users), the transmitted data may be subject to inter-user noise, known as crosstalk, which interferes with the communication between different communication entities. Attaining an effective contrivance to eliminate or at least partially reduce crosstalk is therefore of high importance. Crosstalk may generally occur in both wireless and wire-line communications systems, that utilize linear precoding (LP) and nonlinear precoding (NLP) techniques, and particularly, in the Gigabit Internet "G.fast" wire-line standard.

Crosstalk cancellation techniques that employ precoding of data prior to its transmission are known in the art as "vectoring". Crosstalk cancellation typically requires taking into account of power restrictions, which often involve hardware-related considerations. Additionally, the number of bits is limited to predefined constellation sizes. The linear precoder may eliminate crosstalk in part or fully by using an inverse of a channel matrix. Linear precoding, however, may typically require equalization of gains introduced by the inversion operation (i.e., the gains must be suppressed to satisfy power restrictions, which in turn cause a diminished bitrate). The NLP schemes avoid this problem by use of Tomlinson-Harashima Precoding (THP) scheme working through the modulus operation or by seeking a perturbation vector associated with transmission symbols, thereby reducing power consumption. NLP schemes work seamlessly at the receiver after application of the modulus operation.

Systems and method that combine linear precoding and nonlinear precoding, in general, are known in the art. A World Intellectual Property Organization (WIPO) Patent Cooperation Treaty (PCT) International Publication Number WO 2014/054043 A1 to Verbin et al. to the same present Applicant, entitled "Hybrid Precoder" is directed to a hybrid precoder system and method employing linear precoding and nonlinear precoding to provide far-end crosstalk (FEXT) cancellation that enhances performance and lowers complexity during transmission and reception of data between transmitters and receivers of the communication system. The hybrid precoder system and method employs linear precoding and non-linear precoding for transmitting data between at least two transmitters and a plurality of receivers via a plurality of communication channels over a plurality of subcarrier frequencies. The at least two transmitters are communicatively coupled, respectively, with the plurality of receivers. The hybrid precoder system includes a linear precoder, a non-linear precoder, a controller, and an input selector. The linear precoder is for linearly precoding the data. The non-linear precoder is for non-linearly precoding the data. The controller is coupled with the linear precoder, and with the non-linear precoder. The input selector as well, is coupled with the linear precoder and with the non-linear precoder. The controller at least partly evaluates channel characteristics of at least part of the communication channels. The controller further determines a precoding scheme selection that defines for at least part of the communication channels, over which of the subcarrier frequencies the data to be transmitted shall be precoded using either one of linear precoding and non-linear precoding, according to determined channel characteristics. The input selector selects which of the linear precoded data and the non-linear precoded data is outputted by the hybrid precoder system, according to the precoding scheme selection.

U.S. Patent Application Publication No.: US 2017/0279490 A1 to Maes, entitled "Non-linear Precoding with a Mix of NLP Capable and NLP Non-capable Lines" is directed at a method for achieving crosstalk mitigation in the presence of nonlinear precoding (NLP) non-capable and NLP capable multiple customer premises equipment (CPE). Maes provides a particular solution to the general interoperability problem of using different precoding-capable CPE units where the number active CPE units, is equal to the total number of CPE units.

SUMMARY OF THE DISCLOSED TECHNIQUE

It is an object of the disclosed technique to provide a method for precoding an information symbol conveying data for transmission between a plurality of transmitters and a plurality of receivers via a plurality of communication channels over a subcarrier frequency, where the number of transmitters (N) is different than the number of active receivers (K) for that subcarrier frequency. The method includes the following steps. The method initiates with a step of receiving by the transmitters, information pertaining to supportabilities of the receivers to decode non-linearly precoded data. The method continues with a step of determining a precoding scheme defining for which of the receivers the data to be transmitted by the transmitters shall be precoded using at least one of linear precoding and non-linear precoding, according to the supportabilities. The method continues with a step of constructing a signal by applying a reversible mapping to the information symbol, where the reversible mapping includes elements each respectively associated with a particular one of the receivers, such that those receivers supporting the decoding of non-linearly precoded data are capable of reversing the reversible mapping to the information symbol, while for those receivers not supporting the decoding of non-linearly precoded data the information symbol is unaffected by the reversible mapping. The method continues with a step of constructing a precoder characterized by N≠K such that the precoder is configured to perform regularized generalized inversion of a communication channel matrix.

It is a further object of the disclosed technique to provide a hybrid precoder system for precoding an information symbol conveying data for transmission between a plurality of transmitters and a plurality of receivers via a plurality of communication channels over a subcarrier frequency, where the number of transmitters (N) is different than the number of active receivers (K) for that subcarrier frequency. The hybrid precoder system includes a controller and a processor (coupled therebetween). The controller is configured for receiving information pertaining to supportabilities of the receivers to decode non-linearly precoded data, and for determining a precoding scheme defining for which of the receivers the data to be transmitted by the transmitters shall be precoded using at least one of linear precoding and non-linear precoding, according to the supportabilities. The processor is configured for constructing a signal for transmission, according to the determined precoding scheme, by applying a reversible mapping to the information symbol, where the reversible mapping includes elements each respectively associated with a particular one of the receivers, such that those receivers supporting the decoding of non-linearly precoded data are capable of reversing the reversible mapping to the information symbol, while for those receivers not supporting the decoding of non-linearly precoded data the information symbol is unaffected by the reversible mapping. The processor is further configured for constructing a precoder characterized by $N \neq K$ such that the precoder is configured to perform regularized generalized inversion of a communication channel matrix.

It is a further object of the disclosed technique to provide a method for nonlinear precoding of an information symbol at a given precoder input. The information symbol is in a symbol space having a given symbol space size. The nonlinear precoding involves modulo arithmetic and having a plurality of inputs. The method includes the following steps. The method includes an initial step of determining a reference symbol space size which is common to all of the inputs. The method continues with the steps of determining a modulus value according to the reference symbol space size, adapting the given symbol space size according to the reference symbol space size, and nonlinearly precoding the information symbol according to the modulus value, common to all of the inputs.

It is a further object of the disclosed technique to provide a system for nonlinear precoding of an information symbol at a given precoder input, where the information symbol is in a symbol space having a given symbol space size. The nonlinear precoding involves modulo arithmetic and having a plurality of inputs. The system includes a controller and a processor (coupled therebetween). The controller is configured for determining a reference symbol space size that is common to all of the inputs, and for determining a modulus value according to the reference symbol space size. The processor is configured for adapting the given symbol space size according to the reference symbol space size, and for nonlinearly precoding the information symbol according to the modulus value, common to all of the inputs.

In is another object of the disclosed technique to provide a method for nonlinear precoding an information symbol conveying data for transmission between a plurality of transmitters and a plurality of receivers via a plurality of communication channels defining a channel matrix H over a particular subcarrier frequency. The method includes the steps of determining a weighting matrix G, whose number of rows is equal to the number of transmitters; then determining a modified channel matrix equal to HG; and constructing a nonlinear precoder for performing nonlinear precoding of the modified channel matrix.

It is a further object of the disclosed technique to provide a system for nonlinear precoding an information symbol conveying data for transmission between a plurality of transmitters and a plurality of receivers via a plurality of communication channels defining a channel matrix H over a particular subcarrier frequency. The system includes a processor configured for determining a weighting matrix G, whose number of rows is equal to the number of transmitters; for determining a modified channel matrix equal to HG; and for constructing a nonlinear precoder for performing nonlinear precoding of the modified channel matrix.

BRIEF DESCRIPTION OF THE DRAWINGS

The disclosed technique will be understood and appreciated more fully from the following detailed description taken in conjunction with the drawings in which:

FIG. 1 is a schematic diagram illustrating an overview of a communication system, showing a system of the disclosed technique, constructed and operative according to an embodiment of the disclosed technique;

FIG. 2A is schematic diagram illustrating a prior art zero-forcing (ZF) linear precoding scheme;

FIG. 2B is a schematic diagram illustrating a prior art ZF nonlinear vector precoding scheme;

FIG. 3B is a schematic diagram illustrating an overview of another general hybrid-interoperability precoding scheme including permutations supporting both linear and nonlinear precoding, constructed and operative according to the embodiment of the disclosed technique;

FIG. 3C is a schematic diagram illustrating an overview of a further general hybrid-interoperability precoding scheme including permutations supporting both linear and nonlinear vector precoding, constructed and operative according to the embodiment of the disclosed technique;

FIG. 23 is a schematic block diagram of a method for nonlinear precoding where the modulus size is constellation-independent, constructed and operative in accordance with the embodiment of FIG. 19 of the disclosed technique.

DETAILED DESCRIPTION OF PREFERRED EMBODIMENTS

Figure 2C:
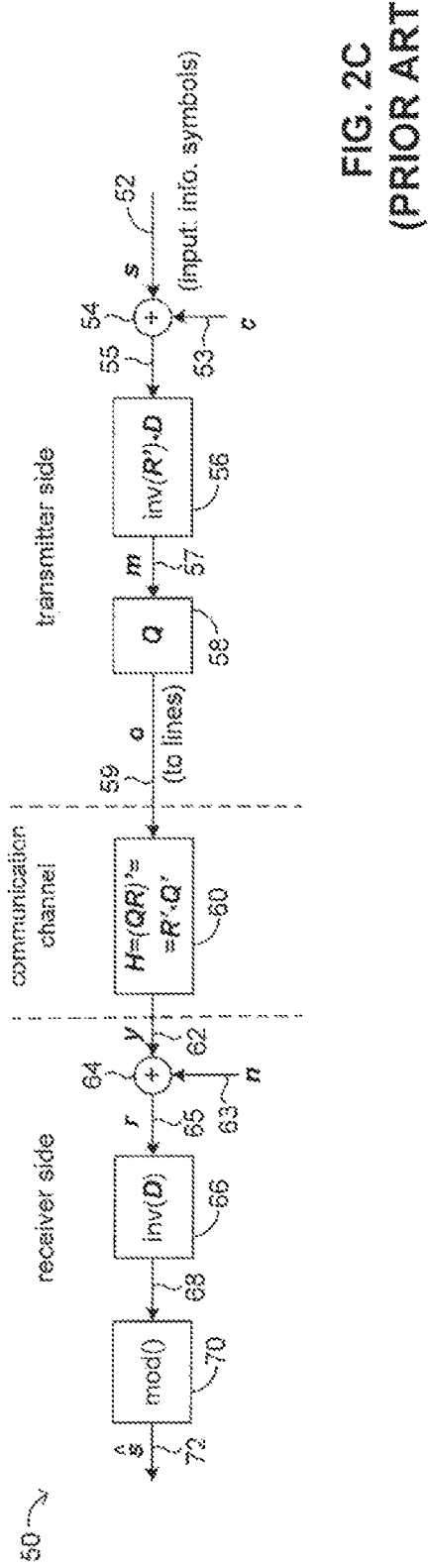
FIG. 2C is a schematic diagram illustrating a prior art QR nonlinear precoding scheme, generally referenced 50.

The disclosed technique overcomes the disadvantages of the prior art by proposing a general solution to the interoperability problem between a data providing entity communicatively coupled with multiple data subscriber entities in a communication network, where part of the data subscriber entities do not support nonlinear precoding (NLP) while another part does. The disclosed technique generally relates to multi-user multiple input multiple output (MIMO) communications systems in which there is a data provider side, typically embodied in the form of a data providing entity, such as a distribution point (DP) that is interconnected via a plurality of communication channels to a plurality of data subscriber entities (i.e., a data subscriber side), typically embodied in the form of multiple corresponding customer premises equipment (CPE) units. The terms "data provider side", "data provider", "transmitter side", "distribution point", and "distribution point unit" (DPU) used herein are interchangeable. The terms "data subscriber side", "data subscriber", "receiver side", "CPE", "CPE unit", and "CPE receiver unit" used herein are interchangeable. The disclosed technique proposes a system and a method configured and operative to unite or unify linear and nonlinear schemes, for a particular subcarrier frequency, at the data provider side, in such a way that enables interoperability in the use of nonlinear precoding for CPE units supporting nonlinear precoding and linear precoding for CPE units not supporting nonlinear precoding.

The system and method of the disclosed technique is configured and operative for precoding an information symbol conveying data for transmission between a plurality of transceivers at the data provider side (i.e., operating in the downstream (DS) direction as transmitters) and a plurality of transceivers at the data subscriber side (i.e., operating in the DS direction as receivers) via a plurality of communication channels over a subcarrier frequency (denoted herein interchangeably 'tone'). A symbol generally refers to a waveform, a signal, or a state of a communication medium (e.g., link, channel) that transpires over a particular time period (e.g., a time slot). A symbol typically encodes bits (i.e., "information symbol"). According to one (typical) implementation the communication channels are wire-lines (e.g., physical wire conductors such as twisted pairs). According to another implementation the communication channels are realized by the transmission and reception of signals (e.g., via antennas in wireless communication techniques) propagating through a wireless medium (e.g., air). The communication channels whether wired or wireless are susceptible to interference known as crosstalk between the communication channels, more specifically known as far-end crosstalk (FEXT). The communication channels may as be susceptible to near-end crosstalk (NEXT). Precoding is used for mitigating the effects of FEXT, while adaptive filtering may be used for mitigating the effects of NEXT.

The prior art teaches a specific solution, limited to a very special case where the number of transmitters at the transmitter side is equal to the number of active receivers at the receiver side at any particular subcarrier frequency. The disclosed technique offers a solution to the general case, where the number of transmitters is not necessarily equal to the number of active receivers at the receiver side at a particular subcarrier frequency. An 'active receiver' (e.g., an active CPE unit) is a receiver that (i) is switched on and is ready to receive data or in a process of receiving data; (ii) is switched on and is ready to receive data or in a process of receiving data at a particular subcarrier frequency (or plurality thereof) and not for other subcarrier frequencies (i.e., the receiver is 'active' at particular subcarrier frequencies and 'inactive' at other subcarrier frequencies) or (iii) is either one of (i) and (ii) stipulated by a decision rule determined by at least one criterion related to communication performance (e.g., max-mean rate, max-min rate, minimal bit loading value, etc). Examples for (ii) include situations where a particular active CPE unit is unable to receive information at high subcarrier frequencies due to a low signal-to-noise ratio (SNR), or due to the peculiarity of the communication channel or binder structure, etc. Thus, a CPE unit may be active at some subcarrier frequencies, and inactive at others. The system and method of the disclosed technique provide a general solution to the more difficult interoperability problem for the general case, where the number of transmitters (N) is not necessarily equal to the number of active receivers (K). The general solution also solves the special case where N is equal to K.

The following is a succinct summary of the system and method of the disclosed technique; the summary is followed by a comprehensive description. The system includes a controller and a processor implemented at the transmitter side (e.g., in the DPU). The controller is typically embodied in the form of, and interchangeably denoted herein, a 'vectoring control entity' (VCE). The processor is typically embodied in the form of, and interchangeably denoted herein, a 'vectoring processing entity' (VCE). The controller is configured and operative for receiving information pertaining to supportabilities of the receivers (i.e., CPE units) to decode nonlinearly precoded data. In general, a 'supportability' of a receiver defines whether that receiver supports the decoding of nonlinearly precoded data (and linear precoded data). It is assumed herein that if a particular receiver does not support the decoding of nonlinearly precoded data, then its default supportability is the capability to decode linearly precoded data. The controller is further configured and operative for determining a precoding scheme defining for which of the receivers (at the receiver side) the data to be transmitter by the transmitters (at the transmitter side) shall be precoded using at least one of linear precoding (LP) and nonlinear precoding (NLP) according to the supportabilities of the receivers.

The processor is configured and operative for constructing a signal for transmission, according to the determined precoding scheme, by applying a reversible mapping (i.e., a reversible transformation) to the information symbol. A reversible mapping is a function or algorithm that can be reversed (i.e., reversibility yields the operand that is, the object of the mapping operation). As will be described in greater detail hereinbelow, a reversible mapping can be realized by various entities and techniques. Several such techniques include use of modulo arithmetic, a use of a perturbation vector, use of transformations in a lattice reduction technique, and the like. The reversible mapping includes elements (e.g., represented by matrix elements) each respectively associated with a particular one of the receivers, whereby those receivers supporting the decoding of nonlinearly precoded data are capable of reversing the reversible mapping to the information symbol, while for those receivers not supporting the decoding of nonlinearly precoded data the information symbol is unaffected by the reversible mapping. The processor is then configured and operative to construct a precoder characterized by N≠K such that the precoder is configured to perform regularized generalized inversion of a communication channel matrix. The communication channel matrix (or simply "channel matrix") represents the channel information conveyed between transmitter side and receiver side. Regularized generalized inversion, which will be discussed in greater detail hereinbelow and used in the context of the disclosed technique, relates to a generalization of generalized inversion. Basically, generalized inversion of the channel matrix essentially involves finding a matrix that serves as an inverse of the channel matrix that is not necessarily invertible. An example of generalized inverse includes the Moore-Penrose pseudoinverse. Regularization of the generalized inverse, known herein as "regularized generalized inversion" involves use of the principles of regularization by introducing a regularization term to the mathematical expression representing the generalized inverse.

According to the disclosed technique there is thus provided a method for precoding an information symbol conveying data for transmission between a plurality of transmitters (i.e., defining a transmitter side) and a plurality of receivers (i.e., defining a receiver side) via a plurality of communication channels over a subcarrier frequency. The number of transmitters (N) is different than the number of active receivers (K) for that subcarrier frequency. The method includes the following steps including an initial step of receiving by the transmitter side (e.g., transmitters), information pertaining to supportabilities of the receivers to decode nonlinearly precoded data. The method proceeds with the step of determining a precoding scheme defining for which of the receivers the data to be transmitted by the transmitters shall be precoded using at least one of linear precoding and nonlinear preceding, according the supportabilities. The method proceeds with the step of constructing a signal by applying a reversible mapping to the information symbol. The reversible mapping includes elements each respectively associated with a particular one of the receivers, such that those receivers supporting the decoding of nonlinearly precoded data are capable of reversing the reversible mapping to the information symbol, whereas the information symbol is unaffected by the reversible mapping for those receivers not supporting the decoding of the nonlinearly precoded data. The method proceeds with the step of constructing a precoder characterized by N≠K such that the precoder is configured to perform regularized generalized inversion of a communication channel matrix. The method proceeds with the step of transmitting the signal by the transmitters.

At the receiver side, the CPE units are configured and operative to receive the signal from the transmitters. Both types of CPE units, namely, those supporting the decoding of linearly precoded data as well as those supporting the decoding of nonlinearly precoded data are configured and operative to perform equalization by multiplication of the received signal by a scalar (i.e., not necessarily the same scalar for each CPE unit). The CPE units supporting the decoding of nonlinearly precoded data are further configured and operative to reverse the reversible mapping (e.g., by applying modulo operation in accordance with the selected reversible mapping).

In other words, users who have hardware (e.g., DSL modems), software, firmware, and the like supporting nonlinear precoding (e.g., modulo arithmetic capable) may choose to use at least one of nonlinear precoding and linear precoding, whereas users who don't have hardware (software, firmware, etc.) supporting nonlinear precoding may still use linear precoding. A particular CPE unit whose supportability includes nonlinear precoding is not necessarily limited only to nonlinear precoding as that CPE unit may opt to employ linear precoding for the benefit of system performance, or alternatively, for the reduction of nonlinear precoder dimensionality (consequently reducing computational complexity).

Particularly, in the case of the system employing orthogonal frequency-division multiplexing (OFDM) for encoding data on multiple subcarriers, all users (corresponding to CPE units) may be divided into three groups at every tone: (1) a group of CPE unit(s) (user(s)) employing nonlinear precoding; (2) a group of CPE unit(s) employing linear precoding; and (3) a group of CPE unit(s) that are inactive (i.e., are not precoded at that particular tone and are thus excluded from the transmitted signal). There are also derivative logical groups, e.g., a group that is an intersection of groups (1) and (2), and the like. The communication channels (e.g., lines) of the inactive CPE unit(s), at a specific tone, are exploited to transmit information for the benefit of other CPE unit(s). The division of CPE unit(s) (user(s)) between these three groups may vary from tone to tone since the channel matrix and the signal-to-noise ratio (SNR) are usually frequency dependent. For the above mentioned group (2) of users which employ linear precoding, modulo arithmetic (e.g., the modulus operation) is not utilized (applied) at the receiver side (CPE units).

The ability to allocate CPE units that support nonlinear precoding among linear and nonlinear precoding schemes also improves system performance by diverting nonlinear precoding enabled CPE units exhibiting large power and coding gain losses (typically belonging to small bit constellations) to utilize linear precoding. In addition, this allocation enables part of the CPE units to process data via linear precoding, while enables the remaining (active) CPE units to utilize techniques of nonlinear precoding, such as vector precoding, which reduces the dimensionality of the search space for a perturbation vector (i.e., given that the complexity of such a search is known to lie between polynomial and exponential in dimension size). Consequently, the allocation of the CPE units into three groups for every tone (i) effectively facilitates attainment a solution of the interoperability problem between different CPE units, which either have or don't have nonlinear precoding supporting hardware, and (ii) serves as an instrument to achieve system performance optimization.

Where reversible mapping is implemented via use of modulo arithmetic, the disclosed technique also proposes an option of utilizing a constant modulus size for NLP, and particularly for Tomlinson-Harashima precoding (THP) schemes. This brings about a constant power requirement to be satisfied automatically, facilitating an increase in hardware efficiency involving execution of the modulus operation, as well as averts the need for different modulus values for different constellation sizes. The disclosed technique is implementable to any number of CPE units that may be split arbitrarily between NLP-supporting CPE units and CPE units not supporting NLP.

Notation: The notation used herein for the operation diag(A) applied to a matrix A yields a vector equal to its diagonal, and the operation diag(a) applied to a vector a yields a matrix with a diagonal a and all other non-diagonal elements are zeroes. The notation for the component-wise multiplication (also known as the Hadamard product) is a⊙b, which signifies that every component of the product, c, is constructed by multiplication of components a and b: $c_k = a_k b_k$. The Hermitian conjugation of a matrix R (i.e., matrix transpose and complex conjugation of every element) is denoted by $R^H$. The notation $R^{-H}$ is used herein to denote $(R^{-1})^H$. In the Figures and Detailed Description, the prime symbol, ', denotes the Hermitian conjugation: e.g., H' signifies a Hermitian conjugation of matrix H. The inverse of a diagonal matrix D is also a diagonal matrix given by simple inversion of the diagonal components: for G=inv(D), $$G_{ii} = \frac{1}{D_{ii}}$$

and all non-diagonal components being zero. Vectors and matrices are represented in bold-italics.

Without loss of generality, the disclosed technique will be described in the context of a wire-line communication system, though the principles of the disclosed technique likewise apply for wireless communication systems. Reference is now made to FIG. 1, which is a schematic diagram illustrating an overview of a communication system, generally referenced 100, showing a system of the disclosed technique, generally referenced 102, constructed and operative according to an embodiment of the disclosed technique. FIG. 1 shows a distribution point unit (DPU) 104 (also denoted herein interchangeably as "network side entity", and "distribution point" (DP)), communicatively coupled to at least one (typically a plurality of) customer premises equipment (CPE) unit(s) $106_1$, $106_2$, $106_3$, . . . , $106_{N-1}$, $106_N$ (also denoted herein interchangeably as a "node" or "nodes" in plural, where N≥1 is an integer) via a plurality of N communication lines (also denoted herein interchangeably as "communication channels") $108_1$, $108_2$, $108_3$, . . . , $108_{N-1}$, $108_N$ (typically and at least partially passing through a binder 110, in the wire-line case). DPU 104 includes a controller 112, a processor 114 embodying the system of the disclosed technique, generally referenced 102. DPU 104 further includes a plurality of N network-side fast transceiver unit (FTU-O) transceivers (XCVRs) $116_1$, $116_2$, $116_3$, . . . , $116_{N-1}$, $116_N$.

At the receiver side, each one of CPE units $106_1$, $106_2$, $106_3$, . . . , $106_{N-1}$, $106_N$ respectively includes a corresponding transceiver (XCVR), also denoted herein interchangeably as "remote-end fast transceiver unit" (FTU-R) $118_1$, $118_2$, $118_3$, . . . , $118_{N-1}$, $118_N$. Particularly, each transceiver (XCVR) $116_1$, $116_2$, $116_3$, . . . , $116_{N-1}$, $116_N$ at the network side is communicatively coupled with its respective CPE unit $106_1$, $106_2$, $106_3$, . . . , $106_{N-1}$. $106_N$ via its respective communication line $108_1$, $108_2$, $108_3$, . . . , $108_{N-1}$, $108_N$ (i.e., index-wise). Each remote-end fast transceiver unit is configured and operative to receive and to transmit data to-and-fro its respective FTU-O at the DPU 104. Specifically, each transceiver at the network side, i.e., FTU-O; (where i is an integer running index) is configured to be in communication with a corresponding transceiver at the receiver side, i.e., FTU-R.

The terms "communication channel", "communication line", "communication link" or simply "link" are interchangeable and are herein defined as a communication medium (e.g., physical conductors, air) (whether wired or wireless) configured and operative to communicatively couple between DPU 104 and CPE units $106_1$, $106_2$, $106_3$, . . . , $106_{N-1}$, $106_N$. The communications channels are configured and operative to be propagation media for signals (information symbols) for wireless as well as wire-line communication methods (e.g., xDSL, G.fast services). DPU 104 is typically embodied as a multiple-link enabled device (e.g., a multi-port device) having a capability of communicating with a plurality of nodes (e.g., CPE units). Alternatively, DPU 104 is a single-link device (not shown) having a capability of communicating with one node (e.g., a CPE unit). A transmission from DPU 104 to at least one of CPE units $106_1$, $106_2$, $106_3$, . . . , $106_{N-1}$, $106_N$ is defined herein as a downstream (DS) direction. Conversely, a transmission from at least one of CPE units $106_1$, $106_2$, $106_3$, . . . , $106_{N-1}$, $106_N$ to DPU 104 is defined herein as an upstream (US) direction.

Each one of CPE units $106_1$, $106_2$, $106_3$, . . . , $106_{N-1}$, $106_N$ is partly characterized by its respective inherent supportability $120_1$, $120_2$, $120_3$, . . . , $120_{N-1}$, $120_N$ to decode at least one type of precoded data, namely, linear precoded (LP) data, and nonlinear precoded (NLP) data (or both linear and nonlinear precoded data). It is assumed that if a particular CPE unit does not support the decoding of NLP data it supports by default the decoding of LP data. In a typical case, it is assumed that all CPE units possess supportability to decode LP data. The point is which of the CPE units further possess supportability to decode NLP data. The system and method of the disclosed technique are configured and operative to receive information pertaining to supportabilities $120_1$, $120_2$, $120_3$, . . . , $120_{N-1}$, $120_N$ to decode LP and especially NLP data (represented in FIG. 1 as "N/LP"). Information pertaining to the supportabilities of CPE units is typically acquired in an initialization process, in which initial communication parameters are determined between the DPU and the CPE units. Initialization typically involves a plurality of steps or phases, such as a handshake and discovery phase, a training phase, and a channel evaluation and analysis phase. The initialization phase, and specifically the handshaking and discovery phase, involves the CPE units communicating to DPU 104 information pertaining to their supported capabilities to decode nonlinear precoded data. For example, DPU 104 is configured and operative to send a message (request) to each of the CPE units to report their respective supportability. In response, the CPE units are configured and operative to reply in a return message, specifying information pertaining to their respective supportability (e.g., 'NLP supported'/'NLP not supported'). Once initialization has been completed communication system 100 enters a data exchange phase and in particular, when bearer data (e.g., payload data) is being transmitted, this is what is typically known as "showtime". Alternatively, information pertaining to the supportabilities of the CPE units is determined independently from the CPE units (e.g., in an initial setup of system 100, by controller 112 receiving information such as a lookup table of supportabilities, and the like).

DPU 104 (controller 112 thereof) is further configured and operative to continually determine activity levels $122_1$, $122_2$, $122_3$, . . . , $122_{N-1}$, $122_N$ (represented "ACT./INACT." in FIG. 1) of each of CPE units $106_1$, $106_2$, $106_3$, . . . , $106_{N-1}$, $106_N$. The activity level generally defines a current degree of operation or function of a CPE unit. An 'active receiver' (interchangeably denoted herein as an "active CPE unit") is a receiver that is switched on and ready to receive data or in a process of transceiving (i.e., receiving and/or transmitting) data per tone. An 'inactive receiver' (interchangeably denoted herein as an "inactive CPE unit") is a receiver that is not ready to receive data or otherwise unable to communicate with the network side (e.g., switched off, not functioning, malfunctioning, not initialized, not connected, etc.). The activity level will be discussed in greater detail hereinbelow in conjunction with FIGS. 14A and 14B. The maximum number of active receivers (K) is as the total number of CPE units (N) per tone. Typically, in the routine operative state of system 100, at any particular time, the number of active receivers may usually be less than the total number of CPE units (K<N) per tone.

Following the determination of the supportabilities (and activity levels) of the CPE units, the system and method of the disclosed technique are configured and operative to determine a precoding scheme defining for which of the CPE units the, data transmitted by the DPU shall be precoded using at least one of linear precoding and nonlinear precoding, according to the determined supportabilities (and activity levels). In other words, signals transmitted from transceivers $116_1$, $116_2$, $116_3$, . . . , $116_{N-1}$, $116_N$ of DPU 104 to respective transceivers $118_1$, $118_2$, $118_3$, . . . , $118_{N-1}$, $118_N$ of CPE units $106_1$, $106_2$, $106_3$, . . . , $106_{N-1}$, $106_N$ (respectively) have to take into account respective supportabilities $120_1$, $120_2$, $120_3$, . . . , $120_{N-1}$, $120_N$ and respective activity levels $122_1$, $122_2$, $122_3$, . . . , $122_{N-1}$, $122_N$. As will be described in greater detail hereinbelow, the precoding scheme defines how a transmitted signal by the DPU is precoded given the supportabilities and activity levels of the CPE units.

At this stage, for the purpose of highlighting the differences between the solution of the disclosed technique and known solutions of the prior art, reference is now further made to FIGS. 2A, 2B, and 2C. FIG. 2A is schematic diagram illustrating a prior art zero-forcing (ZF) linear precoding scheme, generally referenced 10. FIG. 2B is a schematic diagram illustrating a prior art ZF nonlinear vector precoding scheme, generally referenced 30. FIG. 2C is a schematic diagram illustrating a prior art QR nonlinear precoding scheme, generally referenced 50. FIGS. 2A, 2B, and 2C show a transmitter side, a communication channel (represented by block H), and a receiver side. The precoding scheme shown in FIGS. 2A, 2B, and 2C are described in the context of vector precoding that utilizes a perturbation vector, c.

With reference to linear precoding scheme 10 of FIG. 2A, at the transmitter side, information symbols denoted by a vector s, constitute an input 12 intended for precoding. All components of a perturbation vector 13, c, which are all zero for the linear precoding (LP) scheme, are added 14 with vector s (i.e., which remains the same) and inputted 15 into a linear precoder block 16. Hence, for LP a perturbation is not added, and c is equal to the zero vector. The linear precoder (linear precoder block 16) is denoted by P, which is given by: P=pinv(H)*D. The operator inv( ) denotes an inverse of a matrix (inscribed between parentheses), pinv( ) denotes a pseudoinverse of a matrix (inscribed between parentheses). LP block 16 applies a pseudoinverse operation to a channel matrix H and calculates a product with a diagonal matrix D. Diagonal matrix D is used to scale the precoding matrix. LP block 16 yields a signal or group of signals as precoded information symbols denoted by an output 17, o, which is then communicated via a communication channel 18 to a receiver side. Output 17 from the transmitter side, o, to the communication lines, may further be scaled by a scalar gain factor, α (not shown). Signals received at the receiver side denoted by a received vector 22, r, is a sum of a vector 19, y, and an additive noise vector 20, n, denoting that the preceded information symbols propagated through the communication channel includes additive 21 noise 20. Scaling at the receiver side is performed independently for every component by an inv(D) block 24, the result of which is an estimated output symbol 26, ŝ. No modulus operation is performed at the receiver side.

With reference to nonlinear precoding scheme 30 of FIG. 2B, a perturbation vector 33, c, is determined and added 34 to input information symbols 32 denoted by a vector s, constituting an input 35 intended for precoding. Perturbation vector c is a nonzero vector, which forms an essential part of a nonlinear precoder (NLP). Perturbation vector c is constructed as an (signed) integer (i.e., or for complex constellations it is a pair of two signed complex integers $i_1+j*i_2$ where j is the imaginary component) multiplied by a modulus component, having different values per component (as is common in the case when NLP is the Tomlinson-Harashima precoder (THP). A nonlinear precoder (NLP block 36), denoted by P is given by P=inv(H)*D. NLP block 36 applies an inverse operation to a channel matrix H and calculates a product with a diagonal matrix D. Diagonal matrix D is used to scale the preceding matrix and is predefined for THP. NLP block 36 yields a signal or group of signals as precoded information symbols denoted by an output 37, o, which then is communicated via a communication channel 38 to a receiver side. An output 37 to communication channel (e.g., the communication lines) is denoted by o representing the precoded symbols. Output vector o has N components: $o \in \mathbb{C}^{N \times 1}$ (where $\mathbb{C}$ denotes the complex field). The received vector 42, r, is the sum of a vector 39, y, and an additive noise vector 40, n, denoting that the precoded information symbols propagated through the communication channel includes additive 41 noise 40. Scaling at the receiver side is performed independently for every component by an inv(D) block 44, an output 45 of which is provided to a modulus operation block 46. The notation mod( ) denotes the modulo operation (also interchangeably denoted "modulus" operation) applied to an operand (inscribed between parentheses) per component (i.e., real and imaginary parts). The modulus operation, with its corresponding modulus value, is determined by the constellation (i.e., via simultaneous transmission of constellations of different sizes for different users for different moduli values). The output of modulus operation block 46 results in a estimated symbol 48, ŝ.

With reference to the nonlinear precoding scheme 50 of FIG. 2C, at the transmitter side, information symbols denoted by a vector s, constitute an input 52 intended for precoding. FIG. 2C illustrates a Tomlinson-Harashima precoder. All components of the perturbation vector 53, c, which are not all zero for the nonlinear precoding (NLP) scheme, are added 54 with vector s (i.e., which remains the same) and inputted 55 into a nonlinear precoder block 56. The nonlinear precoder (NLP block 56), denoted is given by inv(R')*D. NLP block 56 applies an inverse operation to a matrix R and calculates a product with a diagonal matrix D (i.e., D is the diagonal of a matrix $R^H$ (i.e., D=diag(diag $(R^H)$)). Diagonal matrix D is used to scale the precoding matrix and is predefined for THP. An output 57 of NLP block 56, m, is inputted to a block 58, Q (i.e., of the QR decomposition process) which yields a signal or group of signals as precoded information symbols denoted by an output 59, o=Q*inv($R^H$)*D, which in turn then is communicated via a communication channel 60 to a receiver side. An output 59 to communication channel (e.g., the communication lines) is denoted by o representing the precoded symbols.

The QR precoding scheme in FIG. 2C employs QR decomposition of a channel matrix H which symbolizes a communication channel (denoted by block 60), mathematically represented by H=(QR)'=R'*Q'. Matrix Q is an orthonormal matrix and R is an upper triangular matrix. A received vector 65,r, at the receiver side is the sum of a vector 62, y, and an additive noise vector 63, n, denoting that the precoded information symbols propagated through the communication channel includes additive 64 noise 63. Scaling is performed independently for every component by an inv(D) block 66, an output 68 of which is provided to a modulus operation block 70. The output of modulus operation block 70 results in a estimated output symbol 72, ŝ.

Figure 3A:
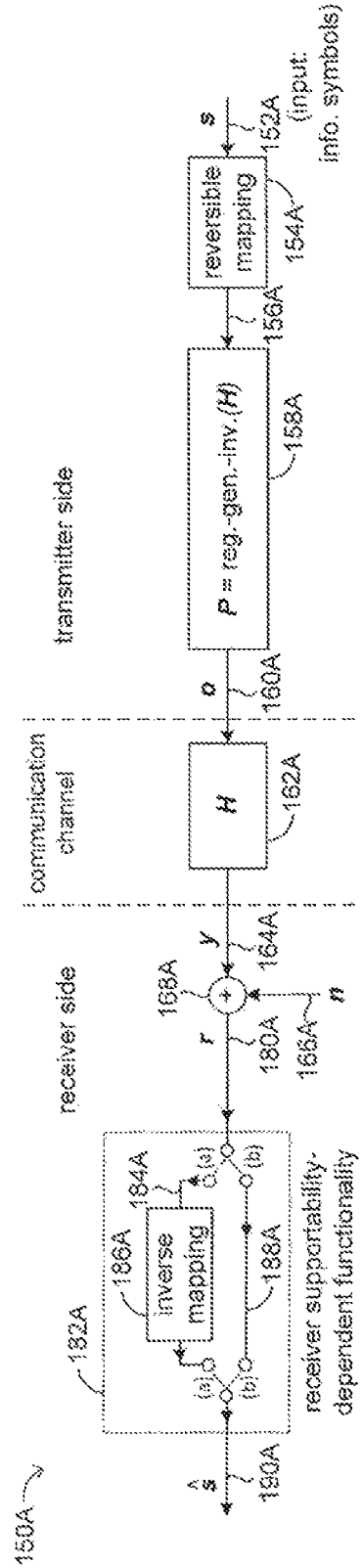
FIG. 3A is a schematic diagram illustrating an overview of a general hybrid-interoperability precoding scheme supporting both linear and nonlinear precoding, constructed and operative according to the embodiment of the disclosed technique.

In conjunction with FIG. 1, reference is now further made to FIGS. 3A, 3B, and 3C. FIG. 3A is a schematic diagram illustrating an overview of a general hybrid-interoperability precoding scheme supporting both linear and nonlinear precoding, generally referenced 150A, constructed and operative according to the embodiment of the disclosed technique. FIG. 3B is a schematic diagram illustrating an overview of another general hybrid-interoperability precoding scheme including permutations supporting both linear and nonlinear precoding, generally referenced 150B, constructed and operative according to the embodiment of the disclosed technique. FIG. 3C is a schematic diagram illustrating an overview of a further general hybrid-interoperability precoding scheme including permutations supporting both linear and nonlinear vector precoding, generally referenced 150C, constructed and operative according to the embodiment of the disclosed technique. FIGS. 3A, 3B, and 3C illustrate different implementations of hybrid-interoperability precoding constructed and operative in accordance with the principles disclosed technique. Similarly numbered reference numbers in FIGS. 3A, 3B, and 3C differentiated respectively by suffixes A, B and C represent similar (but not necessarily identical) entities. Since the different implementations shown in FIGS. 3A, 3B, and 3C are similar in some respects and dissimilar in others, for the purpose of simplifying the explanation of the principles and particulars of the disclosed technique reference is specifically made to general hybrid-interoperability precoding scheme 150A of FIG. 3A with further reference being made to FIGS. 3B and 3C pertaining to differences in implementation.

In hybrid-interoperability precoding scheme 150A information symbols (represented by vector s) are inputted to a reversible mapping block 154A. Reversible mapping block 154A is configured and operative to apply a reversible mapping to the information symbols. A reversible mapping (i.e., a reversible transformation) is defined as a function or algorithm that can be reversed so as to yield the operand that is, the object of the reversible mapping. For example, a reversible mapping is an association between two sets $S_1$ and $S_2$ in which to every element of $S_1$ there is an associated element in $S_2$, and to every element in $S_2$ there is the same associated element in $S_1$. Reversible mapping block 154A may be implemented by various techniques, such as dirty paper coding techniques of applying modulo operation to the information symbols, vector precoding by the use of a perturbation vector, lattice precoding techniques, and the like.

The reversible mapping includes elements, each of which is respectively associated with a particular one of receivers (CPE units) $106_1$, $106_2$, $106_3$, . . . , $106_{N-1}$, $106_N$. For example, a reversible mapping is represented by a vector of rank N: $W=\{w_1, w_2, w_3 \ldots w_{N-1} w_N\}$, where each i-th vector element, $w_i$, is associated with the i-th CPE unit (i.e., index-wise). An example of a simple reversible mapping is an offset function, where information symbol vector s is vector added (i.e., element-wise) with an offset function (vector), i.e.: s+W. For a NLP supporting CPE unit, its associated reversible mapping element (of the reversible mapping (vector)) is offset by a nonzero set value (e.g., an integer value). For example, for CPE unit $106_4$, its associated reversible mapping element $w_4 \neq 0$ equals the reversible offset integer. For a CPE unit not supporting NLP, its associated reversible mapping element is zero. For example, if CPE unit $106_5$ does not support NLP, its associated reversible mapping element $w_5=0$. In general, for those CPE units supporting NLP, their respectively associated (e.g., index-wise) reversible mapping elements (e.g., of a reversible mapping vector) are nonzero, while for those CPE units not supporting NLP, their respectively associated reversible mapping elements are zero.

According to one implementation, hybrid-interoperability precoding scheme 150A employs dirty paper coding techniques in which case the reversible mapping is an offset function typically represented by a vector whose integer elements are nonzero for those NLP-supporting CPE units, and zero for those CPE units not supporting NLP (as exemplified above). According to another implementation, hybrid-interoperability precoding scheme 150A employs vector precoding in which case the reversible mapping is a perturbation vector whose elements are nonzero (i.e., at least one vector element or component is nonzero) for those NLP-supporting CPE units, and zero for those CPE units not supporting NLP. According to yet another implementation, hybrid-interoperability precoding scheme 150A employs lattice techniques for precoding in which symbols are reversibly mapped to lattice points having known boundaries. According to this implementation, lattice precoding (or lattice dirty-paper coding) is employed. Generally, a lattice is a regular arrangement of a set of distanced-apart points (a discrete subgroup of $\mathbb{R}^n$ (n-dimensional field of rational numbers). A symbol constellation S is a subset of size $2^D$ of a D-dimensional lattice. Information symbols are reversibly mapped to the symbol constellation. Lattice precoding involves performing modulo reduction in relation to a precoding lattice $\Lambda_p$ into a fundamental (e.g., Voronoi) region $\mathcal{R}(\Lambda_p)$ of precoding lattice $\Lambda_p$ (practical for a finite number of points). The symbol constellation is an intersection of the lattice symbol space (e.g., $2\mathbb{Z}^2$, where D=2) and $\mathcal{R}$ of precoding lattice $\Lambda_p$, namely $\mathcal{R}(\Lambda_p)$. (A Voronoi region of a lattice is a region having a Voronoi site, where all points are distanced closer to the Voronoi site than to another Voronoi site in the lattice.) The symbol constellation is extended in a periodic manner via addition (or other reversible mapping or transformation) as: $V=S+\Lambda_p=\{s+d|s\in S \cap \mathcal{R}(\Lambda_p), d\in\Lambda_p\}$, where each point $v\in V$ is equivalent modulo $\Lambda_p$. Thus, symbols propagating via the communication channel ("channel symbols") from transmitter side to receiver side consequently fall within $\mathcal{R}(\Lambda_p)$. At the receiver side NLP supporting CPE units reverse the reversible mapping by reducing the received signal to the region $\mathcal{R}$ via the modulo operation: $\mathrm{mod}(\Lambda_p)$. Generally, reversible mapping block 154A is configured and operative to apply a reversible mapping to input information symbols 154A as described, and to output a result 156A to a precoding matrix block 158A, P.

Precoding matrix block 158A, P, is configured and operative to perform regularized generalized inversion (hereby denoted "reg.-gen.-inv.") of a channel matrix H. Regularized generalized inversion is a generalization of general inversion, which in turn is a generalization of inversion. Inversion of a matrix or "matrix inversion" of an invertible matrix A is a procedure of finding a matrix B such that AB=I, where I represents the n×n identity matrix. In the simplest (and less typical) case where the number of transmitters (N) is equal to the number of active receivers (K) (i.e., N=K) the precoding matrix 158A is reduced to a conventional inverse of the channel matrix. At any point in time, however, there is no assurance that the number of active receivers (users) would be equal to the total number of transmitters. This case can be encapsulated by N≠K. In this case (N≠K) channel matrix H is noninvertible by conventional inversion, as non-square matrices (i.e., m×n, where m≠n) don't have a conventional inverse. (Conventional matrix inversion is limited to regular (non-generate square n×n, and non-singular) matrices.)

Generalized inversion of the channel matrix H essentially involves finding a matrix that serves as an inverse of the channel matrix that is not necessarily invertible. An example of a generalized inverse is generally given by:

$$P=A^H(HA^H)^{-1} \quad (1A),$$

where $H\in\mathbb{C}^{K\times N}$ and $A\in\mathbb{C}^{K\times N}$. In the case for channel matrix H where: A=H an example of generalized inverse can be a pseudoinverse (notation: pinv(H)), such as the Moore-Penrose pseudoinverse given by:

$$P=H^H(HH^H)^{-1} \quad (1B),$$

employed when the total number of active receivers (users), K, is less than (also viable when equal to) the total number of transmitters N: K≤N where $H\in\mathbb{C}^{K\times N}$. This case is reduced to the simple case when K=N thus we obtain pinv(H)=inv(H), i.e., the pseudoinverse is a conventional ("simple") inverse of channel matrix H. It is noted that for the case K≤N, the construction of the pseudoinverse is not unique. For example, given $$H = \begin{pmatrix} 1 & 1 & 1 \\ 0 & 0 & 1 \end{pmatrix}$$

there may be found matrices $$P_A = \begin{pmatrix} 0.5 & -0.5 \\ 0.5 & -0.5 \\ 0 & 1 \end{pmatrix} \text{ and } P_B = \begin{pmatrix} 1 & -2 \\ 0 & 1 \\ 0 & 1 \end{pmatrix}$$

such that $$HP_A = HP_B = \begin{pmatrix} 1 & 0 \\ 0 & 1 \end{pmatrix}.$$

It is emphasized that the disclosed technique is not restricted to the specific pseudoinverse or to the method of pseudoinverse construction. In general, one may observe that for the case K≤N there may be an infinite number of pseudoinverses satisfying the relation HP=I, where $H\in\mathbb{C}^{K\times N}$, $P\in\mathbb{C}^{N\times K}$ and I is the identity matrix (K×K). To demonstrate this let: $P=A^H(HA^H)^{-1}$, where $H\in\mathbb{C}^{K\times N}$ and $A\in\mathbb{C}^{K\times N}$. A is an arbitrary matrix such that the matrix $(HA^H)$ whose dimension is K×K is invertible. Invertibility implies:

$$HP=HA^H(HA^H)^{-1}=I \quad (2).$$

It may be seen that an arbitrary matrix A is a generality of a matched filter (for the Moore-Penrose pseudoinverse A=H) while the term $HA^H$ is a generality of a correlator (for the Moore-Penrose pseudoinverse this term is $HH^H$), and consequently the term $(HA^H)^{-1}$ is a generality of a de-correlator. Since there are an infinite number of possible matrices $A\in\mathbb{C}^{K\times N}$, there may be an infinite number of generalized inverses. For the case of K=N the relation of generalized inverse reduces to the conventional inverse matrix: $A^H(HA^H)^{-1}=A^H(A^H)^{-1}(H)^{-1}=H^{-1}$. Returning to the above-presented purely illustrative example, for $$H = \begin{pmatrix} 1 & 1 & 1 \\ 0 & 0 & 1 \end{pmatrix},$$

we obtain $P_A$ by taking $$A = \begin{pmatrix} 1 & 1 & 1 \\ 0 & 0 & 1 \end{pmatrix},$$

which leads to a particular case of the Moore-Penrose pseudoinverse, and we obtain $P_B$ by taking $$A = \begin{pmatrix} 1 & 1 & 1 \\ 0 & 1 & 1 \end{pmatrix}.$$

Regularization of the generalized inverse, known herein as "regularized generalized inversion" involves use of the principles of regularization by introducing a regularization term to the mathematical expression representing the generalized inverse. A regularized generalized inverse is generally given by:

$$P = A^H(HA^H + \beta 1)^{-1} \quad (3A),$$

where the scalar $\beta \geq 0$ is the regularization factor, and 1 is the regularization term (in this case, the identity matrix, also interchangeably denoted herein I). A typically employed regularized generalized pseudoinverse of the disclosed technique, for A=H is given by:

$$P = H^H(HH^H + \beta 1)^{-1} \quad (3B),$$

The regularization factor controls the impact of the regularization term, and can be selected to optimize (e.g., maximize) the signal-to-interference-plus-noise ratio (SINR) at the receiver side. Note that the case where $\beta = 0$ reduces equation (3) into the Moore-Penrose pseudoinverse of equation (1B). In an analogous manner regarding the selection of the pseudoinverse, the disclosed technique is likewise not limited to a particular regularized generalized inverse. Precoding matrix block 158A is configured and operative to perform precoding in the sense of the disclosed technique, i.e., regularized generalized inversion of the channel matrix according to equation (3B) and to produce an output 160A, denoted by output vector o representing precoded symbols, thenceforward communicated via communication channel 162A to the receiver side.

At the receiver side, a received vector 180A, r, is the sum of a vector 164A, y, and an additive noise vector 166A, n, denoting that the precoded information symbols propagated through the communication channel include additive 168A noise 166A. For each one of CPE units $106_1$, $106_2$, $106_3$, ..., $106_{N-1}$, $106_N$ (FIG. 1) received vector 180A (FIG. 3A) can follow one of two different paths: 184A ("a") or 188A ("b"), according to its respective supportability $120_1$, $120_2$, $120_3$, ..., $120_{N-1}$, $120_N$. Specifically, for a CPE unit supporting the decoding of NLP data, received vector 180A follows path 184A and enters an inverse mapping block 186A, otherwise (i.e., CPE unit not supporting the decoding of NLP data) received vector follows path 188; this is illustratively shown by a receiver supportability-dependent pseudo-block 182A (i.e., not a true operational block).

Inverse mapping block 186A is configured and operative to "reverse" the reversible mapping applied at the transmitter side by reversible mapping block 154A. For example, for a reversible mapping that is a function, the inverse mapping is a corresponding inverse function. If hybrid-interoperability precoding scheme 150A employs dirty paper coding and vector precoding techniques, inverse mapping block 186 is typically embodied as a modulo operation block (e.g., a modulus operation applied to an operand (e.g., an integer offset)). In the case hybrid-interoperability precoding scheme 150A employs lattice techniques it is as aforementioned.

For a CPE unit supporting the decoding of NLP data, the output of inverse mapping block 186A (following path 184A ("a")) results in an estimated output symbol 190A, ŝ. For a CPE unit not supporting the decoding of NLP data, received vector 180A follows path 188A ("b") the output of which is an estimated output symbol 190A, ŝ.

With reference now to hybrid-interoperability precoding scheme 150B of FIG. 3B, information symbols 152B are inputted to a reversible mapping block 154B, which is the same as 154A of FIG. 3A. Reversible mapping block 154B is configured and operative to apply a reversible mapping to input information symbols 154B and to output a result 156B to a permutation block 157B, which in turn is configured and operative to permute information symbol elements in vector s according to a permutation matrix Π'. Vector s includes vector elements each of which is associated with a particular CPE unit. The permutation introduces additional degrees of freedom which facilitates the optimization of performance. A particular example permutation that will be hereinafter discussed in greater detail in conjunction with FIGS. 6 and 7 involves grouping information symbol elements associated with different CPE units according to their respective supportability such to form two successive aggregate groups. Alternatively, arbitrary permutations of information symbol elements are also viable.

Precoding matrix block 158B, P, is configured and operative to perform regularized generalized inversion of a permuted channel matrix $W = \Pi^T H$, where $\Pi^T$ represents the transpose of permutation matrix Π and H represents the channel matrix (in accordance with the principles of equations (3A) and (3B)). The precoding matrix is denoted by P=reg.-gen.-inv(W)D, where D represents a scaling matrix that depends on the permutation used. Precoding matrix block 158B is configured and operative to perform precoding thereby producing an output 160B that is communicated via a communication channel 162B that is represented by a block 162B and given by H=ΠW, to the receiver side.

At the receiver side, a received signal 180B, represented by a vector, r, is a sum of a vector 164B, y, and an additive 168B noise vector 166B, n (respectively similar to 180A, 164A, and 166A of FIG. 3A). Received signal 180B is inputted to a block 181B configured and operative to perform scaling by inverting the permuted diagonal vector $\mathbb{D}$, (i.e., inv($\mathbb{D}$)) where) $\mathbb{D} = \Pi D \Pi^T$ and to output a signal to a receiver supportability-dependent pseudo-block 182B (whose operation is identical to 182A). Two paths 184B ("a") or 188B ("b"), including inverse mapping block 186B are respectively identical with paths 184A, 188A and inverse mapping block 186A (of FIG. 3A). Receiver supportability-dependent pseudo-block 182B outputs an estimated output symbol 190B, ŝ.

In an alternative optional implementation to hybrid-interoperability precoding scheme 150B, reversible mapping block 154B and permutation block 157B are in reversed order (i.e., information symbols 152 are inputted first to permutation block 157B an output of which is provided to reversible mapping block 154B) (not shown).

According to a different implementation, with reference being made to hybrid-interoperability precoding scheme 150C of FIG. 3C, information symbols 152C are inputted to a permutation block 157C configured and operative to permute information symbol elements in vector s according to a permutation matrix $\Pi^T$ and to output permuted information symbols 153C. Vector s includes vector elements each of which is associated with a particular CPE unit. An adder 155C is configured and operative to combine a vector of permuted information symbols 153C with a perturbation vector 154C, denoted by c, an output 156C of which is inputted to a preceding block 158C. Perturbation vector 154C constitutes as a reversible mapping in the nonlinear vector precoding scheme of FIG. 3C. The reversible mapping, in this case implemented by a perturbation vector c includes vector elements each respectively associated with a particular one of the receivers, such that those receivers supporting the decoding of nonlinearly precoded data are configured to apply an inverse mapping to the reversible mapping, whereas for i-th vector elements of c associated with receivers not supporting the decoding of nonlinearly precoded data information symbol are unaffected by the reversible mapping (i.e., $c_i$=0).

The following operational blocks and procedures of general hybrid-interoperability preceding scheme 150C in FIG. 3C are substantially similar to those respectively in general hybrid-interoperability preceding scheme 150B in FIG. 3B. Precoding matrix block 158C, P, is configured and operative to perform regularized generalized inversion of a permuted channel matrix W=Π$^T$H, where Π$^T$ represents the transpose of permutation matrix Π and H represents the channel matrix (in accordance with the principles of equations (3A) and (3B)). The precoding matrix is given by P=reg.-gen.-inv(W) D, where D represents a scaling matrix that depends on the permutation used. Precoding matrix block 158C is configured and operative to perform precoding thereby producing an output 160C that is communicated via a communication channel 162B that is represented by a block 162C and given by H=ΠW, to the receiver side.

At the receiver side, a received signal 180C, represented by a vector, r, is a sum of a vector 164C, y, and an additive 168C noise vector 166C, n (respectively similar to 180B, 164B, and 166B of FIG. 3B). Received signal 180C is inputted to a block 181C configured and operative to perform scaling by inverting the permuted diagonal vector $\mathbb{D}$, i.e., inv($\mathbb{D}$)) where $\mathbb{D}$=ΠNΠ$^T$) to output a signal to a receiver supportability-dependent pseudo-block 182C (whose operation is identical to 182B). Two paths 184C ("a") or 188C ("b"), including inverse mapping block 186C are respectively identical with paths 184B, 188B and inverse mapping block 186B (of FIG. 3B). Receiver supportability-dependent pseudo-block 182C outputs an estimated output symbol 190C, ŝ.

Figure 4:
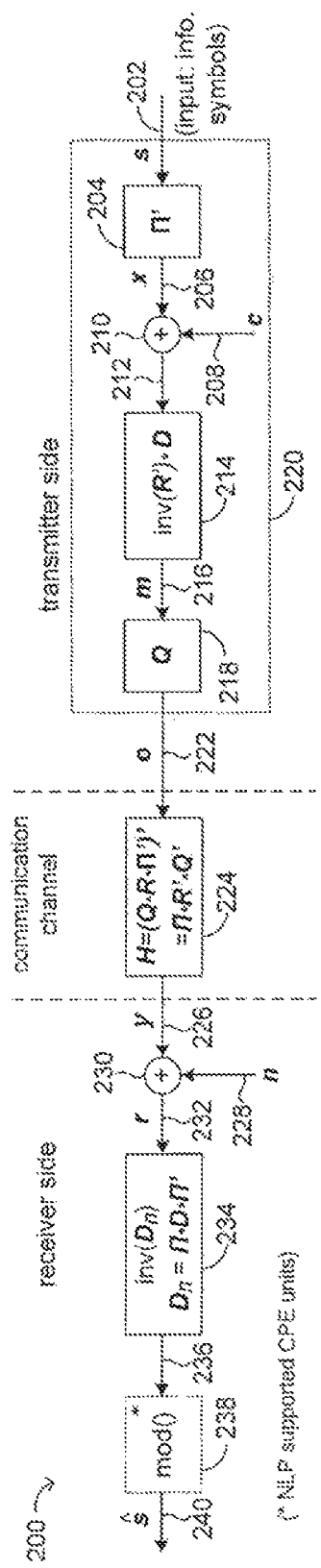
FIG. 4 is a schematic diagram illustrating an example of a specific implementation of the general hybrid-interoperability precoding scheme, utilizing a QR nonlinear precoder and permutations, configured and operative in accordance with the disclosed technique.
Figure 5:
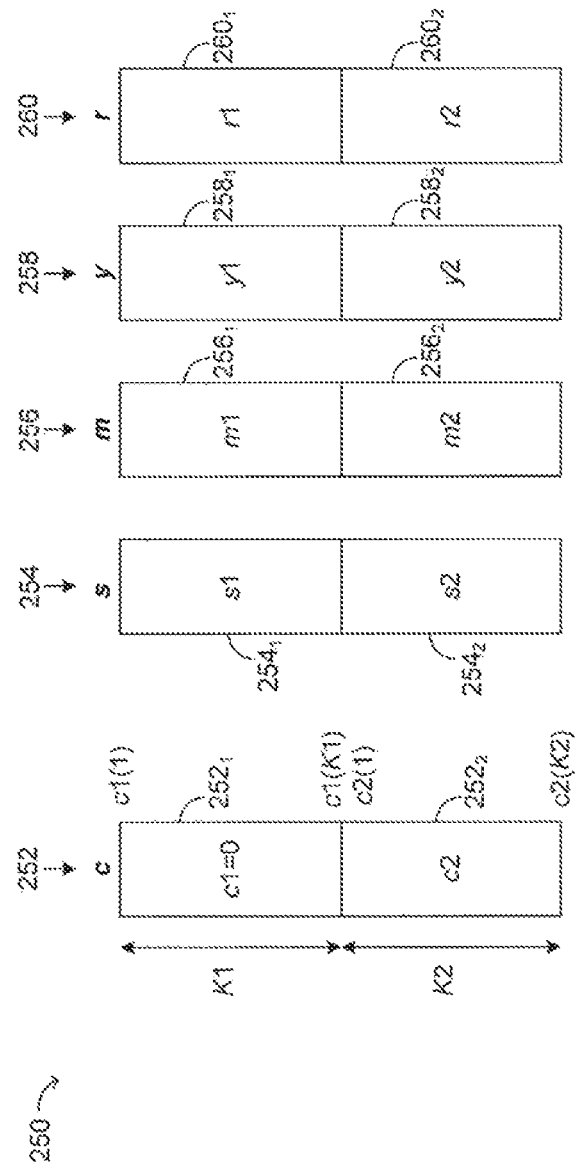
FIG. 5 is a schematic diagram illustrating a partition of vector variables into two groups, one group associated with linear precoding (LP) and the other group associated with nonlinear precoding (NLP)

To explicate the particulars of the disclosed technique in greater detail, an example of a specific implementation will now be described. Reference is now made to FIGS. 4 and 5. FIG. 4 is a schematic diagram illustrating an example of a specific implementation of the general hybrid-interoperability precoding scheme, utilizing a QR nonlinear precoder and permutations, generally referenced 200. FIG. 5 is a schematic illustration of a partition of vector variables into two groups, linear precoding (LP) and nonlinear precoding (NLP), generally referenced 250. The example specific implementation of the disclosed technique involves dividing users (CPE units) into two groups at every frequency tone (given, without loss of generality the use of orthogonal frequency-division multiplexing (OFDM) transmission or flat fading environment): those which use LP (linear precoder) and those which use NLP (nonlinear precoder). We herein denote information symbols for these groups $s_1$ and $s_2$, respectively. The following description discusses the disclosed technique in the context of one particular subcarrier frequency (interchangeably herein "frequency tone" or simply "tone"). Generally, the partition of users into different groups (linear and nonlinear) may differ at different frequency tones (e.g., in consideration with performance optimization issues). It is emphasized that the general precoding scheme according to the disclosed technique involving NLP supporting CPE units and NLP non-supporting CPE units, does not necessitate any specific ordering of the CPE units (e.g., general hybrid-interoperability precoding scheme 150A, FIG. 3A).

As an example to the dynamic nature of this division, users with relatively small constellation sizes are assigned to a first group (e.g., 1 or 2 bits) employing LP, while remaining users of relatively larger constellation sizes are assigned to a second group employing NLP. Alternatively, constellations are not assigned for those users having a low signal-to-noise ratio (SNR) thus not allowing the loading of constellations of larger size than the predetermined value (e.g., the bit loading is less than one bit). This state effectively corresponds to the case where K≤N. The precoder employed in this case is determined according to the regularized generalized inverse of the channel matrix (utilizing communication channels of inactive CPE units at a specific tone). Noteworthy also in this case is the analogous wireless implementation where the number of transmitting antennas is greater than the number of receiving antennas.

The dynamic division of users into groups involves allocating: group 1 for users employing LP and having no supportability for inverse mapping (e.g., modulo operation capable) functionality (e.g., hardware, software, firmware) or having such functionality but preferably using linear precoding due to optimization issues; and group 2 for users employing NLP having supportability for inverse mapping functionality. This dynamic division merges system optimization (i.e., according to different criteria, such as, max-mean rate, max-min rate, etc.) with resolution of the interoperability issues. This issue is elaborated further hereinbelow. In the description that follows, the operation per frequency tone is described, assuming principles of an OFDM system.

With reference to FIG. 4, implementation of general hybrid-interoperability precoding scheme 200 initiates by information symbols 202, s, being inputted into a permutation block 204, which is configured and operative to permute information symbol elements in vector s, according to a permutation matrix Π'. Each information symbol element in vector s is associated with a particular CPE unit. The permutation takes into consideration the division of CPE units into two groups (those that employ LP and those that employ NLP). In its general form, the permutation arbitrarily intermixes between information symbol elements. Alternatively, permutation block 204 permutes the information symbol elements into two successive aggregate groups, namely, a first aggregate group of symbol elements $s_1$ successively followed by a second aggregate group of symbol elements $s_2$. These information symbols are described in terms of a complex vector per user, represented as:

$$s=[s_1^T,s_2^T]^T, \text{ where } s_1 \in C^{K_1 \times 1}, s_2 \in C^{K_2 \times 1}, K_1+K_2=K \qquad (4).$$

With further reference to FIG. 5, which shows different vector variables (shown also in FIG. 4), whose vector elements are partitioned into two distinct and separate aggregate groups, where each group is associated with either one of NLP supporting CPE units (a "NLP group" and NLP non-supporting CPE units (a "LP group"). Specifically, FIG. 5 illustrates the partitioning of vectors c, s, m, y, r (which are all complex vectors of $\mathbb{C}^{(K_1+K_2)\times 1}$) into two groups of sizes $K_1$ and $K_2$. Partitioning of a vector into groups means that a vector's elements (also known as components) are allocated to these groups. Their first $K_1$ components are associated with the LP group (i.e., the group of CPE units employing LP and not supporting NLP), whilst the second remaining $K_2$ components are related to the NLP group (i.e., the group of CPE units supporting NLP).

Figure 6:
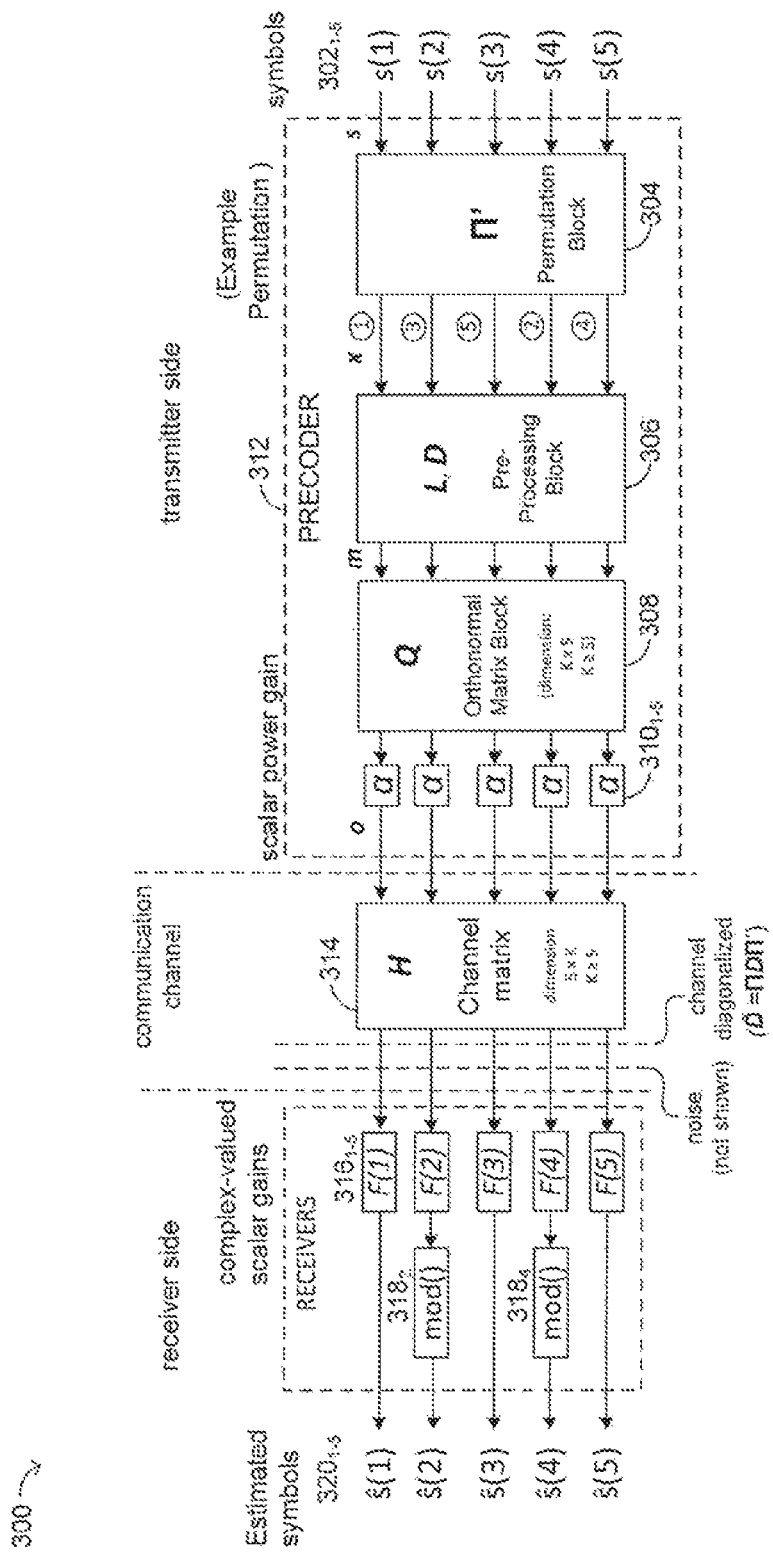
FIG. 6 is a schematic diagram illustrating an example permutation configuration in the specific implementation of the general hybrid-interoperability precoding scheme of FIG. 4.

To elucidate the role of permutations in the system and method of the disclosed technique, reference is now further made to FIG. 6, which is a schematic diagram illustrating an example permutation configuration in the specific implementation of the general hybrid-interoperability precoding scheme of FIG. 4, generally referenced 300. FIG. 6 shows a particular example of a permutation configuration for five users. Permutation block 304 (FIG. 6) is a particular example of permutation block 204 (FIG. 4), in which there are a total of five CPE units (users): {1,2,3,4,5} (in "natural ordering") where the group of users {1,3,5} are the LP group and group of users {2,4} are the NLP group. Similarly to permutation block 204 (FIG. 4), permutation block 304 (FIG. 6) is configured and operative to permute CPE units (users) into two aggregate groups according to supportability, e.g.: {{1,3,5},{2,4}}.

Figure 7:
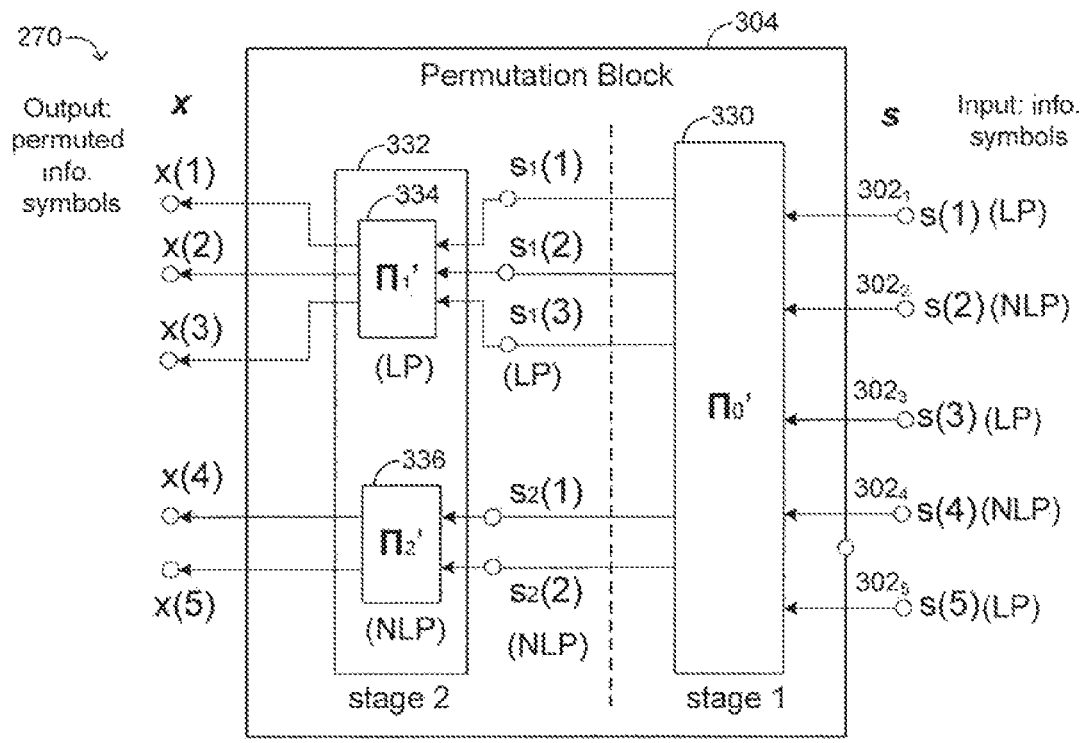
FIG. 7 is a schematic diagram illustrating an example configuration of an internal structure of the permutation block in FIG. 6.

Further detail of permutation block 304 is described in conjunction with FIG. 7, which is a schematic diagram illustrating an example configuration of an internal structure of the permutation block of FIG. 6. Permutation block 304 includes two permutation stages: a stage 1 referenced 330 and a stage 2 referenced 332. Input Information symbols $302_1$, $302_2$, $302_3$, $302_4$, and $302_5$ (collectively denoted "$302_{1-5}$") are inputted into permutation block 304 (specifically, into stage 1). As shown in FIG. 7, input information symbols s(1), s(2), s(3), s(4), s(5) are in the natural ordering. Stage 1 330 is configured and operative to divide the input information symbols into two aggregate groups: the LP group and the NLP group.

Generally, an arbitrary permutation of information symbol elements is achieved by permuting their indices via a permutation matrix $\Pi_0$, i.e.:

$$[s_1^T, s_2^T]^T = \Pi_0^T s \quad (5).$$

The example given in FIGS. 6 and 7, shows 5 users of whom the group of users {2,4} (i.e., CPE units $106_2$, $106_4$) support the decoding of NLP data, while the group of users {1,3,5} (i.e., CPE units $106_1$, $106_3$, $106_5$) don't support the decoding of NLP data (i.e., the LP group of users). The permutation $\Pi_0^T$ permutes the natural ordered list of users 1 through 5 {1,2,3,4,5} into two successive aggregate groups of different supportabilities, thusly: {1,3,5,2,4} (i.e., {{LP},{NLP}}). Stage 2 includes permutation blocks 334 and 336. In stage 2 each of these two aggregate groups of users may be further permuted within each group by employing permutation blocks 334 and 336 respectively implementing permutation matrices $\Pi_1^T$ and $\Pi_2^T$, namely:

$$s_1^{(\Pi_1)} = \Pi_1^T s_1 \text{ and } s_2^{(\Pi_2)} = \Pi_2^T s_2 \quad (6).$$

The following short notations are hereby introduced: $x_1 = s_1^{(\Pi_1)}$ and $x_2 = s_2^{(\Pi_2)}$. In general, the permutation matrix corresponding to the operation of permutation block 204 (FIG. 4) and by permutation block 304 (in the particular example shown in FIG. 6) is:

$$\prod_{K \times K} = \prod_0 \begin{pmatrix} \prod_1 & 0_{K_1 \times K_2} \\ 0_{K_2 \times K_1} & \prod_2 \end{pmatrix}. \quad (7)$$

Permutation block 204 (FIG. 4) outputs a signal 206 (i.e., permuted information symbols represented in FIG. 7 as a vector $x=[x(1), x(2), x(3), x(4), x(5)]^T$ in the 5-user example) in which the outputted permuted symbols can generally be represented by:

$$[x_1, x_2]^T = [s_1^{(\Pi_1)}, s_2^{(\Pi_2)}]^T = \prod^T x = \begin{pmatrix} \prod_1^T & 0_{K_1 \times K_2} \\ 0_{K_2 \times K_1} & \prod_2^T \end{pmatrix} \prod_0^T x. \quad (8)$$

Output signal 206 (FIG. 4) having permuted information symbols (FIG. 7) are added 210 with a perturbation vector 208, c. Perturbation vector 208, c, for the first $K_1$ components, denoted as $c_1$ are zeroes: $c_1=0$, signifying that no perturbation is added 210 to the $K_1$ components of output vector 206. The remaining $K_2$ components, are denoted as $c_2 \neq 0$, signifying that a perturbation value is added 210 to the $K_2$ components output vector 206. Vector c is defined by the following expressions: $c=[c_1^T, c_2^T]^T$, $c_1=0$ means $0^{K_1 \times 1}$, $c_2 \in C^{K_2 \times 1}$ where $K_1+K_2=K$. Vector x is defined by the following expressions $x=[x_1^T, x_2^T]^T$, $x_1 \in C^{K_1 \times 1}$, $x_2 \in C^{K_2 \times 1}$, where $K_1+K_2=K$.

The perturbation vector, which can be any addition that may be eliminated by modulo arithmetic operations at the receiver, is one particular example of a reversible mapping. The employment of the perturbation vector approach effectively connotes that for every k-th index the point $(s_k+c_k)$ belongs to an expanded constellation set for the k-th user. Generally, various algorithms may be used to determine the perturbation vector. Particularly, perturbation vector c is attained by taking into account system constraints that serve several objectives. An example objective involves minimizing the output power of the precoder signal (thus aiding to avoid intensive pre-scaling of the transmitted signal, consequently increasing the SNR at the receiver). Another example objective concerns the minimization of the bit error rate (BER) of the received signal.

Alternatively, the permutation matrix is applied directly to the vector sum of the symbol vector and the perturbation vector, s+c, since $c+x=c+\Pi^T s=\Pi^T(s+\Pi c)=\Pi^T(s+\tilde{c})$, where $\tilde{c}$ represents an auxiliary perturbation vector. The perturbation vector and auxiliary perturbation vector are related thusly: $\tilde{c}=c^{(\Pi)}=\Pi c$. Arranging c as $c=[c_1^T, c_2^T]^T$ we obtain:

$$\tilde{c} = \Pi[c_1^T, c_2^T]^T \quad (9).$$

Perturbation vector $c_1$, whose components are all zero, is added to $s_1$. $c_1^{(\Pi_1)}$ is also a zero vector. Obtaining an implicit expression to perturbation vector c in terms of the auxiliary perturbation vector $\tilde{c}$ (by multiplying the auxiliary vector by $\Pi^T$ from the left and using the identity $\Pi^T \Pi$) yields: $c=\Pi^T \tilde{c}$. An output 212 (FIG. 4) from adding operation 210, x+c, constitutes as an input to a block 214 configured and operative to perform the pseudo-inversion operation: pinv (R')*D, and to output a signal 216 (FIG. 4) represented by a vector m referenced 256 in FIG. 5. In the 5-user example of FIG. 6, a pre-processing block 306 performs the same operation as block 214 (note that L=R'). Outputted signal 216, represented by vector m is partitioned (FIG. 5) into two sub-vectors $256_1$ and $256_2$ of vector 256 corresponding to two aggregate groups of vector elements, namely, a first aggregate group, sub-vector $m_1$, successively followed by a second aggregate group, sub-vector $m_2$. Block 214 (FIG. 4) in conjunction with a Q block 218, a permutation block 204, and a perturbation vector 208, c, collectively constitute a precoder 220, denoted by P, which in turn is configured and operative to perform pseudo-inversion of a communication channel matrix H, in accordance with a ZF (zero-forcing) scheme involving permutations. Analogously, in the 5-user example of FIG. 6, permutation block 304, a pre-processing block 306, an orthonormal matrix "Q" block 308, and a plurality of scalar power gain blocks $310_{1-5}$ collectively constitute a precoder 312, which in turn is configured and operative to perform inversion of a communication channel 314.

Block 214 (FIG. 4) and pre-processing block 306 (in the 5-user example in FIG. 6) utilize a diagonal matrix $D \in C^{K \times K}$ (i.e., D=diag(d)) configured and operative to perform power scaling for precoder 220 (e.g., for meeting power constraints). Vector d is defined by the following expressions: $d=[d_1^T, d_2^T]^T$, where $d_1 \in C^{K_1 \times 1}$, and $d_2 \in C^{K_2 \times 1}$, and where $K_1+K_2=K$. Q block 218 (FIG. 4) and a Q block 308 (in the 5-user example in FIG. 6) are configured to perform the following QR decomposition for a Hermitian conjugated and permuted channel according to:

$$H^H = QR\Pi^T \text{ hence } H = \Pi R^H Q^H \quad (10),$$

signifying that the QR decomposition is constructed from:

$$H^H \Pi = QR \quad (11),$$

where $H \in C^{K \times N}$ is the channel matrix, $R \in C^{K \times K}$ is an upper triangular matrix, $Q \in C^{N \times K}$ is an orthogonal matrix such that $Q^H Q = 1_{K \times K}$, and $\Pi \in C^{K \times K}$ is a permutation matrix. The multiplication expression $\Pi X$ permutes the rows of a matrix X; the multiplication expression $X \Pi^T$ permutes the columns of matrix X. In particular, the determination of matrix R in the QR factorization process depends not only on the channel matrix but also on the permutation matrix $\Pi$. Permutation matrix $\Pi$ consists of K elements, such that all elements but one is zero and just one element is equal to 1, for each row and each column of $\Pi$. The position (i.e., index value) of this element (the 1) is different for every row and column so that these positions determine the permutation sequence. With reference to the 5-user example of FIGS. 6 and 7, let us consider the following a 5-dimensional vector (1,2,3,4,5) and its 5-element permutation into {2,4,1,3,5}, represented by the following matrix:

$$\Pi = \begin{pmatrix} 0 & 1 & 0 & 0 & 0 \\ 0 & 0 & 0 & 1 & 0 \\ 1 & 0 & 0 & 0 & 1 \\ 0 & 0 & 1 & 0 & 0 \\ 0 & 0 & 0 & 0 & 1 \end{pmatrix}, \Pi \begin{bmatrix} a_1 \\ a_2 \\ a_3 \\ a_4 \\ a_5 \end{bmatrix} = \begin{bmatrix} a_2 \\ a_4 \\ a_1 \\ a_3 \\ a_5 \end{bmatrix}. \quad (12)$$

In particular, this also demonstrates an example of:

$$\Pi = \begin{pmatrix} \Pi_1 & 0_{2 \times 3} \\ 0_{3 \times 2} & \Pi_2 \end{pmatrix}, \quad (13)$$

where the 2×2 permutation matrix $\Pi_1$ permutes the first two indices and the 3×3 permutation matrix $\Pi_2$ permutes last three indices.

The construction of precoder a P represented by precoder matrix $P \in C^{N \times K}$ (referenced 220 in FIG. 4 and 312 in FIG. 6) is achieved according to the following equations:

$$P = \alpha Q R^{-H} D \Pi^T, o = P(s+c), \quad (14).$$

$P \in \mathbb{C}^{N \times K}$ is a generalized vector precoder matrix, s is the information symbol vector and c is the perturbation vector. For the LP group of CPE units the respective components of c are zero, while for the NLP group of CPE units the respective components of c are nonzero. Alternatively, there might be NLP supporting CPE units whose respective components of c are constrained (forced) to zero for the purposes of optimization (e.g., dimensionality reduction in decreasing the number of nonzero components of c, thus reducing computational load), effectively treating NLP supporting CPE units as part of the LP group of CPE units. The perturbation vector is added for the NLP group of CPE units for example via search-based criteria, implicitly via the THP scheme, and the like.

Scalar power gain blocks $310_1$, $310_2$, $310_3$, $310_4$, and $310_5$, (collectively denoted $310_{1-5}$) (FIG. 6) apply a scalar $\alpha$ factor, which is common to all users (may be used optionally), matrices Q and R are determined according to equation (11), and matrix D is used for power scaling. Specifically, matrix $R^H$ is a lower triangular matrix hereby denoted interchangeably by L, (i.e., $L = R^H$). The input to block 218 in FIG. 4 and block 308 in FIG. 6, matrix Q, is given by:

$$m = R^{-H} D \Pi^T (s+c) = L^{-1} D \Pi^T (s+c) \quad (16),$$

which means that:

$$Lm = D \begin{pmatrix} \Pi_1^T & 0_{K_1 \times K_2} \\ 0_{K_2 \times K_1} & \Pi_2^T \end{pmatrix} \Pi_0^T (s+c) = D \left[ \left(s_1^{(\Pi_1)}\right)^T, \left(s_2^{(\Pi_2)}\right)^T + c_2^T \right]^T. \quad (17)$$

Since L is lower diagonal, for the LP group we obtain:

$$L_1 m_1 = D_1 s_1^{(\Pi_1)} \quad (18),$$

or equivalently, $$m_1 = L_1^{-1} D_1 s_1^{(\Pi_1)} \quad (18^*),$$

where $D_1 = \text{diag}(d_1)$.

Figure 8:
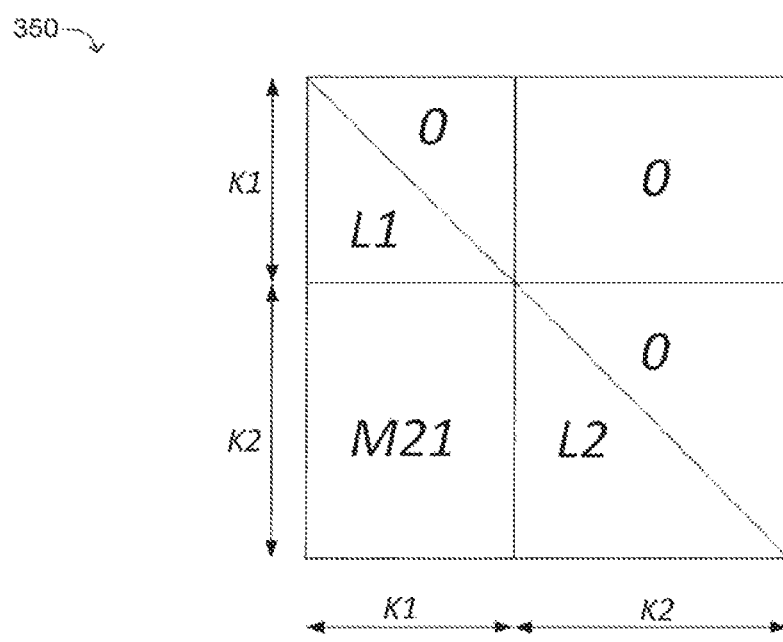
FIG. 8 is a schematic illustration detailing a partition of a lower-diagonal matrix L having the dimensions $(K_1+K_2) \times (K_1+K_2)$ into three matrices.

Reference is now further made to FIG. 8, which is a schematic illustration, generally referenced 350, detailing a partition of a lower-diagonal matrix L having the dimensions $(K_1+K_2) \times (K_1+K_2)$ into three matrices $L_1$, $L_2$, and $M_{13}$, and a zero matrix $0_{K1 \times K2}$ having zero-valued elements. Matrices $L_1^{-1}$, $L_1$, $D_1$, $\Pi_1$ are of size $K_1 \times K_1$ and vectors $m_1$, $s_1^{(\Pi_1)}$, $d_1$ are of dimension $K_1 \times 1$. Note that permutation matrix $\Pi_1$ has only $K_1$ non-zero elements and is defined by the vector of size $K_1$ specifying the permutations. Matrix $D_1$ has $K_1$ non-zero elements on its principal diagonal. Matrix $L_1^{-1}$ is a lower diagonal matrix whose inverse is matrix $L_1$, the latter of which is also a lower diagonal matrix consisting of $K_1$ first rows of matrix L.

Diagonal scaling vector $d_1$ can represent the degrees of freedom for optimization under constraints. Optimization involves use of the diagonal scaling vector $d_1$ in conjunction with the degrees of freedom afforded by the permutation. The elements of the diagonal (power) scaling vector d (D=diag(d)) are typically selected to be real-valued and non-negative (although it is not a required restriction). It is noted that different precoder outputs may be scaled by gains of different values (not shown in FIG. 6). The corresponding degrees of freedom rendered by the diagonal of the corresponding components of matrix D are chosen to satisfy and ensure that power constraints are met per communication channel (e.g., line, antenna), as well as to optimize the performance (e.g. affect communication rates: mean or max-min (maximum-minimum) or max-min with constraints etc.). For example, the optimization, may seek maximization of the average rate, the max-min rate, or alternatively other multi-criterion optimizations. Typical constraints include the power density mask (PSD), and the minimal bit loading value.

Following determination of diagonal scaling vector $d_1$, vector $m_1$ is calculated directly via equation (18*), or sequentially via equation (18). The direct path allows calculation of the components of $m_1$ independently from each other, thus allowing for parallel processing to be employed.

Figure 9:
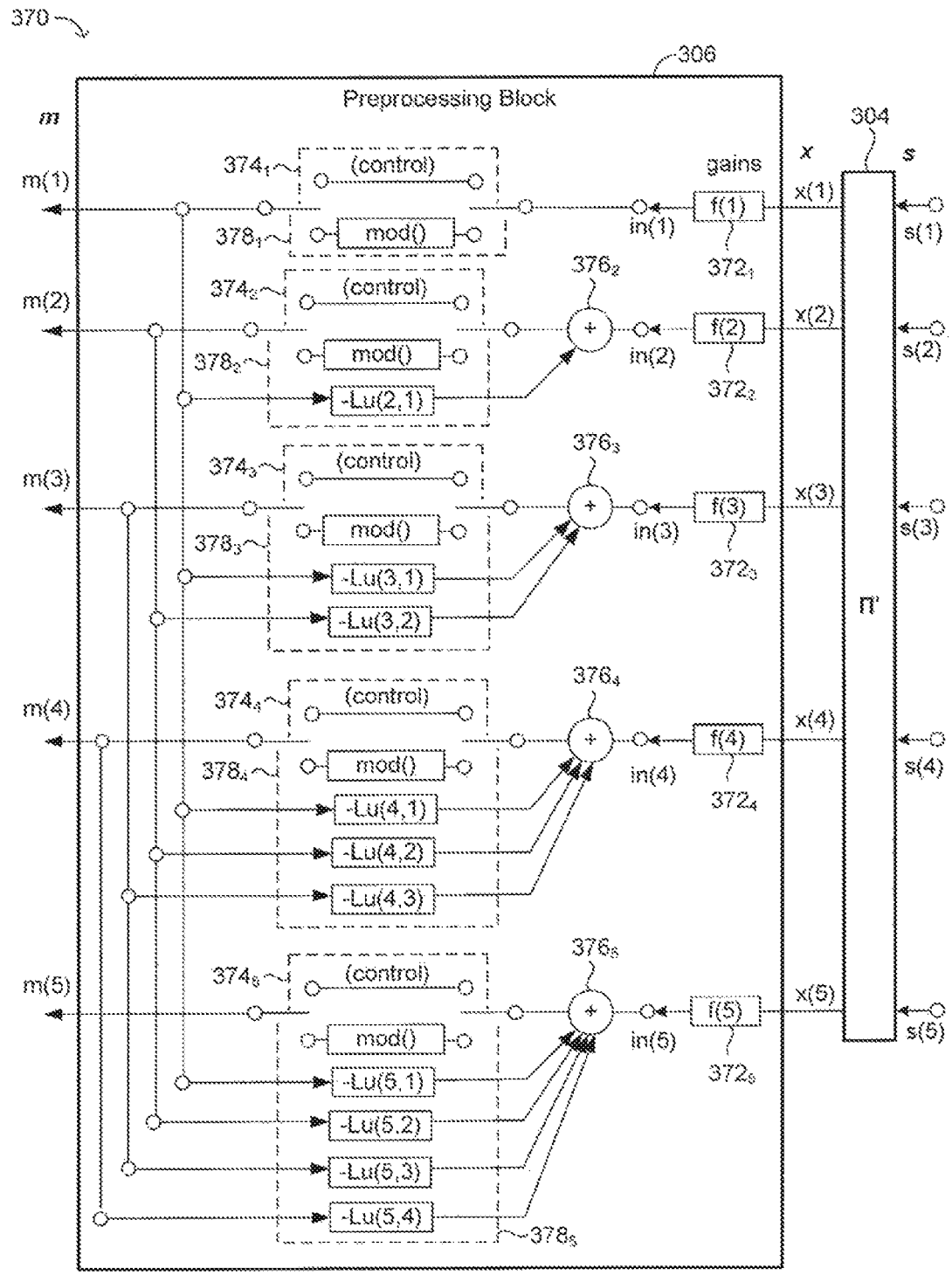
FIG. 9 is a schematic illustration detailing an example configuration of an internal structure of the preprocessing block in FIG. 6.

The NLP scheme for the NLP group of CPE units (users) will now be described in greater detail. Reference is now made to FIG. 9, which is a schematic illustration detailing an example configuration, of an internal structure of the preprocessing block in FIG. 6, generally referenced 370. FIG. 9 shows an internal structure of preprocessing block 306 in FIG. 6, for the 5-user example. Also shown is permutation block 304 of FIGS. 6 and 7, configured and operative to provide permutated information symbols (vector x) as input to preprocessing block 306. Preprocessing block 306 includes a plurality of gain blocks $372_1$, $372_2$, $372_3$, $372_4$, and $372_5$, a plurality of NLP/LP control mechanisms $374_1$, $374_2$, $374_3$, $374_4$, and $374_5$, a plurality of adders $376_2$, $376_3$, $376_4$, and $376_5$, and a plurality of modular arithmetic calculation units $378_1$, $378_2$, $378_3$, $378_4$, and $378_5$. Permuted information symbols $x=\{x(1), x(2), x(3), x(4), x(5)\}$ are respectively inputted into gain blocks $372_1$, $372_2$, $372_3$, $372_4$, and $372_5$ (index-wise). The gain blocks are configured and operative to multiply the permuted information symbols by respective gain components f(1), f(2), f(3), f(4), and f(5) of a gain vector f. NLP/LP control mechanisms are each $374_1$, $374_2$, $374_3$, $374_4$, and $374_5$ are configured and operative to control application of reversible mapping 154A (FIG. 3), for example, a modulo-Z adder (where $Z \in \mathbb{Z}$, i.e., a whole number), according to the respective supportabilities of the CPE units. For the LP group of users, NLP/LP control mechanisms $374_1$, $374_2$, $374_3$, $374_4$, and $374_5$ are configured and operative to direct relevant input signals in(1), in(2), in(3), in(4), in(5) to the output of preprocessing block 306, thereby respectively bypassing modular arithmetic calculation units $378_1$, $378_2$, $378_3$, $378_4$, and $378_5$. For the NLP group of users, NLP/LP control mechanisms $374_1$, $374_2$, $374_3$, $374_4$, and $374_5$ are configured and operative to direct relevant input signals in(1), in(2), in(3), in(4), in(5) respectively to modular arithmetic calculation units $378_1$, $378_2$, $378_3$, $378_4$, and $378_5$.

The operation of adders $376_2$, $376_3$, $376_4$, and $376_5$, and that of modular arithmetic calculation units $378_1$, $378_2$, $378_3$, $378_4$, and $378_5$, which are relevant to the group of NLP users, will now be described in detail. Analogously to equation (18) relating to the LP group of users, for all LP and NLP groups of users we have:

$$Lm = D\Pi(s+c) \quad (19).$$

Referencing FIG. 8, which shows a partition of the lower-diagonal L matrix into (sub)matrices, where the lower-diagonal matrix is denoted $L_1$, the rectangular matrix is denoted $M_{12}$, and the lower-diagonal is denoted $L_2$. All elements above the main diagonal are zeroes. The dimensions of $L_1$, $M_{12}$ and $L_2$ are $K_1 \times K_1$, $K_2 \times K_1$, and $K_2 \times K_2$ respectively. From equation (19) we obtain:

$$L_2 m_2 + M_{21} m_1 = D_2 \Pi_2^T (s_2 + c_2) \quad (20).$$

The following notations are hereby defined: $D_2 = \text{diag}(d_2)$, where $d_2 = \text{diag}(L_2)$. The objective now is to construct a unit diagonal matrix $L_U$:

$$L_U = D_L^{-1} L \quad (21),$$

where $D_L = \text{diag}(d_L)$, and $d_L = [\text{diag}(L_1)^T, \text{diag}(L_2)^T]^T$. The modular arithmetic calculation units are configured and operative to facilitate construction of the diagonal matrix $L^U$ in a recursively manner according to:

$$L_U(k, n) = \frac{L(k, n)}{L(k, k)}.$$

Particularly, multiplication of equation (17) the left side by $D_L^{-1}$ results in:

$$L_U m = [(f_{(1)} \odot s_1^{(\Pi_1)})^T, s_2^{(\Pi_2)T} + c_2^T]^T \quad (22),$$

where $\odot$ denotes the component-wise multiplication, and f is a gain vector calculated as according to:

$$\text{diag}(f_{(1)}) = (\text{diag}(\text{diag}(L_1)))^{-1} D_1 \quad (23),$$

hence:

$$f_1(k) = \frac{d_1(k)}{L_1(k,k)} = \frac{d_1(k)}{L(k,k)}, \text{ for } k = 1, \ldots, K_1. \quad (24)$$

According to equation (20) the first $\alpha \times \alpha$ elements of the scaled matrix:

$$L_1 = \text{diag}(\text{diag}(L_1)) L_{u1} \quad (25).$$

Thus:

$$L_1^{-1} = L_{u1}^{-1} (\text{diag}(\text{diag}(L_1)))^{-1} \quad (26).$$

By using equation (23) we may rewrite equation (18*) as:

$$m_1 = L_1^{-1} D_1 s_1^{(\Pi_1)} = L_{U1}^{-1} (\text{diag}(\text{diag}(L_1)))^{-1} D_1 s_1^{(\Pi_1)} \quad (27),$$

then obtain an expression for $m_1$ by means of the scaled matrix, $L_{u1}^{-1}$, and gain vector f:

$$m_1 = L_{U1}^{-1} \text{diag}(f_{(1)}) s_1^{(\Pi_1)} \quad (28),$$

(which is an alternative expression for $m_1$).

We observe that a sequential solution of the system of equations $L_U m = b + \tilde{c}$ can be given by:

$$m(1) = b(1) + \tilde{c}(1) \quad (29)$$

$$m(k) = b(k) + \tilde{c}(k) - \sum_{n=1}^{k-1} L_U(k, n) m(n) \text{ for } k = 2, \ldots, K,$$

where we denote:

$$b = \text{diag}(f)\Pi s = \text{diag}(f) s^{(\Pi)} \quad (30),$$

and discuss the following general scheme derived from equation (19):

$$L_U m = \text{diag}(f) s^{(\Pi)} + \tilde{c} \quad (31).$$

From equations (29) and (30) we arrive at:

$$m(1) = f(1) s^{(\Pi)}(1) + \tilde{c}(1) \quad (32)$$

$$m(k) = f(k) s^{(\Pi)}(k) + \tilde{c}(k) - \sum_{n=1}^{k-1} L_U(k, n) m_2(n),$$

$$\text{for } k = 2, \ldots, K.$$

For any index k we may choose an auxiliary perturbation vector $\tilde{c}(k)$ to be proportional to the modulus size such that:

$$m(k) = \text{mod}\left(f(k)s^{(\Pi_1)}(k) - \sum_{n=1}^{k-1} L_U(k,n)m_2(n)\right) \quad (33)$$

Figure 10:
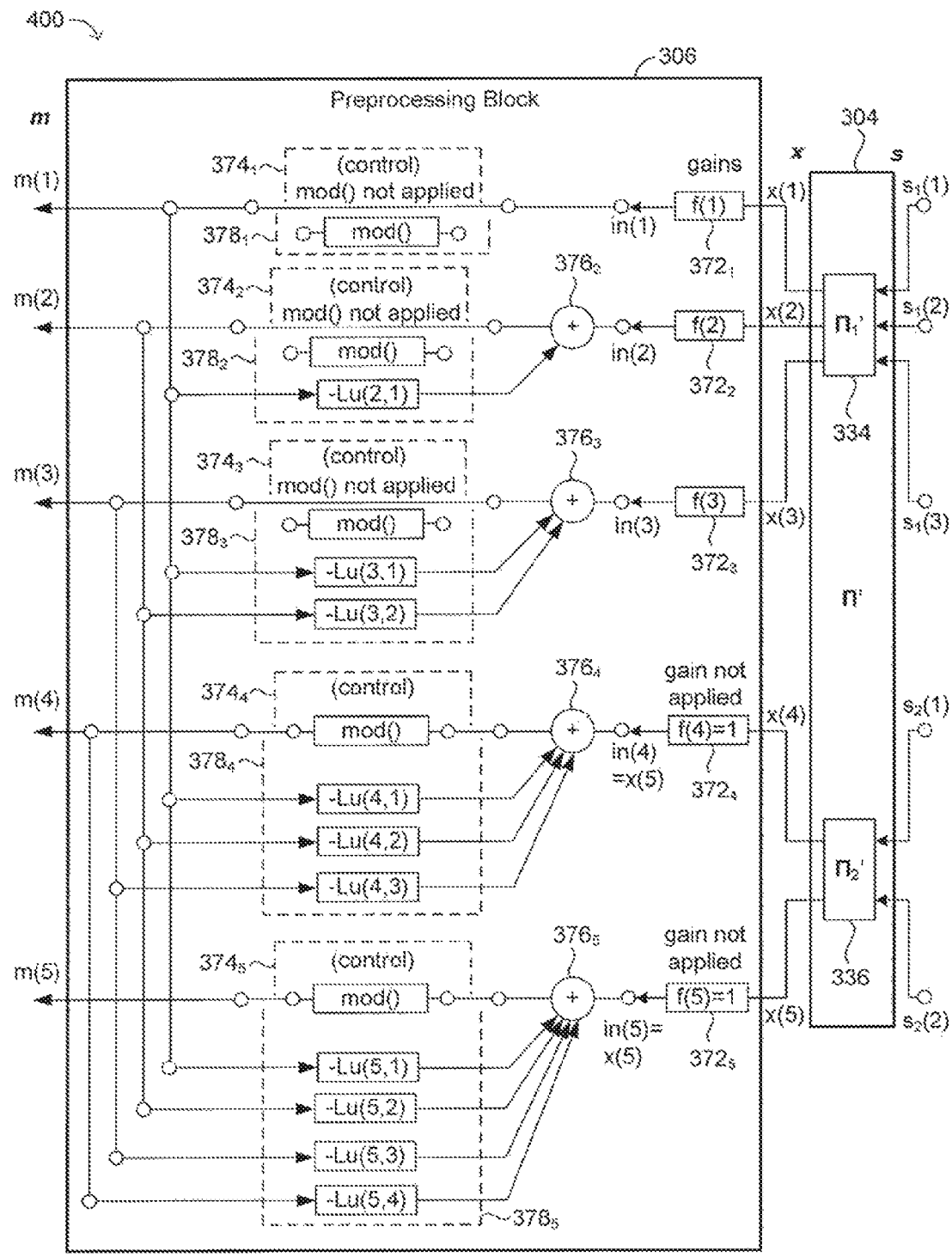
FIG. 10 is a schematic illustration detailing an example configuration of an internal structure of preprocessing block and permutation block in FIG. 6, shown in a particular 5-user configuration.

Reference is now made to FIG. 10, which is a schematic illustration detailing an example configuration of an internal structure of preprocessing block and permutation block in FIG. 6, shown in a particular 5-user configuration, generally referenced 400. FIG. 10 shows an example internal structure of permutation block 304 of FIG. 6, including permutation sub-blocks 334 and 336 (FIG. 7). As described in conjunction with FIG. 7, permutation sub-blocks 334 and 336 each respectively permute the two aggregate groups LP and NLP of users. Preprocessing block 306 employs equation (22) for the NLP group of users such that:

(1) The first $K_1$ permuted information symbols $s_1^{(\Pi_1)}(k)$ (i.e., x(1), x(2), x(3)) are inputted to preprocessing block 306 and gain blocks 372$_1$, 372$_2$, 372$_3$ apply (e.g., multiply by) gain vector components $f_{(1)}(k)$ i.e., as $f_{(1)}(k)s_1^{(\Pi_1)}(k)$ (i.e., f(1), f(2), f(3)). The rest of $K_2$ permuted information symbols, corresponding to the NLP users enter directly as $s_2^{(\Pi_2)}(k)$ (i.e., gain blocks 372$_4$, and 372$_5$ don't apply gains, i.e., f(4)=1, f(5)=1). For the LP group of users, outputs from gain blocks 372$_1$, 372$_2$, 372$_3$ correspond to respective inputs in(1), in(2), in(3) to respective modular arithmetic calculation units 378$_1$, 378$_2$, 378$_3$ (i.e., effectively bypassed), which in turn correspond to respective outputs m(1), m(2), m(3). For the NLP group of users, outputs from gain blocks 372$_4$, 372$_5$ correspond to respective inputs in(4), in(5) to respective modular arithmetic calculation units 378$_4$, 378$_5$, which in turn correspond to respective outputs m(4), and m(5).

(2) NLP/LP control mechanisms 374$_1$, 374$_2$, 374$_3$, control the application of modulus operations, which are not applied for the $K_1$ first equations corresponding to the LP users. NLP/LP control mechanisms 374$_4$ and 374$_5$ control the application of modulus operations applied to the subsequent $K_2$ equations corresponding to the NLP users. The perturbation vectors are implicitly calculated via modulus operations according to:

$$m(1) = f_{(1)}(1)s_1^{(\Pi_1)}(1) \quad (34)$$

$$m(k) = f_{(1)}(k)s_1^{(\Pi_1)}(k) - \sum_{n=1}^{k-1} L_U(k,n)m(n), \quad (35)$$
$$\text{for } k = 2, \ldots, K_1$$

$$m(k) = \text{mod}\left(s_2^{(\Pi_2)}(k)) - \sum_{n=1}^{k-1} L_U(k,n)m(n)\right), \quad (36)$$
$$\text{for } k = K_1+1, \ldots, K_2.$$

The gains, represented by vector f, are calculated according to: $f(k)=d_1(k)/L(k,k)$, where $d_1$ represents (pre-calculated) diagonal coefficients for the linear precoder.

The presented scheme is a convenient way to embed the LP and NLP groups of users together into the THP structure, concomitantly with NLP/LP control mechanisms configured and operative to respectively apply modulo arithmetic operations to groups of users classified according to supportability. The implementation of permutations by permutation block 304 is achieved via equation (8) such that the permutation block matrix can be represented in the form of $$\begin{pmatrix} \Pi_1^T & 0_{K_1 \times K_2} \\ 0_{K_2 \times K_1} & \Pi_2^T \end{pmatrix}$$

acting on $[s_1^T, s_2^T]^T$ as its input. Alternatively, the permutation block may also include a matrix $\Pi_0^T$ (see equation (8)) acting on the natural order of information symbols, which can be represented by:

$$\begin{pmatrix} \Pi_1^T & 0_{K_1 \times K_2} \\ 0_{K_2 \times K_1} & \Pi_2^T \end{pmatrix} \Pi_0^T.$$

There are various implementations to preprocessing block 306 (FIG. 6), several of which are hereby given by the following examples.

Figure 11:
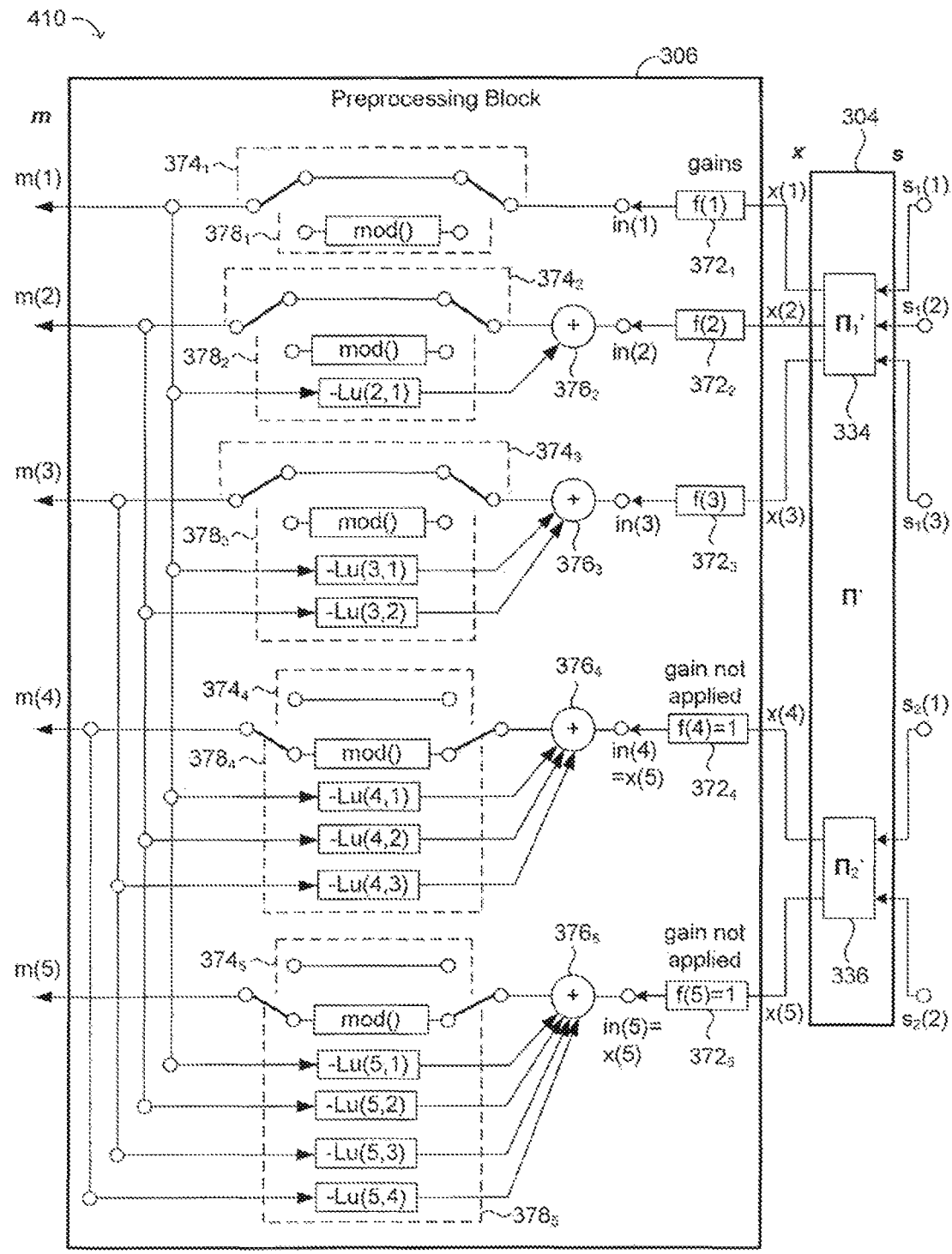
FIG. 11 is a schematic illustration showing a particular implementation of NLP/LP control mechanisms in an internal structure of preprocessing block.

Reference is now further made to FIG. 11, which is a schematic illustration showing a particular implementation of NLP/LP control mechanisms in an internal structure of preprocessing block, generally referenced 410. Particular implementation 410 of preprocessing block 306 is the same as particular implementation 400 of processing block 306, apart from FIG. 11 showing another particular implementation of NLP/LP control mechanisms. Specifically, NLP/LP control mechanisms 374$_1$, 374$_2$, 374$_3$, 374$_4$, and 374$_5$ are implemented as electronic switches configured and operative to route input signals in(1), in(2), in(3), in(4), in(5) either to respective modular arithmetic calculation units 378$_1$, 378$_2$, 378$_3$, 378$_4$, and 378$_5$, or directly to respective outputs m(1), m(2), m(3), m(4), m(5), thereby controlling the application of the modulo operation (i.e., the reversible mapping) according to the respective supportabilities of the CPE units.

Figure 12:
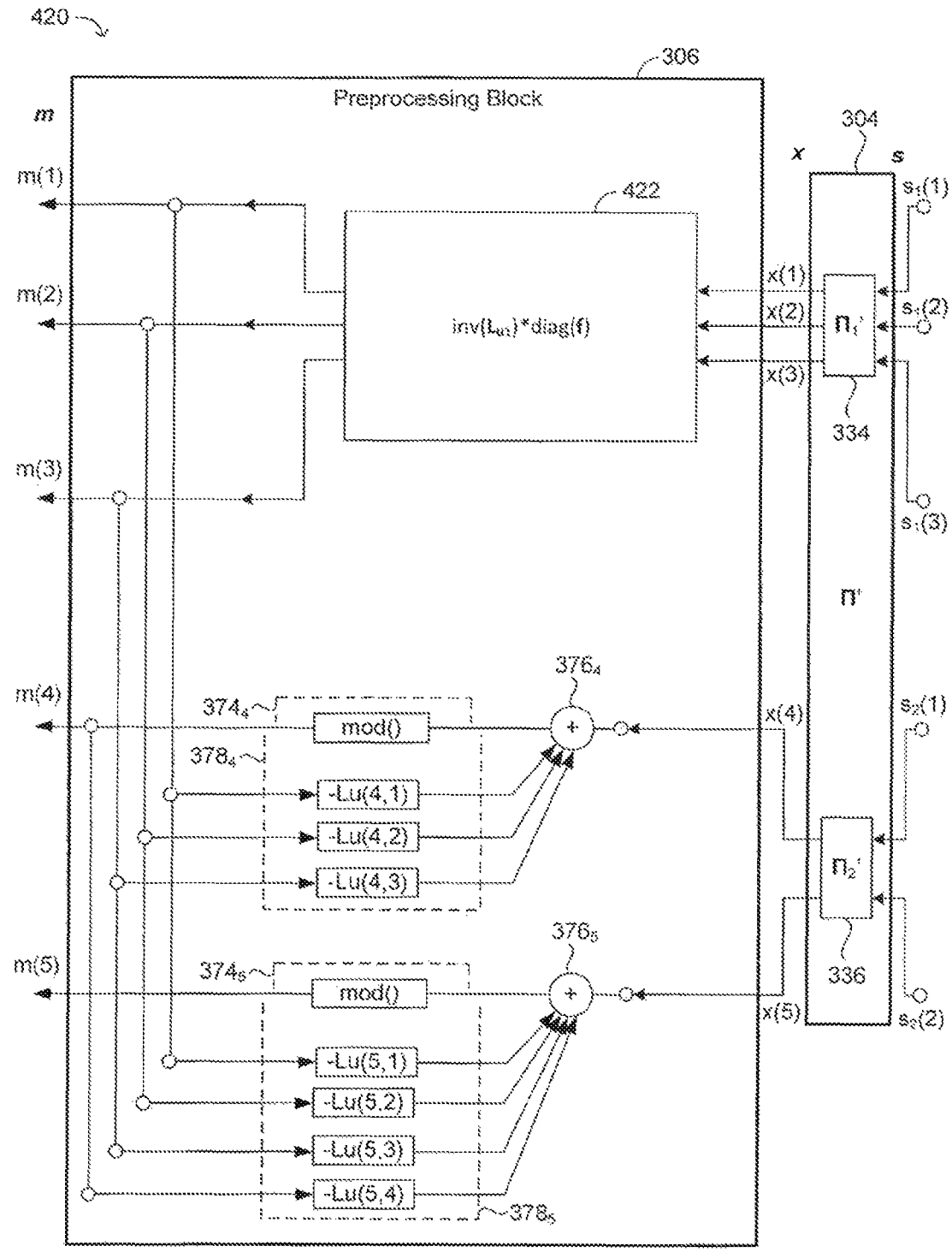
FIG. 12 is a schematic illustration showing another particular implementation of the preprocessing block of FIG. 6.

In accordance with another example implementation of preprocessing block 306, reference is now further made to FIG. 12, which is a schematic illustration showing another particular implementation of the preprocessing block of FIG. 6, generally referenced 420. FIG. 12 is similar to FIG. 10, apart from implementation of a calculation block 422 for the LP group of users. For those LP group of users, permuted information symbols x(1), x(2), and x(3) are inputted into calculation block 422, which is configured and operative to calculate $\text{inv}(L_{u1})*\text{diag}(f)$, (i.e., using the scaled to unit diagonal $L_u$ matrix and the scaled gains f) the respective outputs of which are m(1), m(2), and m(3). For the NLP group of users, modular arithmetic calculation units 378$_4$, and 378$_5$ are used. FIG. 12 shows a combination of a united direct non-sequential action for the LP group of users, in conjunction with a sequential THP preprocessing action for the NLP group of users. Alternatively, according to another implementation (not shown), calculation block 422, is configured and operative to calculate: $\text{inv}(L_1)*D_1$. For both implementations, it is emphasized that only m(k) for the NLP group of users is calculated sequentially. For the LP group of users, m(k) is calculated either sequentially or directly according to equation (18*), namely: $m_1 = L_1^{-1}D_1s_1^{(\Pi_1)}$ or alternatively, by opting to use the scaled matrix: $m_1 = L_{u1}^{-1}\text{diag}(f_{(1)})s_1^{(\Pi_1)}$.

Figure 13:
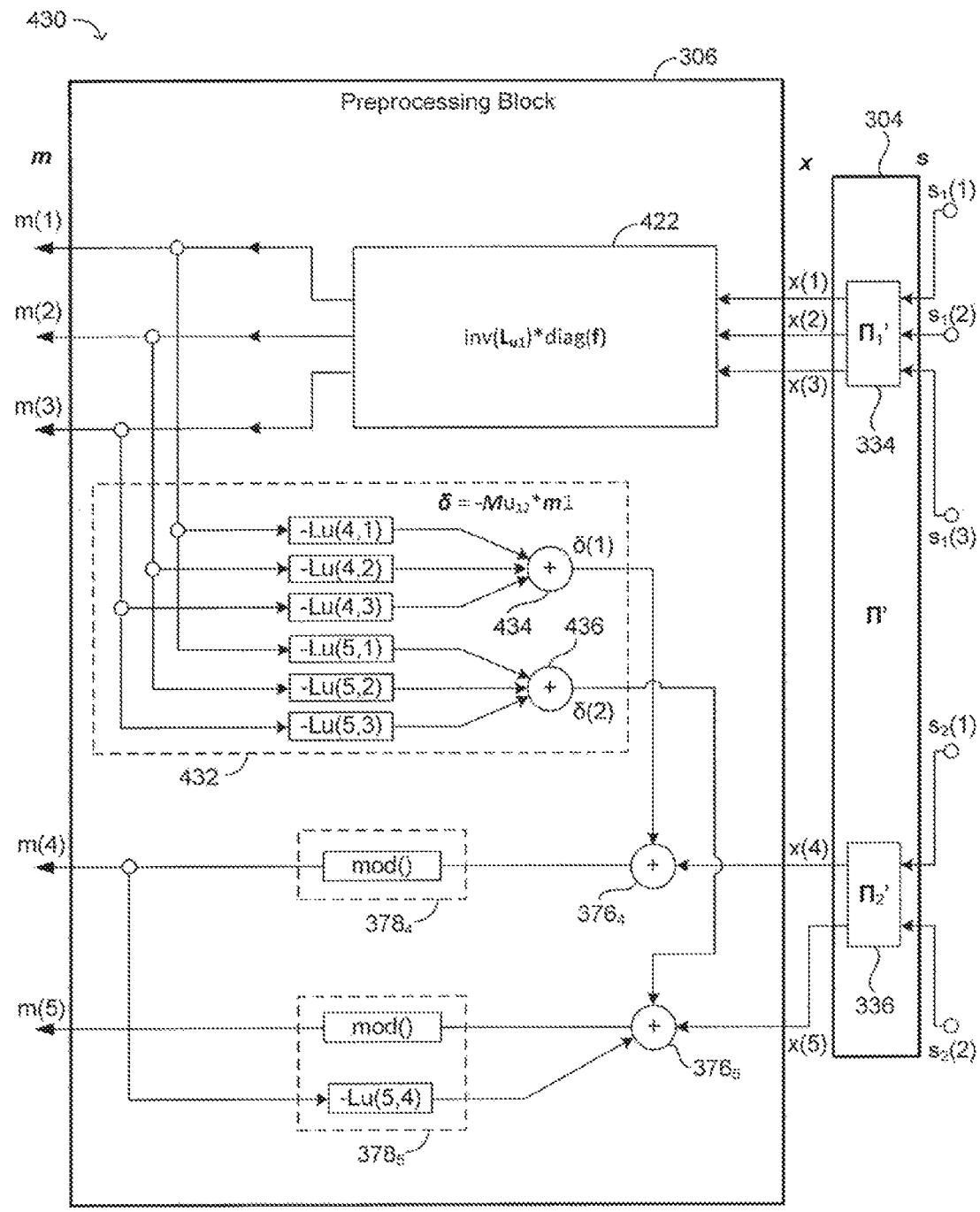
FIG. 13 is a schematic illustration showing further particular implementation of the preprocessing block of FIG. 6.

In accordance with another example implementation of preprocessing block 306, reference is now further made to FIG. 13, which is a schematic illustration showing further particular implementation of the preprocessing block of FIG. 6, generally referenced 430. FIG. 13 is generally similar to FIG. 12, apart from a different configuration of modular arithmetic calculation units $378_4$, and $378_5$ and the inclusion of a calculation block 432 that includes a plurality of recursive calculation blocks and adders 434 and 436. The example implementation shown in FIG. 13 is configured and operative to reduce the real-time precoding complexity, due to preprocessing block 306 requiring the execution of fewer computations involving the sequential part of the computation process (i.e., as compared with the configuration shown in FIG. 12).

In particular, preprocessing block 306 performing the sequential calculations for determining the k-th output, m(k), given in equation (36), may be viewed as follows. Subsequent to determining $m_1$ we may calculate:

$$\delta_1(k) = -\sum_{n=1}^{K_1} L_U(k,n) m_1(n). \tag{37}$$

Then, the remaining $K_2$ sequential equations may be represented by:

$$m(k) = \mathrm{mod}\left(s_2^{(\Pi_2)}(k)\right) + \delta_1(k) - \sum_{n=K_1+1}^{k-1} L_U(k,n) m(n)\right), \tag{38}$$

for $k=K_1+1, \ldots, K_2$, where $\delta$ is an offset vector, which may be represented in the vector form as:

$$\delta = -M_{U21} m_1 \tag{39},$$

where matrix $M_{u12}$ is based on partition of the scaled unit diagonal matrix $L_u$ (i.e., $M_{u12}=L_U$(rows: $K_1+1$ to K, columns: 1 to $K_1$)). Offset vector $\delta$ may also be written in terms of $D_2$ as:

$$\delta = -D_2^{-1} M_{21} m_1, \text{ where } D_2 = \mathrm{diag}(\mathrm{diag}(L_2)) \tag{40}.$$

Since the offset vector $\delta$ is known, it may be separately calculated (independently of the sequential calculations). The outputs of adders 434 and 436 constitute outputs of calculation block 432 represented by offset vector $\delta$, whose two components are $\delta_1$ (inputted to adder $376_4$) and $\delta_2$ (inputted to adder $376_5$). This configuration typically reduces real-time precoding complexity as noted.

Alternatively, according to another implementation (not shown), calculation block 422 in FIG. 13, is configured and operative to instead calculate: $\mathrm{inv}(L_1)^*D_1$.

Returning now to FIG. 4 (and FIG. 6 in the 5-user example), block 214 in FIG. 4 (and preprocessing block 306 of FIG. 6) output a signal represented by vector m to the input of Q block 218 (and Q block 308 of FIG. 6). Q block 218 (FIG. 4) and a Q block 308 (in the 5-user example in FIG. 6) are configured to perform QR decomposition for a Hermitian conjugated and permuted channel according to equations (10) and (11), and to output an outputted signal 222 represented by vector o in FIG. 4. Scalar power gain blocks $310_1$, $310_2$, $310_3$, $310_4$, and $310_5$, (collectively denoted $310_{1-5}$), which are configured and operative to apply a scalar factor $\alpha$ common to all users, are optional and shown only in FIG. 6. Alternatively, the scalar factor may be different for different users as will be described in greater detail in conjunction with FIGS. 17A and 17B. In the case where the system of the disclosed technique utilizes the scalar power gain blocks (FIG. 6), these in turn output the signal represented by vector o (see equations (14)).

Precoder 220 (FIG. 4) and precoder 312 (FIG. 6), represented by precoder matrix $P \in \mathbb{C}^{N \times K}$ are configured and operative to perform pseudo-inversion of the communication channel matrix, and to generate outputted signal 222, represented by vector o (recapping that $o=P(s+c)$ and $P=\alpha QR^{-H} D \Pi^T$ (equations (14))) to the communication channel 224 (FIG. 4) and 314 (FIG. 6 in the 5-user example). P represents a generalized inverse of the communication channel matrix H, given by:

$$H=(Q^*R^*\Pi^T)^H=\Pi^*R^H*Q^H \tag{41}.$$

If a direct substitution of the factorized channel matrix (equation (41) above) is made into an expression for the pseudoinverse pinv(R')*D of block 214 (FIG. 4), the result yields basic elements of THP based on QR decomposition. In particular, if we denote the diagonal scaling of the communication channel pseudoinverse as $\tilde{D}$ and the scaling of the THP block 220 as D then:

$$p\mathrm{inv}(H)\tilde{D}=H^H(HH^H)^{-1}\tilde{D}=QR\Pi^T(\Pi R^H Q^H \\ QR\Pi^T)^{-1}\tilde{D}=QR\Pi^T\Pi^{-T}(R^HR)^{-1}\Pi^{-1}\tilde{D}= \\ QRR^{-1}(R^H)^{-1}\Pi^T\tilde{D}=Q(R^H)^{-1}D\Pi^T \tag{42},$$

where $\Pi^T \tilde{D}=D\Pi^T$, $Q \in \mathbb{C}^{N \times K}$, $R \in \mathbb{C}^{K \times K}$ and D is a diagonal matrix of size (dimension) $K \times K$ and $\Pi^T$ is the permutation matrix of size $K \times K$ (where the columns of matrix Q are orthonormal) based on the so-called thin (or reduced) QR factorization (due to K<N). The relation between the diagonal matrix which scales the channel pseudoinverse and the scaling utilized by THP block 220 is $D=\Pi^{-1}\tilde{D}\Pi=\Pi^T \tilde{D}\Pi$. Alternatively, it is: $\tilde{D}=\Pi D \Pi^T$. The scaling is not arbitrary (e.g., as in the prior art) but THP block 220 is configured to scale according to $D=\mathrm{diag}(\mathrm{diag}(R^H))$. Note that the QR decomposition presented is based on THP that represents the precoder utilizing the Moore-Penrose pseudoinverse and its corresponding specifically chosen diagonal: $\tilde{D}=\Pi \mathrm{diag}(\mathrm{diag}(R^H))\Pi^T$.

The transmitter side outputs outputted signal 222 (vector o), which propagates through communication channel 224, the result of which is a signal 226 (represented by a vector y) received at the receiver side. A received signal 232 at the receiver side, represented by a vector r is the sum of signal 226 ($y$) with additive noise 228 (represented by a vector n), signifying that the precoded information symbols propagated through the communication channel includes additive 230 noise. Received signal 232, vector r may be represented by:

$$r=Ho+n=HP(s+c)+n=\Pi R^H Q^H \alpha QR^{-H} D\Pi^T(s+c)+ \\ n=\alpha \Pi D\Pi^T(s+c)+n \tag{43},$$

where $r \in \mathbb{C}^{K \times 1}$ is the received signal, $o \in \mathbb{C}^{K \times 1}$ is the output to the communication lines (i.e., the transmitted signal) and $n \in \mathbb{C}^{K \times 1}$ is the additive noise at the receiver side. The expression $\Pi D \Pi^T$ represents the permuted diagonal:

$$D_\Pi=\Pi D \Pi^T \tag{44},$$

therefore:

$$r=\alpha D_\Pi(s+c)+n=\alpha d_\Pi \odot (s+c)+n \tag{45}.$$

The permutation matrix $\Pi$ orders (i.e., permutes) the constructed diagonal:

$$d_\Pi=\mathrm{diag}(D_\Pi)=\Pi d \tag{46},$$

where $d=\mathrm{diag}(D)$. In THP, the input signal is first permuted as $\Pi^T s$, then the sequence $\tilde{c}$ is added via the THP scheme:

$$\Pi^T s + \tilde{c} = \Pi^T(s+\Pi\tilde{c}) = \Pi^T(s+c) \tag{47},$$

where $c=\Pi\tilde{c}$.

Continuing at the receiver side, received signal 232 (FIG. 4) is inputted to a block 234 configured and operative to perform scaling by inverting the permuted diagonal vector $D_\Pi$, as defined in equation (44), the output of which is denoted by an output signal 236. With reference to the 5-user example of FIG. 6, at the receiver side, complex-valued scalar gain blocks 316$_1$, 316$_2$, 316$_3$, 316$_4$, 316$_5$ (collectively denoted by 316$_{1-5}$) are configured and operative to apply corresponding complex-valued scalar gain factors F(1), F(2), F(3), F(4), and F(5). (A special case of complex-valued scalar gain factors is where they are real values). For NLP supporting CPE units, output signal 236 (FIG. 4) represents an input to a modulo operation block 238, which is configured and operative to apply modulo arithmetic operation to received signal 236, and to output an output signal 240 of estimated symbols, represented by a vector ŝ. For those CPE units whose supportability does not include NLP (i.e., LP group of users) output signal 236 is effectively output signal 240 (i.e., no modulo operation is applied). With reference to the 5-user example of FIG. 6, at the receiver side, modulo arithmetic blocks 318$_2$ and 318$_4$ are employed by respectively employed respectively by CPE units 108$_2$ and 108$_4$ (FIG. 1, for example) having supportability to decode NLP encoded data (i.e., the NLP group of users). Modulo arithmetic blocks 318$_2$ and 318$_4$ are configured and operative to encode the NLP encoded data by applying modulo operation, the generated result of which are output as estimated symbols 320$_2$ (i.e., ŝ(2)) and 320$_4$ (i.e., ŝ(4)). CPE units not supporting the decoding of NLP encoded data (LP group of users) don't have modulo arithmetic blocks, and consequently the outputs from complex-valued scalar gain blocks 316$_1$, 316$_3$, 316$_5$ constitute as estimated symbols 320$_1$ (i.e., ŝ(1)) 320$_3$ (i.e., ŝ(3)), and 320$_5$ (i.e., ŝ(5)).

For non-cooperative receivers (i.e., receivers that do not share or use information they process between themselves) received signals, $r_1$ and $r_2$, are processed: (i) independently for every user (as the users are non-cooperative); and (ii) by using scalar scaling of the received signals. These can be represented in the matrix-vector form as diagonal gain corrections, diag($g_{(1)}$) and diag($g_{(2)}$)) for both LP and NLP groups of users, and additionally by modulus operations applied only to the NLP group of users, as may be represented by the following equations for outputted estimated symbols:

$$\hat{s}_1 = G_{(1)}r_1 = \text{diag}(g_{(1)})r_1 = g_{(1)} \odot r_1 \quad (48),$$

$$\hat{s}_2 = \text{mod}(G_{(2)}r_2) = \text{mod}(\text{diag}(g_{(2)})r_2) = \text{mod}(g_{(2)} \odot r_2) \quad (49),$$

where $s_1$ and $s_2$ respectively signify information symbols for the LP and NLP groups of users and $\hat{s}_1$ and $\hat{s}_2$ denote their corresponding estimates (which may be further inputted into error correction blocks (not shown) as known in the art).

The application of complex-valued scalar gain factors F(1), F(2), F(3), F(4), F(5) shown in FIG. 6 for the NLP supporting CPE receiver units, in the case where F(k)≠1 is generally achieved in two steps. The first step involves compensating for the communication channel attenuation gains, given by the diagonal of the L matrix (i.e., diag(L)). The second step involves compensating for gains affected by the modulus operation. In this case an estimated symbol for a k-th NLP supporting CPE receiver unit is given by:

$$\hat{s}_{NLP}(k) = \frac{1}{f_\Pi(k)} \text{mod}\left(\frac{1}{D_\Pi(k,k)} r(k)\right), \quad (50)$$

where $D_\Pi = \Pi D_L \Pi^T$; $D_L = \text{diag}(\text{diag}(L))$; and $f_\Pi = \text{diag}(\Pi \text{ diag}(f)\Pi^T)$, as the received symbol is prior to frequency equalization at the receiver side (CPE units) is given by (prior to addition of noise):

$$y = \Pi D_L(\text{diag}((f))\Pi^T s + \tilde{c}) = \Pi D_L \Pi^T (\Pi \text{diag}((f))\Pi^T s + \Pi \tilde{c}) \quad (51).$$

Recalling that the diagonal matrix D (after factorization) in FIG. 4 is D=$D_L$ diag(f), vector r is scaled by components of the diagonal matrix $\Pi D_L \Pi^T$ thus obtaining:

$$(\Pi D_L \Pi^T)^{-1} y = \Pi \text{diag}((f))\Pi^T s + \Pi \tilde{c} \quad (52).$$

Subsequently the modulo operation is performed on the permuted auxiliary perturbation c̃=Πc after which the second scaling step is performed, in accordance with equation (50), thereby obtaining:

$$(\Pi \text{diag}((f))\Pi^T)^{-1} \text{mod}(\Pi D_L \Pi^T)^{-1} y = s \quad (53).$$

In practice, this procedure is applied to received vector r, thereby arriving at equation (50).

Note that for the standard THP case where F(k)=1, the k-th estimated symbol reduces to:

$$\hat{s}_{NLP}(k) = \text{mod}\left(\frac{1}{D_\Pi(k,k)} r(k)\right). \quad (54)$$

The estimated symbol $\hat{s}_{NLP}(k)$ corresponds to the NLP group of users at the receiver side (CPE units). At the transmitter side (DPU) the processor applies the modulus operation to symbols whose indices correspond to the NLP group of users after the permutation block (i.e., while not applied to symbols whose indices correspond to the LP group of users. For the LP group of CPE receiver units, the estimated symbol for a l-th CPE receiver unit is:

$$\hat{s}_{LP}(l) = \frac{1}{f_\Pi(l)} \frac{1}{D_\Pi(l,l)} r(l), \quad (55)$$

which is performed in one step (while two steps are also possible). Equation (31) may be rewritten to account for the THP scheme in the case where f(k)=1 for index k corresponding to the permuted NLP group of users as: $L_U$m=diag(f)$\Pi^T$(s+c), where c=$\Pi^T$c̃.

It is noted that the precoder given by: P=QR$^{-H}$, where Q∈ ℂ$^{N \times K}$ and R∈ℂ$^{K \times K}$ (where the columns of matrix Q are orthonormal) based on the so-called thin (or reduced) QR factorization (due to K<N) performed for H$^H$ as H$^H$=QR and hence H=R$^H$Q$^H$) leads to the Moore-Penrose pseudoinverse. We straightforwardly observe that:

$$P = H^H(HH^H)^{-1} = QR(R^H Q^H QR)^{-1} = QR(R^H R)^{-1} = = QR(R^{-1}R^{-H}) = QR^{-H} \quad (56).$$

Therefore, the precoder based on the QR decomposition represents a particular pseudoinverse. One may readily observe that the same is true for QR decomposition with permutations, as described hereinabove.

Figures 14A, 14B:
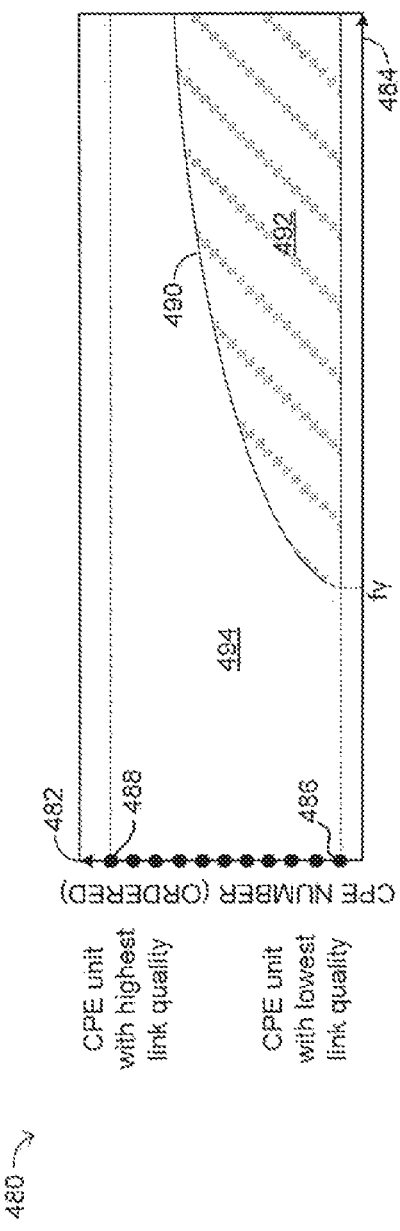
FIG. 14A is a table showing a database of supportabilities and activity levels of each CPE unit at a particular point in time, constructed and operative in accordance with the disclosed technique.
FIG. 14B is a schematic diagram showing a graph of a particular example of activity levels of CPE units ordered according to (relative) communication link quality as a function of subcarrier frequency at a particular point in time, in accordance with the disclosed technique.

It is assumed that the number of transmitters is N, and that K≤N. In a wireless system, N represents the number of transmitting antennas and in a wire-line system N is the number of CPE units (e.g., modems) transmitting through binder 110 (FIG. 1). The K CPE units which receive information (at a particular frequency) are regarded as active CPE units ("active users") at that particular frequency. The same CPE (user) may be active at some frequency tones and non-active at the other frequency tones. To further explain the meaning of an activity level of a particular CPE unit at a particular subcarrier frequency, reference is further made to FIGS. 14A and 14B. FIG. 14A is a table showing a database of supportabilities and activity levels of each CPE unit at a particular point in time, generally referenced 450, constructed and operative in accordance with the disclosed technique. FIG. 14B is a schematic diagram showing a graph of a particular example of activity levels of CPE units ordered according to (relative) communication link quality as a function of subcarrier frequency at a particular point in time, generally referenced 480, in accordance with the disclosed technique.

Database 450 shown in tabulated form includes a CPE number field 452, a supportability field 454, and an activity level field 456. CPE number field 452 includes a numbered list of CPE units $106_1, 106_2, 106_3, \ldots, 106_{N-1}, 106_N$ (FIG. 1). Supportability field 454 includes an ordered list of supportabilities $120_1, 120_2, 120_3, \ldots, 120_{N-1}, 120_N$ (FIG. 1) each associated (index-wise) with a particular CPE unit. Activity level field 456 includes an ordered list of activity levels activity levels $122_1, 122_2, 122_3, \ldots, 122_{N-1}, 122_N$ (FIG. 1) (per tone), each associated (index-wise) with a particular CPE unit. Activity level field 454 includes a plurality of subfields: an ON/OFF subfield 458, a synchronization subfield 460, a frequency response subfield 462, and an activity level per tone (subcarrier frequency) subfield 464. Supportability field 454 includes a list of supportabilities $120_1, 120_2, 120_3, \ldots, 120_{N-1}, 120_N$ defining for each CPE unit its ability to decode at least one of NLP data and LP data (i.e., with respect to hardware, software, firmware, etc.). ON/OFF subfield 458 lists for each CPE unit whether it is switched 'on' or otherwise not (e.g., 'off', non-existent, etc.). Synchronization subfield 460 lists for each CPE unit whether it is synchronized for transceiving data with corresponding transceivers $116_1, 116_2, 116_3, \ldots, 116_{N-1}, 116_N$ of DPU 104 (FIG. 1) (e.g., in the "showtime" state). Frequency response subfield 462 lists for each CPE unit its corresponding frequency response (i.e., a measure of the magnitude (and phase) of a signal propagating via the communication channels as a function of subcarrier frequency). Activity level per tone subfield 464 lists for each CPE unit whether it is considered active or inactive according to a determination made by DPU 104. Specifically, at least one of controller 112 (FIG. 1) and processor 114 of DPU 104 is configured and operative to employ a decision rule (e.g., an algorithm) for determining active CPE units (K) and inactive CPE units from a total number of CPE units (N) according to various criteria including data from ON/OFF subfield 458, synchronization subfield 460, frequency response subfield 462 (e.g., taking account SNR), and according to various constraints including optimization criteria such as the maximization of average rate, maximization of max-min rate, and the like. It is noted that data stored by database 450 is time-dependent (i.e., are subject to change over time). Consequently, activity level for each CPE is both subcarrier frequency-dependent as well as time-dependent.

Further reference is made to FIG. 14B showing a graph 480 of a particular example of activity levels of CPE units ordered according to (relative) communication link quality (performance, e.g., channel capacity) as a function of subcarrier frequency at a particular point in time. Graph 480 includes a vertical axis 482, and a horizontal axis 484. The CPE units are ordered along vertical axis 482 according to relative communication link quality, i.e., CPE units exhibiting a relatively high communication link quality (e.g., SNR) are positioned at a relative higher position along vertical axis 482 in comparison to CPE units exhibiting relatively lower communication link quality. For demonstration purposes, the CPE unit exhibiting the highest communication link quality (in relative terms) is referenced 488 in FIG. 14B, whereas the CPE unit exhibiting the lowest link quality is referenced 486. Horizontal axis 484 represents frequency (i.e., a range of subcarrier frequencies) the higher the frequency the farther along it is on this axis. A point in graph 480 is defined by a (horizontal, vertical) coordinate that corresponds to a particular CPE unit at a particular subcarrier frequency. A point located on a curve 490 or within a shaded area 492 represents that it is inactive, whereas a point located outside shaded area 492, i.e., within a non-shaded area 494 represents that it is active. Shaded area 492 is defined by curve 490 that is characteristic to the communication system 100. Curve 490 is a typical representation of a characteristic tendency of SNR decline with higher frequencies but is given only as an example for explicating the disclosed technique, for it can assume other forms (e.g., non-monotonic, continuous, discontinuous, etc.). FIG. 14B illustrates that a particular CPE unit may be active at some subcarrier frequencies, and inactive at others. In particular, for the example given, CPE unit 488 exhibiting the relatively highest communication link quality is active at all subcarrier frequencies, whereas CPE unit 486 exhibiting the lowest link quality is inactive from a threshold subcarrier frequency $f_y$. Each CPE unit may have its respective threshold subcarrier frequency. In the wireless case, a drop in the SNR at a specific frequency maybe due to a property of the communication channel (including the environment). Alternatively, inactive CPE units may be determined according to an optimization algorithm (e.g., that maximizes the average rate for all CPE units).

A memory (not shown) is configured and operative to store database 450. The memory is typically configured to be coupled with at least one of controller 112 and processor 114 of DPU 104 (FIG. 1). In one implementation, memory is intrinsic to DPU 104. In another implementation, memory is distinct and external to DPU 104, accessible via known communication methods (e.g., wire-line, wireless, internet, intranet communication techniques, etc.).

The precoder constructed according to the disclosed technique to solve the interoperability problem of CPE units having different supportabilities relates to the general case where K≤N, but more specifically relates to the more typical and tougher case where K<N at a particular subcarrier frequency. As aforementioned, a solution to the special simple case where K=N is already proposed by the prior art. The case where K<N may also arise for example in situations where some CPE units might not have a large enough SNR (e.g., due to significant channel signal attenuation in a high frequency portion of the transmitted spectrum of frequencies (e.g., corresponding to moderate and lengthy communication lines)). This case can be expressed, for example, when there's an insufficient SNR for transmitting a certain number of bits in a constellation at a particular frequency (e.g., calculated when bit-loading is less than a specific value). The communication lines corresponding to these CPE units may be reused to transmit information (i.e., precoding them with information symbols for other users) intended for the benefit of the remaining CPE units (i.e., or subset thereof), instead of for themselves. For example, if the ZF precoder is utilized it can be based on the communication channel pseudoinverse. In an extreme case (i.e., beam forming) where all but one CPE unit is active (or operational), all communication lines are utilized to transmit to that CPE unit. Note that a particular CPE unit may be active at some subcarrier frequencies and inactive at the other subcarrier frequencies. The solution of the disclosed technique relates and is attained on a subcarrier frequency basis.

The disclosed technique is configured and operative to employ an algorithm for determining active users from a total number of users according to various criteria, e.g., depending on optimization criteria such as the maximization of average rate, maximization of max-min rate, etc. In that regard, let's recall equation (19), which may be rewritten as:

$$L_2 m_2 = D_2 \Pi_2^T (s_2 + c_2) - M_{21} m_1 \qquad (57).$$

Noting that $m_1$ is already known, we introduce:

$$\tilde{\delta}_1 = -D_2^{-1} \Pi_2 M_{21} m_1 \qquad (58).$$

For a general vector preceding scheme there is not assumption that $D_2 = \text{diag}(\text{diag}(L_2))$. The diagonal $D_2$ represents additional degrees of freedom. Then we have:

$$m_2 = L_2^{-1} D_2 \Pi_2^T (s_2 + \tilde{\delta}_1 + c_2) \qquad (59),$$

where perturbation vector $c_2$ is determined by applying optimization criteria which for a given $D_2$ that minimizes a power criterion applied to vector $m_2$. For example, optimization involves minimization of a q-dimensional (absolute-value) norm $\|m_2\|_q$, where the following standard notation is used:

$$\|z\|_q = \left( \sum_{l=1}^{L} |z_l|^q \right)^{\frac{1}{q}}$$

for a vector z of a length L. Such minimization may be applied for every realization of $s_2$ and $s_1$ (where $s_1$ governs $m_1$ and therefore $\tilde{\delta}_1$). Alternatively, minimization is applied to the statistical power averages. Different types of norms of different dimension q may be used. For example, the norm $\|m_2\|_2$ is related to the total power of all $m_2$ components, while minimization of $\|m_2\|_\infty$ minimizes the maximal power per component. The components of $c_2$ are $c_2(k) = \tau_k p_k$. The modulus $\tau_k$ depends on the constellation size of $s_2$ or according to $c_2(k) = \tau p_k$, where the same modulus value is applied to all constellations (i.e., determined by the maximal allowed constellation size as described below). The complex number $p_k$ is what is sought via the optimization process (typically in the form of signed integer components (i.e., its real and imaginary components are signed integers)). For a constant modulus, the disclosed technique may minimize the instantaneous power value related to the currently transmitted symbols or, alternatively, the average power value for a given time period.

Figure 15:
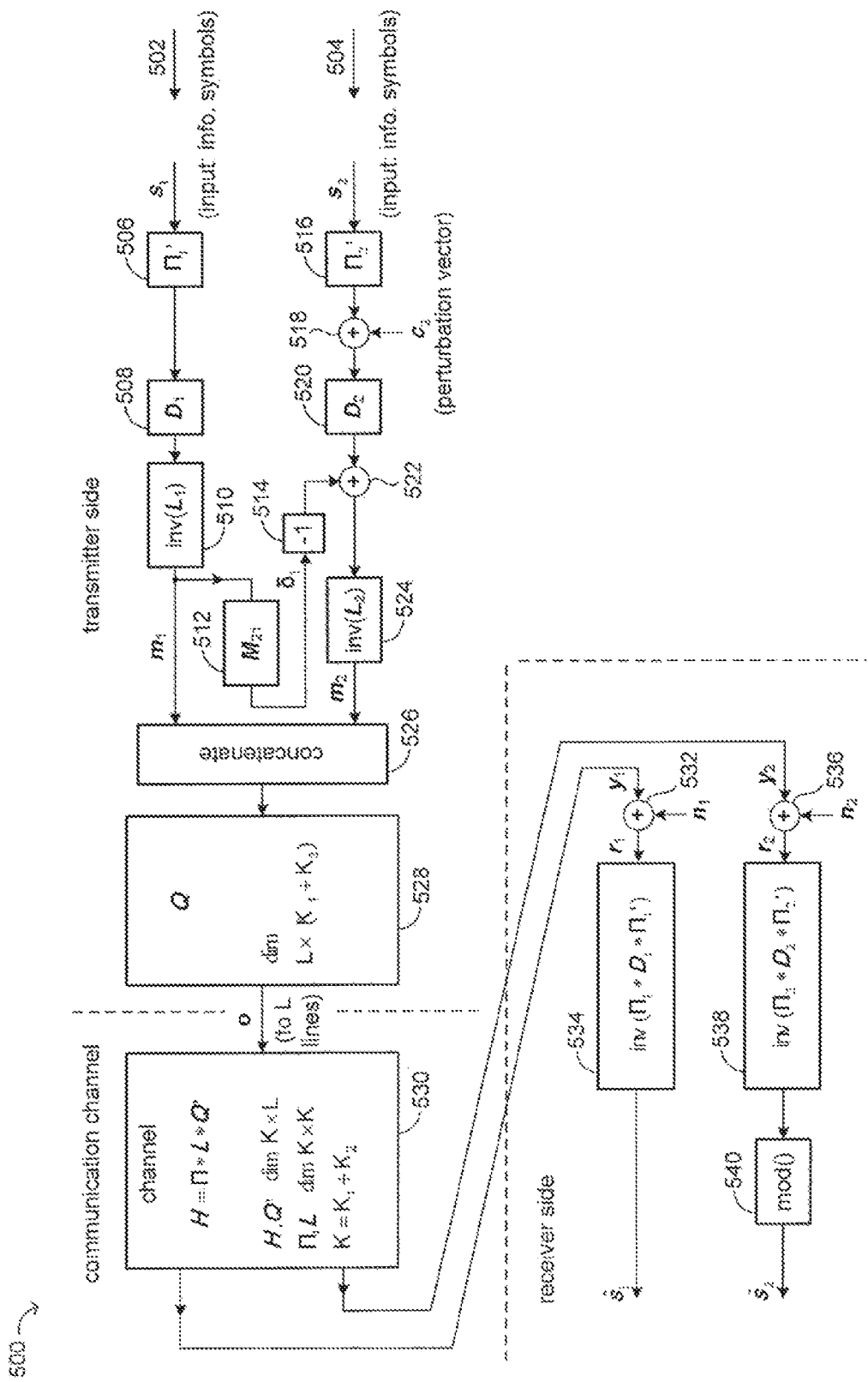
FIG. 15 is a schematic block diagram illustrating a specific implementation of the general hybrid-interoperability precoding scheme, specifically showing delineation into two paths, constructed and operative in accordance with the disclosed technique.

To further elucidate the disclosed technique, reference is now made to FIG. 15, which is a schematic block diagram illustrating a specific implementation of the general hybrid-interoperability precoding scheme, specifically showing delineation into two paths, generally referenced 500, constructed an operative in accordance with the disclosed technique. FIG. 15 essentially shows a hybridization arrangement of two delineated data paths, namely, a LP path 502 corresponding to the LP group of CPE receiver units (users) implementing LP, and a NLP path 504 corresponding to the NLP group of CPE receiver units implementing NLP. The principles of general hybrid-interoperability precoding scheme 500 conforms to principles of the disclosed technique heretofore described.

Initially, it is noted that vectors $s_1$, $m_1$, $\delta_1$, $d_1$, $y_1$, $n_1$, $r_1$, and $\tilde{s}_1$ are of dimension $K_1$, and vectors $s_2$, $m_2$, $d_2$, $Y_2$, $n_2$, $r_2$, and $\tilde{s}_2$ are of dimension $K_2$. Starting from LP path 502, information symbols, represented by a vector $s_1$ (intended for being linearly precoded) are inputted to a permutation block 506 configured and operative to perform permutation of vector elements of $s_1$ according to a permutation matrix $\Pi_1'$ (where $\Pi_1'$ is a $K_1 \times K_1$ permutation matrix) (similarly to permutation matrix of block 334 in FIG. 7). The permuted information symbols from permutation block 506 enter a block 508 configured and operative to perform power scaling according to a matrix $D_1$ ($D_1 = \text{diag}(d_1)$) the output of which is directed to a block 510, which in turn is configured and operative to perform inversion of matrix $L_1$ (i.e., calculate $\text{inv}(L_1)$), where $L_1$ is a lower diagonal matrix of dimensions $K_1 \times K_1$.) (Analogous to block 422 in FIG. 13). Initially, the system and method of the disclosed technique is configured and operative to optimize the linear precoder by optimized selection of diagonal scaling values of $D_1$ and permutation matrix $\Pi_1$. Block 510 outputs linearly precoded symbols, denoted by a vector $m_1$, which constitutes as an input to a concatenation block 526, as well as to a block 512, which in turn is utilized in NLP path 504. Block 512 is configured and operative to multiply vector $m_1$ by a matrix $M_{21}$ (FIG. 8) of dimensions of $K_2 \times K_1$ (where $L_1$, $L_2$ and $M_{21}$ are partitions of a lower diagonal L matrix of dimensions $K \times K$, and $K = K_1 + K_2$) and to output an offset vector $\delta_1$, which in turn is input to a block 514. Block 514 is configured and operative to multiply offset vector $\delta_1$ by $(-1)$ which yields a result in the form of equation (39).

Referring now to NLP path 504, information symbols represented by a vector $s_2$ (intended for being nonlinearly precoded) are inputted to a permutation block 516 configured and operative to perform permutation of vector elements of $s_2$ according to a permutation matrix $\Pi_2'$ (where $\Pi_2'$ is a $K_2 \times K_2$ permutation matrix) (similarly to permutation matrix of block 336 in FIG. 7). Adder 518 combines the permuted information symbols with a permutation vector $c_2$ and outputs the result to a block 520 configured and operative to perform power scaling according to a matrix $D_2$ ($D_2 = \text{diag}(d_2)$). Similarly to LP, the system and method of the disclosed technique is configured and operative to optimize the nonlinear precoder by optimized selection of diagonal scaling values of $D_2$ and permutation matrix $\Pi_2$, as well as optimized selection of the perturbation vector $c_2$. Adder 522 is configured and operative to combine the output of block 520 and block 514 and produce a result which is directed to a block 524, which in turn is configured and operative to perform inversion of matrix $L_2$ (i.e., calculate $\text{inv}(L_2)$, where $L_2$ is a lower diagonal matrix of dimensions $K_2 \times K_2$.). It is noted that permutation blocks 506 and 516 may be regarded as a second permutation stage (e.g., stage 2 referenced 332 in FIG. 7) that follows from a first permutation (e.g., stage 1 referenced 330 in FIG. 7). Block 524 outputs nonlinearly preceded symbols, denoted by a vector $m_2$, which constitutes as another input to concatenation block 526.

Concatenation block 526 is constructed and operative to perform concatenation of $K_1$ vector components of $m_1$ and $K_2$ vector components of $m_2$ into a concatenated vector m of K vector components. Essentially, vector 256, m (FIG. 5), consists of two sub-vectors $256_1$, $m_1$, and $256_2$, $m_2$ corresponding to two aggregate groups of vector elements respectively associated with the LP group and NLP group of CPE units. The outputted concatenated vector m is fed into a Q block 528 configured and operative to perform the QR decomposition $QR = H^H \Pi$ (where the channel matrix is H and $\Pi$ represents a block-diagonal permutation matrix constructed from $\Pi_1$ and $\Pi_2$). A matrix L is defined by $L = R^H$. Q block 528 outputs an output signal represented by an output vector o, which constitutes also as a transmitted output signal propagating from the transmitter side that via a communication channel 530 for reception at the receiver side.

At the receiver side, LP path 502 corresponds to LP CPE units configured and operative to receive a signal, represented by a received vector $r_1$ which is the sum of a vector $y_1$ and noise $n_1$, denoting that the received information symbols propagated through communication channel 530 includes additive 532 noise. The received signal (vector $r_1$) is inputted to a block 534, which in turn is configured and operative to perform scaling of the received signal per component according to $inv(\Pi_1 D_1 \Pi_1^T)$ the result of which yields outputted estimated symbols $\hat{s}_1$. NLP path 504 corresponds to NLP-supporting CPE units configured and operative to receive a signal, represented by and operative to receive a signal, represented by a received vector $r_2$ which is the sum of a vector $y_2$ and noise $n_2$, denoting that the received information symbols propagated through communication channel 530 includes additive 536 noise. The received signal (vector $r_2$) is inputted to a block 538, which in turn is configured and operative to perform scaling of the received signal per component according to $inv(\Pi_2 D_2 \Pi_2^T)$ the resulting signal is fed into modulo operation block 540, which in turn is configured and operative to apply a modulo operation to the signal outputted by block 538, the result of which yields outputted estimated symbols $\hat{s}_2$.

The optimized selection of the scaling values of $D_1$, $D_2$, the permutation matrices $\Pi_1$, $\Pi_2$, as well as the perturbation vector $c_2$ may be determined, for example according to various criteria such as the minimization of the power involving $m_2$ as discussed hereinabove in conjunction with equation (59). It is noted that the dimension of the perturbation vector is $K_2$ corresponds to the dimension of the input information symbol vector $s_2$. The functional split to linear and nonlinear precoders solves the interoperability problem, improves performance of the nonlinear precoder for small constellations, as well as well as reduces the dimensionality of the nonlinear precoder. Regarding NLP dimensionality reduction, it is known that determining the perturbation vector may involve large computational complexity (increasing significantly with vector dimension), therefore it may be beneficial to reduce it by reducing the number of the NLP users and the system and method of the disclosed technique allows to perform this by allocating part of the NLP users to the LP users (i.e., all users remain precoded).

Figure 16:
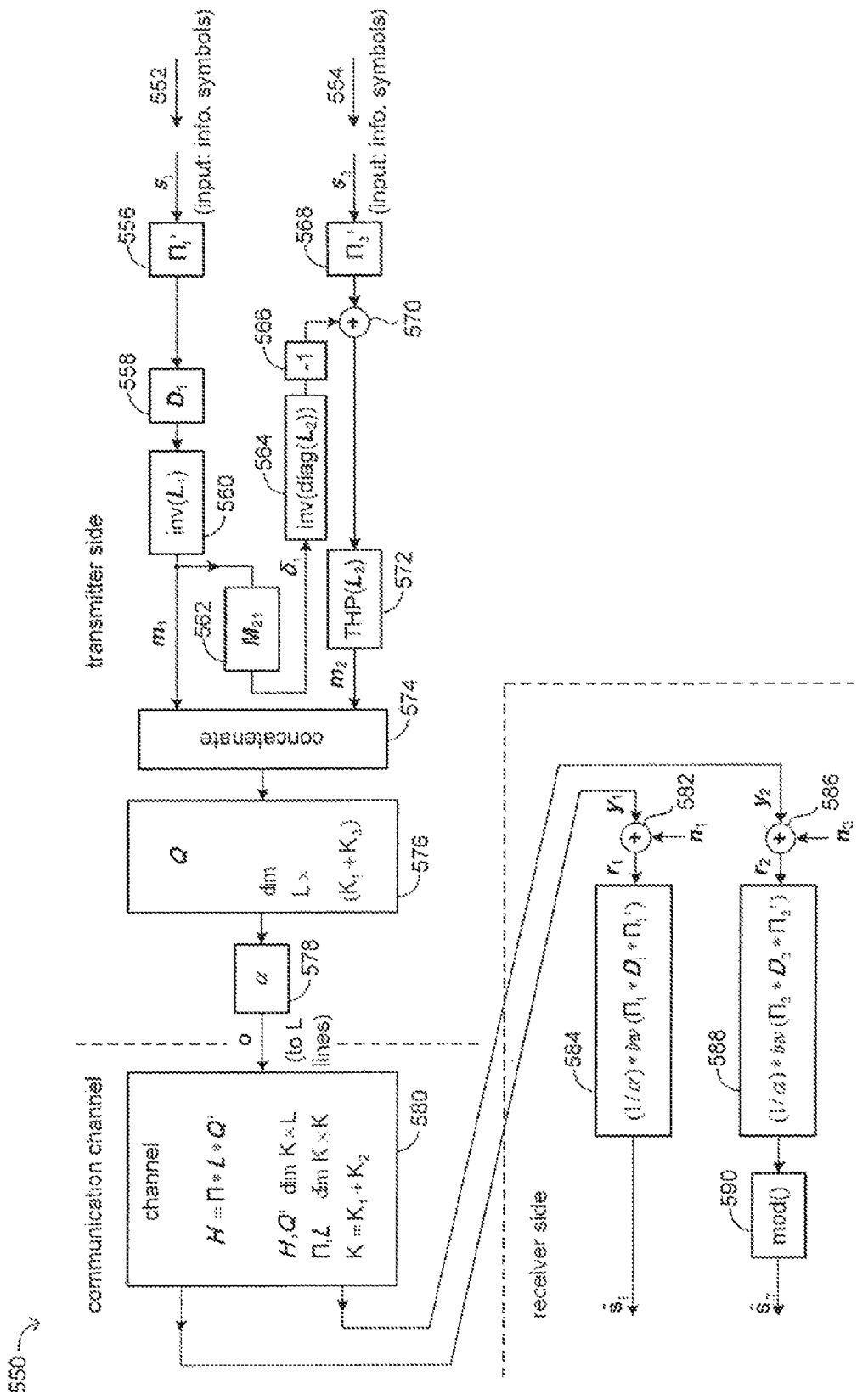
FIG. 16 is a schematic block diagram illustrating another specific implementation of the general hybrid-interoperability precoding scheme, specifically showing delineation into two paths, constructed an operative in accordance with the disclosed technique.

Alternatively, optional scaling of the output from the transmitter side by use of a scaling gain factor $\alpha$ is also viable. To further elucidate this implementation, reference is now made to FIG. 16, which is a schematic block diagram illustrating another specific implementation of the general hybrid-interoperability precoding scheme, specifically showing delineation into two paths, generally referenced 550, constructed an operative in accordance with the disclosed technique. FIG. 16 essentially shows a similar hybridization arrangement of two delineated data paths of FIG. 15 apart from several modifications described hereinbelow. FIG. 16 shows two paths, namely, a LP path 552 corresponding to the LP group of CPE receiver units (users) implementing LP, and a NLP path 554 corresponding to the NLP group of CPE receiver units implementing NLP. The principles of general hybrid-interoperability precoding scheme 550 conforms to principles of the disclosed technique heretofore described. General hybrid-interoperability precoding scheme 550 hybridizes between linear precoding and Tomlinson-Harashima vector precoding.

Initially, and similarly to the description heretofore described in conjunction with FIG. 14, it is noted that vectors $s_1$, $m_1$, $\delta_1$, $d_1$, $y_1$, $n_1$, $r_1$, and $\hat{s}_1$ are of dimension $K_1$, and vectors $s_2$, $m_2$, $d_2$, $y_2$, $n_2$, $r_2$, and $\hat{s}_2$ are of dimension $K_2$. $D_1=diag(d_1)$, and $D_2=diag(d_2)$. $\alpha$ is a scalar used for (optional) power scaling. $\Pi_1$ is a $K_1 \times K_1$ permutation matrix, and $\Pi_2$ is a $K_2 \times K_2$ permutation matrix. $L_1$ is a lower diagonal matrix of $K_1 \times K_1$. $L_2$ is a lower diagonal matrix of $K_2 \times K_2$. $M_{12}$ is of $K_2 \times K_1$. $L_1$, $L_2$ and $M_{12}$ are partitions of lower diagonal L matrix of dimensions $K \times K$. $\Pi$ represents a block-diagonal permutation matrix constructed from $\Pi_1$ and $\Pi_2$.

Starting from LP path 552, information symbols, represented by a vector $s_1$ are inputted to the following blocks 556, 558, 560, 562 which are all respectively configured and operative identically to blocks 506, 508, 510, 512 in FIG. 15. Owing to the lower triangular structure of the $L_1$ matrix, its optimization is not influenced and independent of the nonlinear precoder. Block 562 outputs an offset vector $\delta_1$, which in turn is input to a block 564, which in turn is configured and operative to apply inversion to the diagonal of vector $L_2$ (i.e., $inv(diag(L_2))$) and to output a signal to a block 566 configured and operative identically to block 514 in FIG. 15. An output of LP path 552 is a vector $m_1$.

Turning now to NLP path 554, information symbols represented by a vector $s_2$ are inputted to a permutation block 516 configured and operative identically to permutation block 516 in FIG. 15. Adder 570 combines the permuted information symbols generated from permutation block 516 with an output of block 556, the result of which is fed into a THP block 572, which in turn is configured and operative to perform THP with respect to $L_2$ (i.e., inversion of matrix $L_2$ according to the principles of THP). THP is performed on permuted information symbols $s_2$ (via permutation matrix $\Pi_2$) from which a component-wise scaled vector $\delta_1$ (i.e., $\delta_1$ multiplied by diagonal matrix $inv(D_2)$) is subtracted (corresponding to the subtraction of linear preceded users from nonlinearly precoded users). In this scheme, THP block 572 determines the vector $D_2=diag(L_2)$, thereby yielding an output signal represented by a vector $m_2$.

Vectors $m_1$, and $m_2$ are inputted to a concatenation block 574 and then to a Q block 576, both of which are respectively identical in construction and operation to blocks 526 and 528 in FIG. 15. An output from Q block 576 is inputted into a scalar gain block 578, which in turn is configured and operative to apply scalar gain factors to an output signal, represented by a vector o, which constitutes as an output from the transmitter side communicated via a communication channel 580 to the receiver side.

At the receiver side, following LP path 552 corresponds to LP CPE units configured and operative to receive a signal, represented by a received vector $r_1$ which is the sum of a vector $y_1$ and additive 582 noise $n_1$. The received signal (vector $r_1$) is inputted to a block 584, which in turn is configured and operative to perform scaling of the received signal per component according to $$\left(\frac{1}{\alpha}\right) * inv(\Pi_1 * D_1 * \Pi_1^T)$$

the result of which yields outputted estimated symbols $\hat{s}_1$. NLP path 554 corresponds to NLP-supporting CPE units configured and operative to receive a signal, represented by and operative to receive a signal, represented by a received vector $r_2$ which is the sum of a vector $y_2$ additive 586 and noise $n_2$. The received signal (vector $r_2$) is inputted to a block 588, which in turn is configured and operative to perform scaling of the received signal per component according to $$\left(\frac{1}{\alpha}\right) * inv(\Pi_2 * D_2 * \Pi_2^T)$$

the resulting signal is fed into a modulo operation block 590, which in turn is configured and operative to apply a modulo operation to the signal outputted by block 588, the result of which yields outputted estimated symbols $\hat{s}_2$.

Alternatively, according to another implementation of system 102, the scalar factor may be distinctive (e.g., not common, different) for different CPE units (users). In accordance with this alternative implementation, reference is now made to FIG. 17A, which is a schematic diagram illustrating an example of a specific implementation of the general hybrid-interoperability precoding scheme, utilizing different scalar factors, generally referenced 600, configured and operative in accordance with the disclosed technique. Implementation 600 generally provides a system and method for nonlinear precoding of an information symbol conveying data for transmission (over a particular subcarrier frequency) between a plurality of transmitters $116_1, \ldots, 116_N$ (FIG. 1) and a plurality of receivers $118_1, \ldots, 118_N$ (FIG. 1) via a plurality of communication channels $108_1, \ldots, 108_N$ (FIG. 1), where the communication channels define a channel matrix H. A processor (e.g., 114, FIG. 1) is configured to determine a weighting matrix G, whose number or rows is equal to the number of the transmitters; and further for determining a modified channel matrix equal to HG; so as to construct a nonlinear precoder for performing nonlinear precoding of the modified channel matrix. The weighting matrix G can be square (i.e., where the number of rows equals the number of columns).

The weighting matrix G is diagonal having diagonal elements representing individual gains each associated with a particular one of the transmitters. In this case we denote the individual scalar factors by means of a vector α, where each vector element represents an individual scalar factor, each of which is associated with a particular CPE unit (i.e., elements in vector α represent specific power scaling factors that are distinctive for each one of the CPE units). Permutation of inputted information symbols 602 may be performed optionally. In this case, information symbols 602, s, are inputted into a permutation block 604, which is configured and operative to permute information symbol elements in vector s, according to a permutation matrix Π'. Each information symbol element in vector s is associated with a particular CPE unit. The permutation takes into consideration the partition of CPE units into two groups (those that employ NLP and those that don't). Adder 610 combines an output from permutation block 604 with a perturbation vector 608 denoted by c, the result of which is a signal 612 that is inputted to a block 614, which in turn is configured and operative to perform the operation: inv(R')*D, and to output a signal 616 represented by a vector m. Signal 616 is inputted into a Q block 618 configured to perform QR decomposition the result of which is inputted into a gain block 619 denoted by α*G. Gain block 619 is configured and operative to construct a diagonal square weighing matrix G, according to: $\tilde{G}=\mathrm{diag}(\alpha)$ whose number of rows is equal to the number of transmitters, and to output an output signal 622 that is communicated over a communication channel, denoted by a block 624. Block 614 in conjunction with Q block 618, permutation block 604, block 619, and perturbation vector 608 collectively constitute a precoder 620, denoted by P, which in turn is configured and operative to perform pseudo-inversion of a communication channel matrix H. In the general case, implementation 600 of the disclosed technique uses QR decomposition to determine a modified channel matrix equal to HG. In a particular case involving permutations (i.e., a permutation block 604 Π'), where the processor is further configured for permuting information symbol elements in the information symbol vector, per subcarrier frequency, where each information symbol element is associated with a particular one of the CPE units. The disclosed technique utilizes an inverse of matrix G for precoding, and in particular, for factorizing the communication channel matrix H according to (in the specific case utilizing permutations):

$$H=\Pi R^H Q^H \tilde{G}^{-1} \tag{60}$$

A signal 626 is a result from propagation through communication channel 624, received at the receiver side. A received signal 632 at the receiver side, represented by a vector r is the sum of signal 626 (y) with additive noise 628 (represented by a vector n), signifying that the precoded information symbols propagated through the communication channel includes additive 630 noise. Received signal 632 is inputted to a block 634 configured and operative to perform scaling by inverting the permuted diagonal vector $\mathbb{D}$ the output of which is denoted by an output signal 636. For NLP supporting CPE units, output signal 636 represents an input to a modulo operation block 638, which is configured and operative to apply modulo arithmetic operation to received signal 636, and to output an output signal 640 of estimated symbols, represented by a vector ŝ. For those CPE units whose supportability does not include NLP (i.e., LP group of users) output signal 636 is effectively output signal 640 (i.e., no modulo operation is applied).

Alternatively, $\tilde{G}$ consists of a combination of a variable gain factor with a common gain factor (to all CPE units). This may be expressed by: δ=α*η, where a scalar η represents a common gain factor and the vector α represents the variable gain factor (individual to each CPE unit). Thus, we may choose:

$$\tilde{G}=\mathrm{diag}(\delta) \tag{61}$$

The QR decomposition in such case is calculated via the modified channel as follows:

$$H\tilde{G}=\Pi R^H Q^H \tag{62}$$

i.e., $\Pi^H H\tilde{G}=R^H Q^H$, hence $(H\tilde{G})^H \Pi=QR$ and thus $\tilde{G}^H H^H \Pi=QR$. The introduced gains do not affect channel diagonalization. They represent additional degrees of freedom, which may be used for the performance optimization.

Figure 17A:
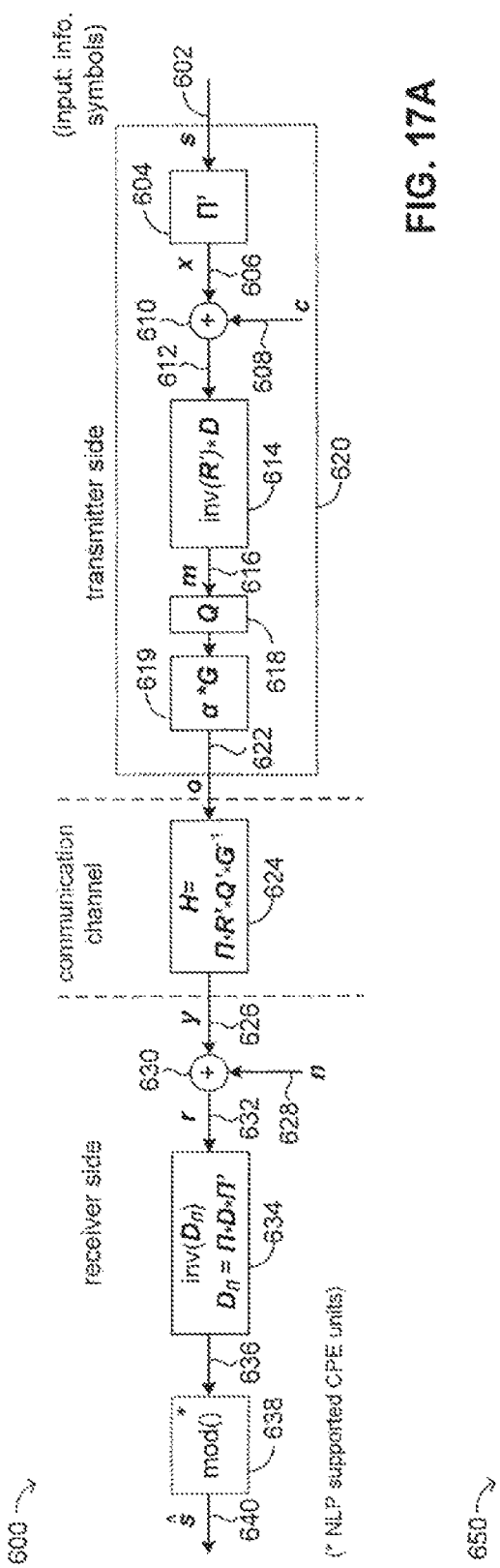
FIG. 17A is a schematic diagram illustrating an example of a specific implementation of the general hybrid-interoperability precoding scheme, utilizing different scalar factors, configured and operative in accordance with the disclosed technique.
Figure 17B:
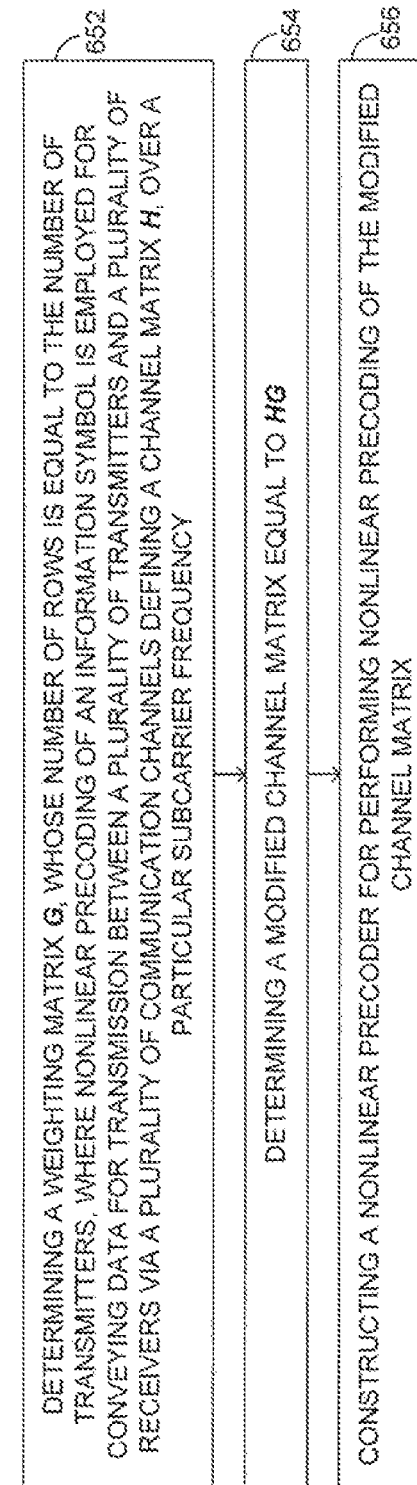
FIG. 17B is a schematic block diagram of a method for a specific implementation of nonlinear precoding utilizing different scalar factors, configured and operative in accordance with the disclosed technique.

Reference is now further made to FIG. 17B, which is a schematic block diagram of a method for a specific implementation of nonlinear precoding utilizing different scalar factors, generally referenced 650, configured and operative in accordance with the disclosed technique. Method 650 initiates with procedure 652. In procedure 652 a weighting matrix G, whose number of rows is equal to the number of transmitters is determined, where nonlinear precoding of an information symbol is employed for conveying data for transmission between a plurality of transmitters and a plurality of receivers via a plurality of communication channels defining a channel matrix H, over a particular subcarrier frequency. With reference to FIGS. 1 and 17A, processor 114 (FIG. 1) executes block 620 (FIG. 17A) by determining a weighting matrix G via block 619 (FIG. 17A).

In procedure 654, a modified channel matrix equal to HG is determined. With reference to FIGS. 1 and 17A, processor 114 (FIG. 1) executes block 620, specifically uses QR decomposition (blocks 614, Q block 618, and block 619) to determine a modified channel matrix equal to HG.

In procedure 656, a nonlinear precoder is constructed for performing nonlinear precoding of the modified channel matrix. With reference to FIGS. 1 and 17A, processor 114 (FIG. 1) executes block 620 by constructing a precoder via blocks 614, 618 and 619 (FIG. 17A).

Figure 18:
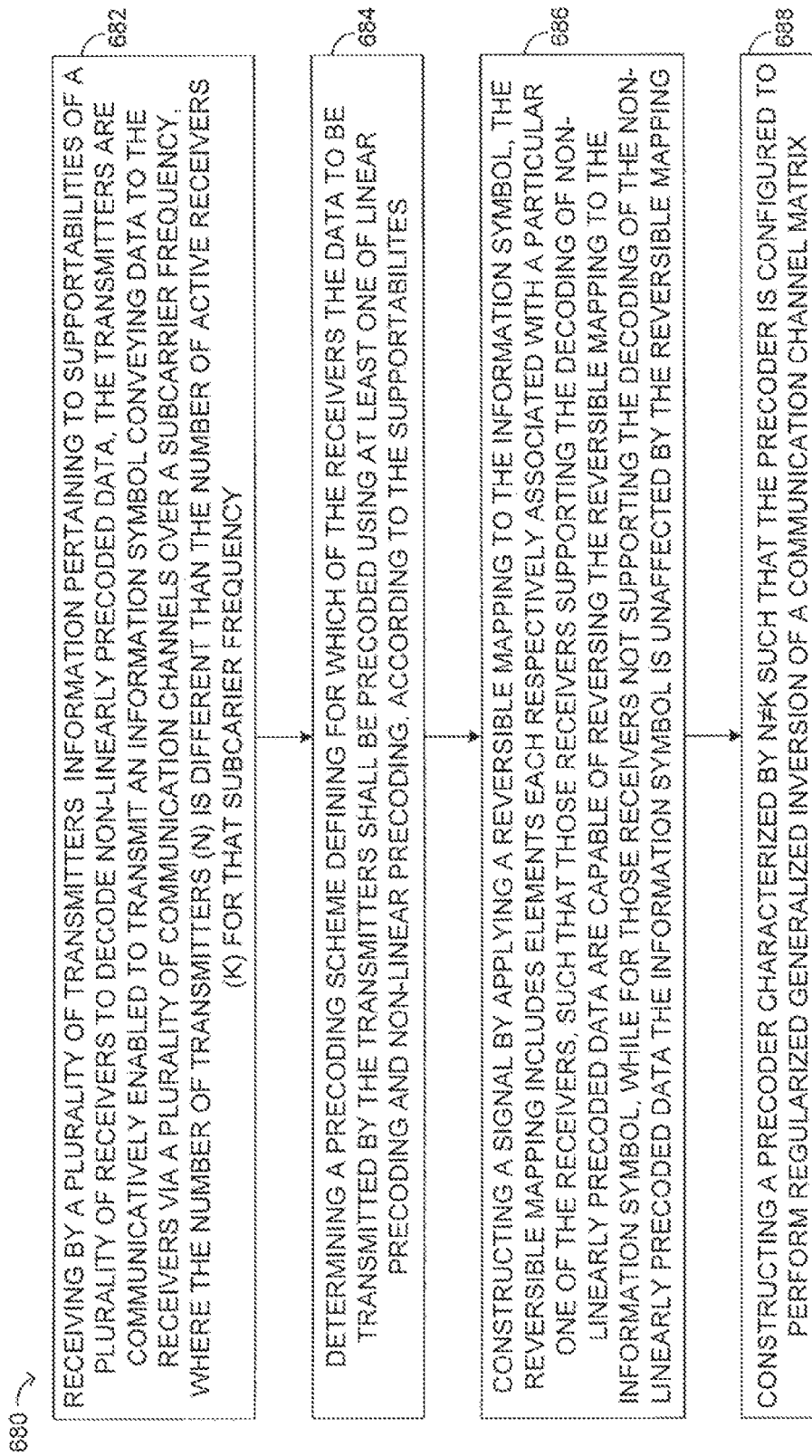
FIG. 18 is a schematic block diagram of a method for a hybrid-interoperability precoding scheme supporting both linear and nonlinear precoding, constructed and operative according to the embodiment of the disclosed technique.

Reference is now made to FIG. 18, which is a schematic block diagram of a method for a hybrid-interoperability precoding scheme supporting both linear and nonlinear precoding, generally referenced 680, constructed and operative according to the embodiment of the disclosed technique. Method 680 initiates with procedure 682. In procedure 682, information pertaining to supportabilities of a plurality of receivers to decode nonlinearly preceded data is received by a plurality of transmitters. The transmitters are communicatively enabled to transmit an information symbol conveying data to the receivers via a plurality of communication channels over a subcarrier frequency, where the number of transmitters (N) is different than the number of active receivers (K) for that subcarrier frequency. With reference to FIGS. 1 and 3A, DPU 104 (FIG. 1) (includes transceivers 116$_1$, 116$_2$, 116$_3$, . . . , 116$_{N-1}$, 116$_N$) acquires supportabilities 120$_1$, 120$_2$, 120$_3$, . . . , 120$_{N-1}$, 120$_N$ (to decode at least one type of precoded data: LP data, NLP data, or both) respectively from receivers 106$_1$, 106$_2$, 106$_3$, . . . , 106$_{N-1}$, 106$_N$ during initialization. DPU 104 (FIG. 1) including its transceivers 116$_1$, 116$_2$, 116$_3$, . . . , 116$_{N-1}$, 116$_N$ are communicatively enabled to transmit information symbol 160A (represented by vector o, FIG. 3A) conveying data to receivers 106$_1$, 106$_2$, 106$_3$, . . . , 106$_{N-1}$, 106$_N$ (FIG. 1) via respective communication channels 108$_1$, 108$_2$, 108$_3$, . . . , 108$_{N-1}$, 108$_N$ over a subcarrier frequency, where the number of transmitters is different than the number of active receivers for that subcarrier frequency. DPU 104 (FIG. 1) continually determines (e.g., via pings, via bi-directional messages, etc.) activity levels 122$_1$, 122$_2$, 122$_3$, . . . , 122$_{N-1}$, 122$_N$ (per tone) of each of CPE units 106$_1$, 106$_2$, 106$_3$, . . . , 106$_{N-1}$, 106$_N$.

In procedure 684, a precoding scheme defining for which of the receivers the data to be transmitted by the transmitters shall be precoded using at least one of linear precoding and non-linear precoding, according to the supportabilities is determined. With reference to FIGS. 1, 3A, 4, 5, and 15, processor 114 (FIG. 1) determines a precoding scheme that associates each information symbol element of an inputted symbol vector 152A (FIG. 3A), s, to either LP or NLP, according to supportabilities 120$_1$, 120$_2$, 120$_3$, . . . , 120$_{N-1}$, 120$_N$ (FIG. 1). In a particular implementation, permutation block 204 (FIG. 4) permutes information symbol elements in vector s into two successive aggregate groups (represented respectively by sub-vectors 254$_1$ and 254$_2$ in FIG. 5), namely, a first aggregate group of symbol elements s$_1$ (LP path 502 in FIG. 15) corresponding to the LP group of CPE units implementing LP, successively followed by a second aggregate group of symbol elements s$_2$ (NLP path 504, FIG. 15) corresponding to the NLP group of CPE units implementing NLP.

In procedure 686, a signal is constructed by applying a reversible mapping to the information symbol, where the reversible mapping includes elements each respectively associated with a particular one of the receivers, such that those receivers supporting the decoding of nonlinearly precoded data are capable of reversing the reversible mapping to the information symbol, while for those receivers not supporting the decoding of nonlinearly precoded data the information symbol is unaffected by the reversible mapping. With reference to FIGS. 1, 3A, 4, 5, 6, and 10, processor 114 (FIG. 1) constructs a signal 156A (FIG. 3A) by applying a reversible mapping 154A (FIG. 3), e.g., perturbation vector 208, c (FIG. 4) and 252 (FIG. 5) whose vector elements are defined by sub-vector 252$_1$ c$_1$: c$_1$(1), c$_1$(2), . . . , c$_1$(K$_1$), and further by vector elements defined by sub-vector 252$_2$, c$_2$: c$_2$(1), c$_2$(2), . . . , c$_1$(K$_2$) are each respectively associated with a particular one of CPE units 106$_1$, 106$_2$, 106$_3$, . . . , 106$_{N-1}$, 106$_N$ (FIG. 1) such that those receivers supporting the decoding of NLP data are capable of reversing the effect of the perturbation vector, while for those receivers not supporting the decoding of NLP data, the information symbol is unaffected by the reversible mapping, e.g., the perturbation sub-vector for that case: c$_1$=0 does not affect output signal 212 by adder 210 (FIG. 4). Preprocessing block 306 (FIGS. 6, 10) and particularly NLP/LP control mechanisms 374$_1$, 374$_2$, 374$_3$, 374$_4$, and 374$_5$ (FIG. 10) control application of reversible mapping 154A (FIG. 3) (e.g., a modulo-Z adder, a perturbation vector) according to respective supportabilities 120$_1$, 120$_2$, 120$_3$, . . . , 120$_{N-1}$, 120$_N$ (FIG. 1) of CPE units 106$_1$, 106$_2$, 106$_3$, . . . , 106$_{N-1}$, 106$_N$.

In procedure 688, a precoder characterized by N≠K is constructed, such that the precoder is configured to perform regularized generalized inversion of a communication channel matrix. With reference to FIGS. 1, 3A, and 4, processor 114 constructs a precoder 158A (FIG. 3), e.g., precoder 220 (FIG. 4) such that the precoder is configured to perform regularized inversion (e.g., equation (3B)) of a communication channel matrix 162A, H, (FIG. 3A) and 224 (FIG. 4).

The system and method of the disclosed technique combines linear and nonlinear precoding (precoders) and have the following advantages:

1. Providing a general solution to the interoperability problem between a data providing entity (e.g., a DPU having multiple transceivers) communicatively coupled with multiple data subscriber entities (e.g., CPE units) in a communication network, where part of the data subscriber entities do not support nonlinear precoding (NLP) while another part does. The general case is where the number of transmitters (N) (i.e., transceivers operating as transmitters in the DL direction) is not necessarily equal to the number of active receivers (K) (per tone) (i.e., transceivers operating as receivers in the DL direction). The general solution also includes the special case where N is equal to K. This enhances interoperability of the communication system in whole imparting it with the ability to operate with receivers of different types of supportabilities.

Using LP for raising bitrates of inferior communication channels (i.e., those enabling a relatively low number of bits per constellation (compared with superior communication channels enabling a relatively high number of bits per constellation)). It is known in the art that the standard THP scheme may exhibit large power gain loss as well as coding gain loss for small constellations (e.g., 1 or 2 bits, and moderate losses for 3 or 4 bits). For these constellations, the disclosed technique optionally employs optimized LP to avert the aforesaid losses. The optimization of LP is essential and controlled via diagonal gains D$_1$ as well as by the degrees of freedom conferred the permutations Π$_1$, since non-optimized LP introduces loses due to the use of power scaling per output. Optimization may generally achieve greater performance compared with simple scalar scaled ZF.

2. Facilitating a reduction in size of the NLP system (i.e., which effectively translates to the dimension of input vector s$_2$ which is defined to equal to the number of users undergoing or employing NLP), and in so doing, reducing the computational complexity required for determining the perturbation vector c$_2$. While size reduction may not pose a problem for systems employing the THP scheme, however, it may be an issue for schemes employing vector precoding. This may be of importance and interest since the determination of the perturbation vector may be computationally expensive. The exact complexity is difficult to quantify and has been estimated to be between polynomial to exponential on the order of the search space size. Hence, the reduction in size of the NLP system may be very desirable. To determine the perturbation vector, the disclosed technique may typically employ algorithms, which include, for example sphere decoding, the Blockwise Korkine Zolotarev (BKZ) algorithm, and the like.

According to another embodiment of the disclosed technique it is thus provided a method and a system for NLP where the modulus value is constellation-independent. In the prior art, NLP techniques utilize a modulus value that is constellation-dependent. The disclosed technique proposes a method and system for nonlinear precoding of an information symbol at a given precoder input, the information symbol is in a symbol space (i.e., a construct for representing different symbols, e.g., a constellation) having a given symbol space size (e.g., a constellation size). The nonlinear precoding involves modulo arithmetic and has a plurality of inputs. The method includes initially the step of determining a reference symbol space size, which is common to all inputs. Then, the method determines a modulus value according to the reference symbol space size. The method adapts the given symbol space size according to the reference symbol space size. The step of adapting involves scaling the given symbol space size to the boundaries of the reference symbol space size. Subsequently the method non-linearly precodes the information symbol according to the determined modulus value, common to all of the inputs. The disclosed technique further provides a system for nonlinear precoding of an information symbol at a given precoder input, where the information symbol is in a symbol space size having a given symbol space size. The nonlinear precoding involves modulo arithmetic and has a plurality of inputs. The system includes a controller and a processor. The controller is configured for determining a reference symbol space size that is common to all of the inputs, and for determining a modulus value according to the reference symbol space size. The processor is configured for adapting the given symbol space size according to the reference symbol space size, and for nonlinearly precoding the information symbol according to the determined modulus value common to all of the inputs.

The disclosed technique is implementable for various NLP techniques such as THP, including inflated lattice precoding techniques, which work with non-Gaussian interference and typically outperform THP for all SNR levels, including low SNRs.

In the traditional Tomlinson-Harashima precoding design, the modulo operation is defined per symbol space size (e.g., constellation size), and it is different for different symbol spaces (e.g., constellations). The modulo operation for user number k is denoted as $\Gamma_{\tau_k}[x]$, where $\Gamma_\tau[x]$ is (see e.g., Ginis and J. M. Cioffi, "A multi-user precoding scheme achieving crosstalk cancellation with applications to DSL systems," in *Proc. 34th Asilomar Conf. Signals, Systems, and Computers*, Pacific Grove, Calif., October 2000, pp. 1627-1631) denoted by:

$$\Gamma_\tau[x] = x - \tau\left\lfloor \frac{x}{\tau} + \frac{1}{2} \right\rfloor, \tag{63}$$

where $\lfloor \ldots \rfloor$ is the floor function, and for a real-valued x, whereas for complex values the modulo operation is performed separately for the real, Re(x), and imaginary, Im(x), parts [we denote the imaginary unit as j]:

$$\Gamma_\tau[x] = x - \tau\left\lfloor \frac{\text{Re}(x)}{\tau} + \frac{1}{2} \right\rfloor - j\tau\left\lfloor \frac{\text{Im}(x)}{\tau} + \frac{1}{2} \right\rfloor. \tag{64}$$

Figure 19:
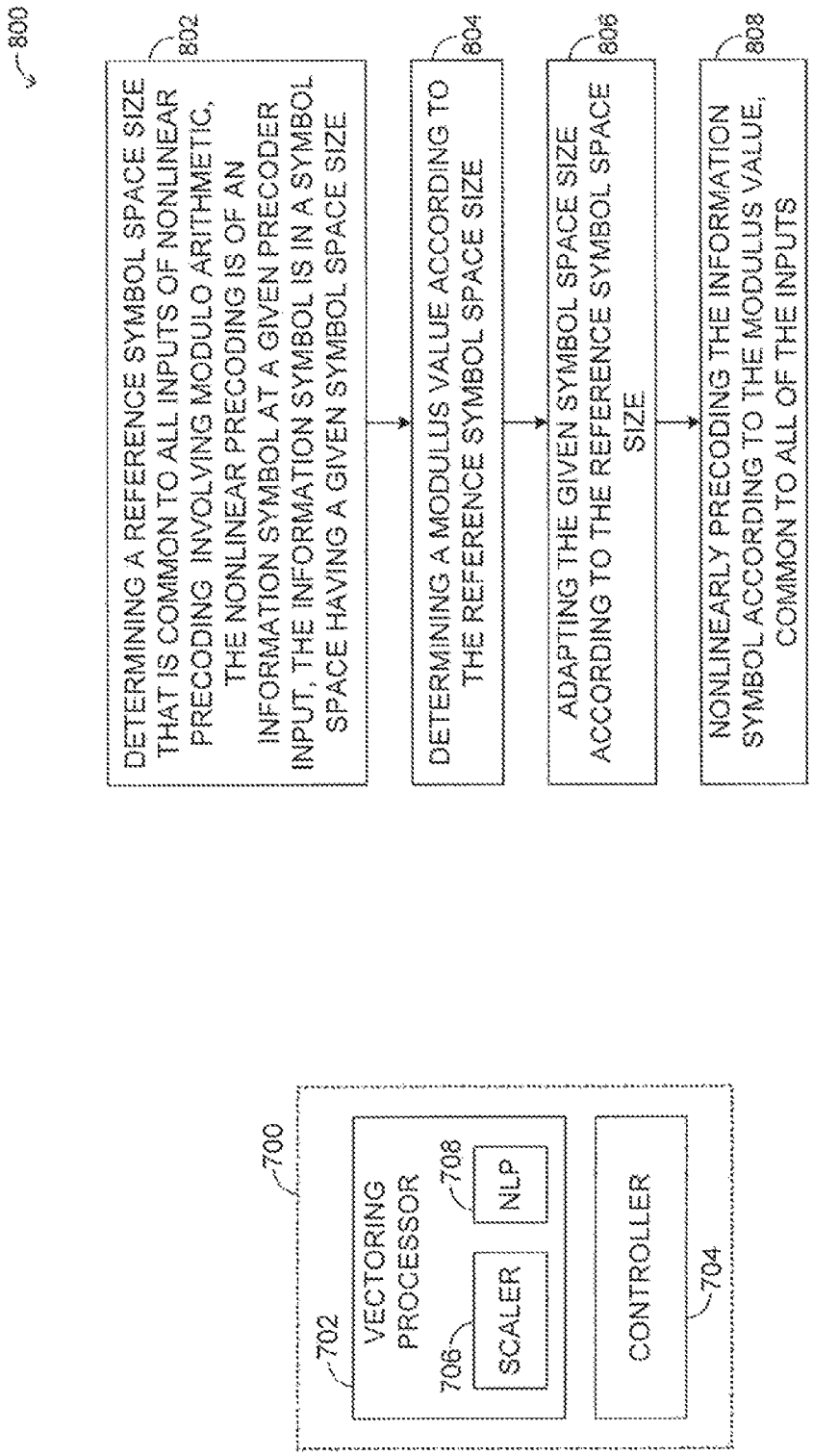
FIG. 19 is a schematic block diagram of a system for nonlinear precoding exhibiting a modulus size that is constellation-independent, constructed and operative in accordance with another embodiment of the disclosed technique.
Figure 20:
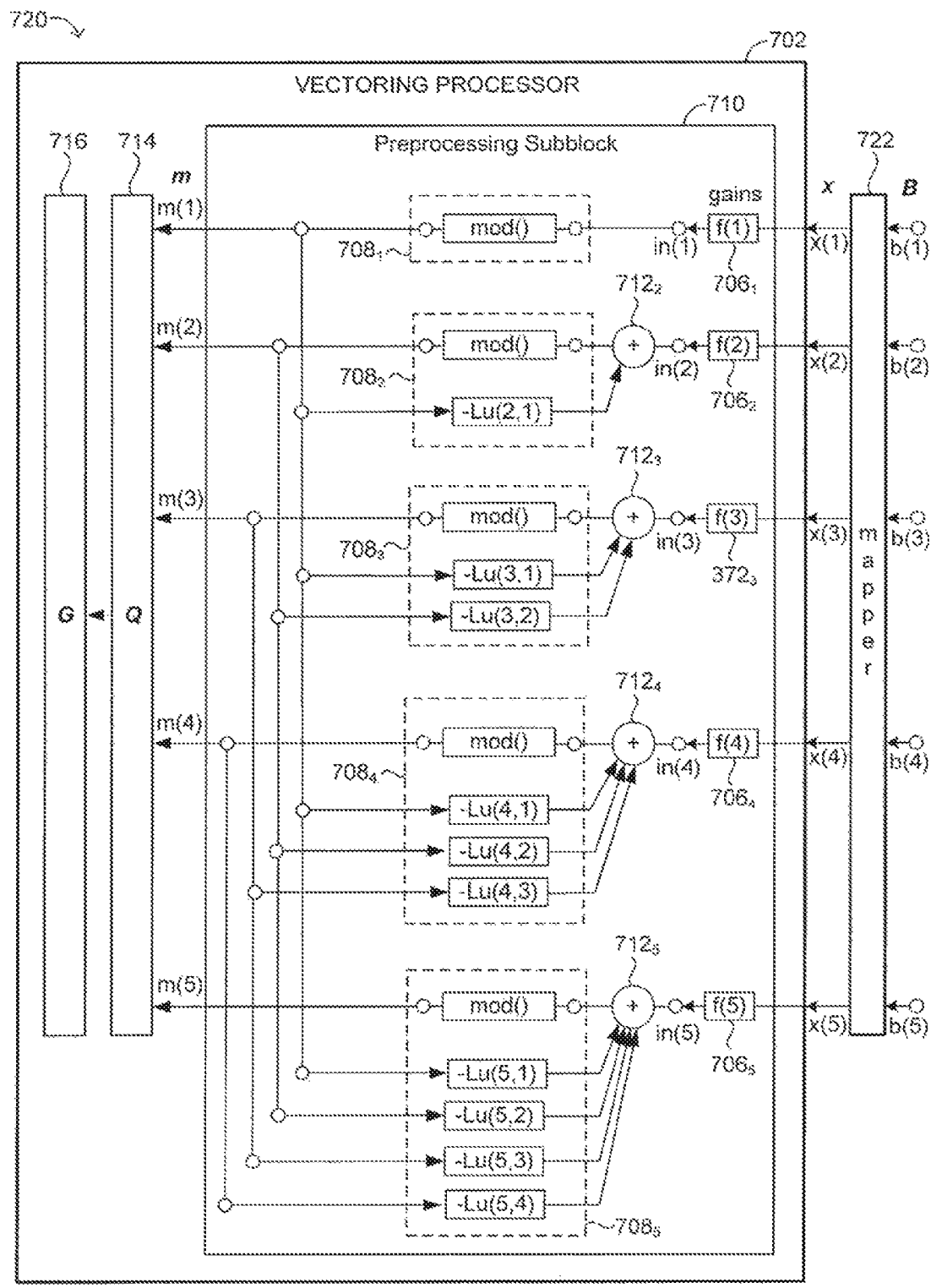
FIG. 20 is a schematic illustration detailing an example configuration of an internal structure of a vectoring processor in the system of FIG. 19, constructed and operative in accordance with an embodiment of FIG. 19 of the disclosed technique.
Figure 21:
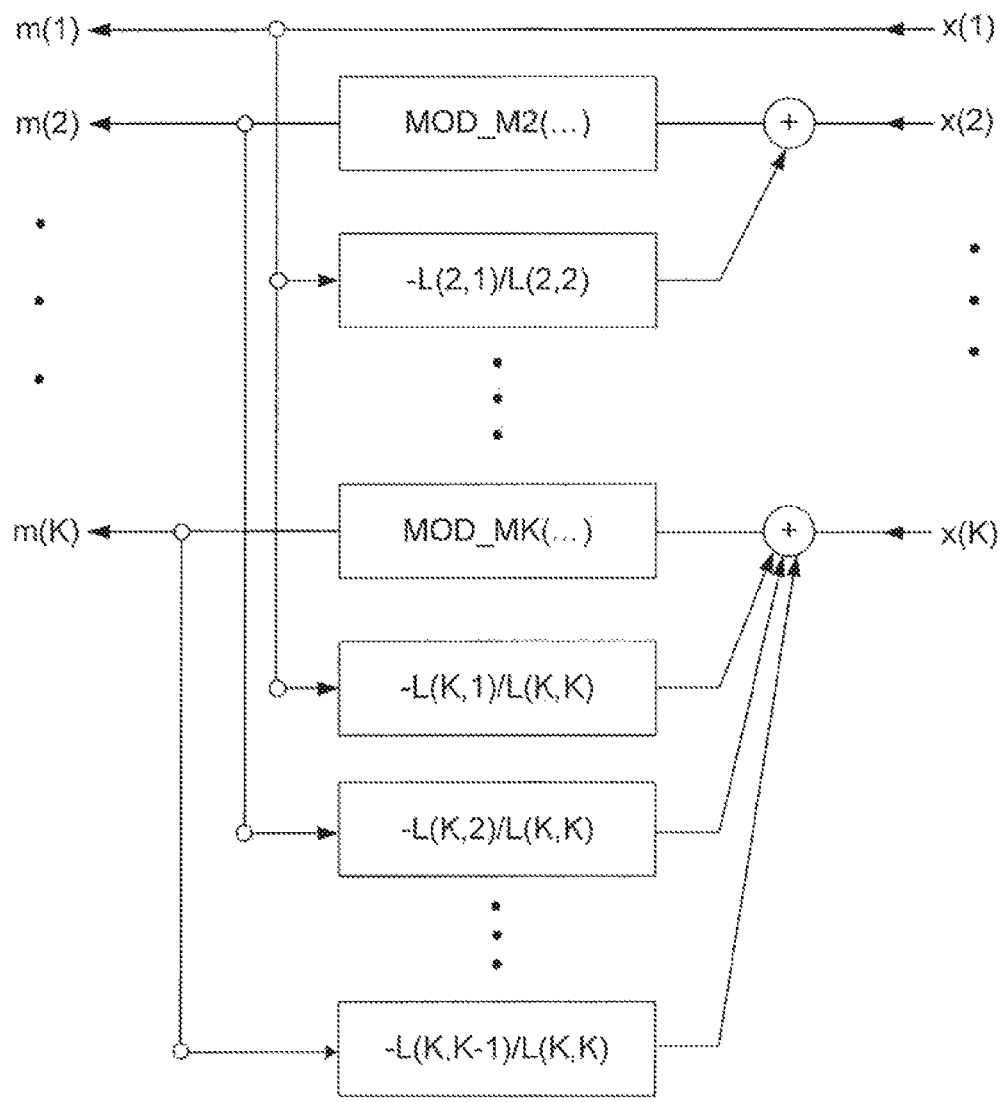
FIG. 21 is a schematic diagram of is a schematic illustration of Tomlinson-Harashima precoding used per subcarrier frequency being applied to chosen users only, constructed and operative in accordance with an embodiment of FIG. 19 of the disclosed technique.

Reference is now made to FIGS. 19, 20, and 21. FIG. 19 is a schematic block diagram of a system for nonlinear precoding exhibiting a modulus size that is constellation-independent, generally referenced 700, constructed and operative in accordance with another embodiment of the disclosed technique. FIG. 20 is a schematic illustration detailing an example configuration of an internal structure of a vectoring processor in the system of FIG. 19, generally referenced 720, constructed and operative in accordance with an embodiment of FIG. 19 of the disclosed technique. FIG. 21 is a schematic diagram of Tomlinson-Harashima precoding used per subcarrier frequency being applied to chosen users only, generally referenced 730, constructed and operative in accordance with an embodiment of FIG. 19 of the disclosed technique. System 700 (FIG. 19) includes a vectoring processor 702 (herein denoted interchangeably "processor") and a controller 704. Vectoring processor 702 includes a scaler 706 and a nonlinear precoder (NLP) 708. Controller 704 is typically implemented by a physical layer (PHY) controller of a DPU (e.g., DPU 104 of FIG. 1).

FIG. 20 shows an internal structure of vectoring processor 702 of system 700 including a mapper 722 coupled with vectoring processor 702. Vectoring processor 702 includes a preprocessing subblock 710, which in turn includes scaler 706, NLP 708, a plurality of adders $712_2$, $712_3$, $712_4$, $712_4$, a Q block 714, and a G block 716. Without loss of generality and for the purposes of simplicity, the internal structure of vectoring processor 702 in FIG. 20 shows an implementation in the 5-user example, although the principles analogously extended and apply in the general case for N users. Scaler 706 includes a plurality of gain blocks $706_1$, $706_2$, $706_3$, $706_4$, and $706_5$. NLP 708 includes a plurality of modular arithmetic calculation units $708_1$, $708_2$, $708_3$, $708_4$, and $708_5$.

Information bits B={(b(1), b(2), b(3), b(4), b(5)}(interchangeably denoted "data bits") are inputted into mapper 722, which is configured and operative to map the information bits (bit streams) into respective information symbols x={x(1), x(2), x(3), x(4), x(5)}, which in turn are inputted into vectoring processor 702. Specifically, the information symbols are correspondingly inputted into individual gain blocks $706_1$, $706_2$, $706_3$, $706_4$, and $706_5$ of preprocessing subblock 710 of vectoring processor 702. The gain blocks are configured and operative to apply respective gain components f(1), f(2), f(3), f(4), and f(5) of gain a vector f to the corresponding information symbols (i.e., index-wise) the outputs of which are inputted to adders $712_2$, $712_3$, $712_4$, $712_4$ (except for an output of gain block $706_1$ that is directly provided into modular arithmetic calculation unit $708_1$). Each adder $712_2$, $712_3$, $712_4$, $712_4$ can be respectively viewed as a part of a respective modular arithmetic calculation unit $708_2$, $708_3$, $708_4$, and $708_5$. Modular arithmetic calculation units $708_1$, $708_2$, $708_3$, $708_4$, and $708_5$ are generally configured and operative to facilitate construction of the diagonal matrix $L_U$ in a recursively manner according to:

$$L_U(k, n) = \frac{L(k, n)}{L(k, k)}.$$

FIG. 21 illustrates a schematic diagram of Tomlinson-Harashima precoding (THP), employing recursive calculations (of matrix $L_U$) used per subcarrier frequency being applied to chosen users only, constructed and operative in accordance with an embodiment of FIG. 19 of the disclosed technique.

The disclosed technique formulates a way to set the modulo value that is employed in THP to be independent on the symbol space size (constellation size). In the prior art, and in particular with the Tomlinson-Harashima precoder, the modulo value is dependent on a symbol space size (e.g., the constellation size). FIG. 21 shows information symbols x(1), x(2), . . . , x(K) (or permuted information symbols) are inputted to the precoder having a plurality of inputs. K is the number of the active users. FIG. 21 shows the recursive NLP procedure for a more general case of K active users (in comparison with the more specific 5-user example shown in FIG. 20). The modulo sizes, which are denoted in FIG. 21 as M2, . . . , MK (i.e., M2≡$\tau_2$, . . . , MK≡$\tau_K$) depend in the prior art on the constellation size of the input symbols. L is a lower-diagonal matrix (equal to $R^H$, where R is the upper-diagonal matrix obtained by QR decomposition of the permuted channel, i.e., $H^H\Pi$=QR (see description hereinabove)). The number of the NLP users is designated $K_2$. The modulo value may be selected to be symbol space (constellation) dependent (as known in the prior art), or alternatively, symbol space (constellation) independent, as proposed by the disclosed technique, the particulars of which follow. For a mixture of linear and nonlinear precoders acting on the same subcarrier frequency, inputs x(k), represent an "impure" information symbol (optionally permuted) having an offset that takes into account the influence of the other users processed in previous step(s) via the linear precoder. This offset, as disclosed, need not be processed sequentially by processor 702, is determined at a processing stage of NLP 708. This facilitates a reduction in the burden of real-time performance since fewer operations are needed to be executed for real-time implementations.

A customary modulus value is $\tau=Md_{min}$ for pulse amplitude modulation (PAM) and $\tau=\sqrt{M}d_{min}$ for a two-dimensional (2-D) square symbol space (constellations) of digital quadrature amplitude modulation (QAM), where $d_{min}$ is the quantized symbol position (constellation point) spacing. See for example G. Ginis and J. M. Cioffi, "A multi-user precoding scheme achieving crosstalk cancellation with applications to DSL systems," in *Proc. 34th Asilomar Conf. Signals, Systems, and Computers*, Pacific Grove, Calif., October 2000, pp. 1627-1631, and the discussion for square constellations. For 4-QAM the modulus value is $\tau=2d_{min}$ (due to $\sqrt{4}$=2), and for 16-QAM the modulus value is $\tau=4d_{min}$ (while the symbol positions (constellation points) in the symbol space are traditionally located at integer positions ($n_1$, $n_2$) taking independently the values {−3,−1,1,3}). Other, non-integer even values, are different for different symbol space sizes (constellation sizes), where $d_{min}$ (i.e., a symbol position spacing for a symbol space).

The average energy, $\overline{E}$ (or <E>) in M-QAM, where M is the number of symbol positions (e.g., constellation points) in the symbol space (e.g., constellation) and is square (i.e., for square symbol spaces (constellations)) is given by: $\overline{E}$=(M−1)$d_{min}^2$/6, thus the average energy for 4-QAM with constellation points ±1±j, where M=4 (points) and $d_{min}$=2 is:

$$(4-1)*\frac{2^2}{6} = 3*\frac{4}{6} = 2.$$

and the constellation square boundary is at 2 (and hence the initial modulo value is 4). The average energy for a symbol space size (constellation) having M-symbol positions (constellation points) is given by:

$$\overline{E} = \frac{1}{M}\sum_{m=1}^{M}|z_m|^2 = \frac{1}{M}\sum_{m=1}^{M}(x_m^2 + y_m^2), \quad (65)$$

where the m-th constellation point is expressed as $z_m$=$x_m$+$jy_m$ and $x_m$ and $y_m$ are respectively real and imaginary coordinate values in the complex plane. For 16-QAM, the average energy for we obtain:

$$\overline{E} = \frac{4}{16}\sum_{m=1}^{4}(x_m^2 + y_m^2) = \frac{1}{4}\{2+10+10+18\} = 10. \quad (66)$$

Figure 22A:
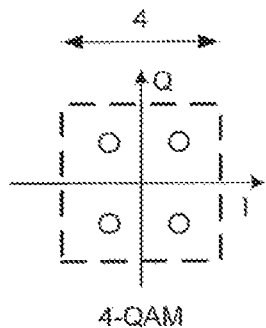
FIG. 22A is a schematic diagram showing an example of a non-scaled 4-QAM constellation, constructed and operative in accordance with the disclosed technique.

Reference is now further made to FIG. 22A, which is a schematic diagram showing an example of a non-scaled 4-QAM constellation diagram, generally referenced 740, constructed and operative in accordance with the disclosed technique. Particularly, FIG. 22A (as well as with FIGS. 22C, and 22D) illustrates a scatter diagram of symbols (dots) distributed in quantized symbol positions (constellation points) in a symbol space (constellation) that is represented on a complex plane having a real axis I-axis ("in phase") and an imaginary axis Q-axis ("quadrature"). The square-shaped dotted lines represents a boundary (or frame) of the symbol space. A symbol space size is defined by its boundary. The symbol space size (constellation size) is scaled by the root of the average energy, which yield:

$$\tau_{4-QAM} = \frac{4}{\sqrt{2}} = 2\sqrt{2}.$$

For 64-QAM it is readily observed that the average energy is equal to 10 and the initial modulo size is 8. Scaling of the initial modulus value by the root of the average energy yields $$\tau_{16QAM} = \frac{8}{\sqrt{10}}.$$

Thus, unit energy scaling produces closed but different modulus values for every symbol space (constellation) which are mutually exclusive $$\left(i.e., \text{they may include irrational numbers, such as: } \frac{(2\sqrt{2})}{\left(\frac{8}{\sqrt{10}}\right)} = \frac{\sqrt{5}}{2}\right).$$

It is noted that if one approximates the symbol space (constellation) square with a large number of uniformly distributed integer symbol positions (constellation points), then the modulo value of the symbol space (constellation) with unit average energy would equal $\tau=\sqrt{6}$ (i.e., for M-QAM the un-scaled $\tau_{unscaled}=\sqrt{M}d_{min}$ and after rescaling $\tau$ with $\sqrt{\overline{E}}$ we obtain:

$$\tau = \frac{\tau_{unscaled}}{\sqrt{\overline{E}}} = \frac{\sqrt{M}\,d_{min}}{\sqrt{\frac{(M-1)d_{min}^2}{6}}} = \sqrt{\frac{M}{M-1}} \cdot \sqrt{6}.$$

Figure 22B:
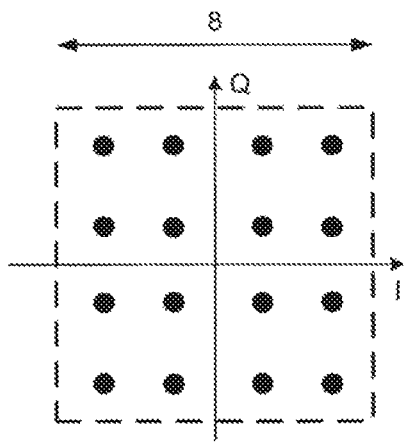
FIG. 22B is a schematic diagram showing an example of non-scaled 16-QAM constellation.
Figure 22C:
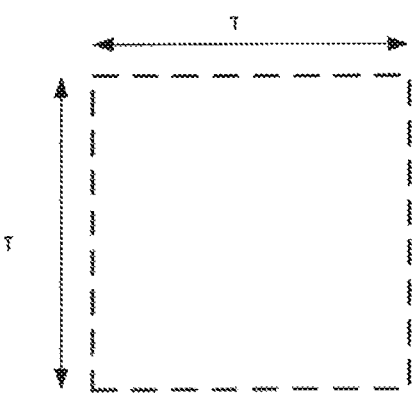
FIG. 22C is a schematic illustration showing a boundary of a modulo operation representing a square of size $\tau$.
Figure 22D:
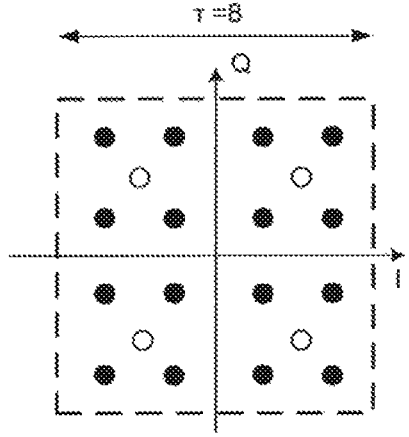
FIG. 22D is a schematic diagram showing an example of $\tau = 8 = 2^3$ chosen as a constant modulo for all constellations.

For large M we obtain $\tau \rightarrow \sqrt{6}$). For finite and especially small values for M the scaled modulus value is symbol space size (constellation size) M-dependent, (i.e., consequently depending on $d_{min}$). Such moduli are a costly operation and they may be made much less costly as discussed hereinbelow. Reference is now further made to FIGS. 22B and 22C. FIG. 22B is a schematic diagram showing an example of non-scaled 16-QAM symbol space (constellation), generally referenced 742. FIG. 22C is a schematic illustration showing a boundary or frame of a modulo operation representing a square of size τ, generally referenced 744. This frame corresponds to a reference symbol space size. Controller 704 (FIG. 19) is configured and operative to determine this reference symbol space size that is common to all inputs x(1), x(2), . . . , x(K) of the NLP 720 (FIGS. 20 and 21). The initial modulus value equals 8. Controller 704 is configured and operative to further determine a modulus value according to the determined reference symbol space size.

According to a typical implementation, controller 704 determines the reference symbol space size that is a maximum symbol space size thereby enabling the transmission of a maximum number of bits per information symbol. Vectoring processor 702 and particularly scaler 706 (FIG. 19), having individual gain blocks $706_1$, $706_2$, $706_3$, $706_4$, and $706_5$, is configured and operative to adapt (e.g., scale) the given symbol space size according to the determined modulus value. The process of adapting of involves scaling of symbol positions (constellation points) in the symbol space according to the reference symbol space size. The reference symbol space size can be selected to be numerically equal to $2\sqrt{M}$, where M is a maximal number of symbol positions (constellation points) in the symbol space. The modulus value can be selected to be numerically equal to said reference symbol space size.

NLP 708 (FIG. 19), having individual modular arithmetic calculation units $708_1$, $708_2$, $708_3$, $708_4$, and $708_5$ (FIG. 20) is configured and operative to nonlinearly precode inputted information symbol x(1), x(2), . . . , x(K) (FIG. 21) according to the determined modulus value that is common to all of the inputs of NLP 708.

Q block 714 is configured to perform QR decomposition the result of which is inputted into G block 716. G block 716 is a gain scaling block configured and operative to apply gain scaling and to output signals (not shown) that are communicated over a communication channel (e.g., $108_1$, . . . , $108_N$, FIG. 1). G block 716 is typically used for gain scaling (e.g., power normalization) so to apply the same gain to all outputs. Alternatively, G block 716, which can be represented by a vector G, has vector elements that can be different for each output, for applying different gain scaling to different outputs. G block 716 is dependent on the number of lines L.

The system and method of disclosed technique uses of same modulus value for any symbol space size (constellation size). This serves several purposes:
 1. It scales all constellations automatically to the same power. This follows from known observations that THP transmission results in homogeneous distribution of points over the whole constellation area (see short discussion of this in, e.g., Ginis and J. M. Cioffi, "A multi-user precoding scheme achieving crosstalk cancellation with applications to DSL systems," in *Proc. 34th Asilomar Conf. Signals, Systems, and Computers*, Pacific Grove, Calif., October 2000, pp. 1627-1631). It is stressed that the constraint of the average energy of the constellation points equaling one is a mathematical statement but not directly related to the actual transmitted energy of the THP per output. This is a typical scaling employed in digital communications. The constellation square size (for QAM modulation) determines the average energy per THP communication channel (e.g., line, antenna) output. If all squares are designed to be of the same size, the average power consumption will be the same. The constellation points inside of this square are determined from the standard requirement that the minimal distance from a constellation point to the square border is equal to half of the minimal distance between constellation points. For example, if the modulo value is chosen to be $2^7=2*64=128$, then for the traditional points of 16-QAM which are $n_1+jn_2$ with $n_1, n_2 \in \{-3,-1,1,3\}$ and the square boundary placed at coordinates ±4 so that the modulus is 2*4=8 along the real and imaginary axes, therefore the are scaling factor is $$\left(\frac{128}{8}\right)=16.$$

Hence, the new locations of the 16-QAM constellation points are at $n_1+jn_2$ with $n_1$, $n_2 \in \{-3\cdot16, -16\cdot1, 16\cdot1, 3\cdot16\}=\{-48, -16, 16, 48\}$. Note, that multiplication by 16 may be achieved efficiently just as a shift by 4 binary positions. The above chosen modulo example namely τ=128 is convenient for constellations up to 4096-QAM (i.e., representing 12-bits, since $2^{12}=4096$), which can be validated via the above-mentioned general relation $\tau=2\sqrt{M}=2\sqrt{2^{12}}=2*2^6=128$); the points of this constellation, denoted as $n_1+jn_2$, are integers $n_1,n_2 \in \{-63, -61, \ldots, -1, 1, \ldots, 61, 63\}$. If a 14-bit constellation is to be included a modulus value of: $2\cdot\sqrt{2^{14}}=2^8=256$ is proposed. The 12 and 14-bit constellations mentioned above are given as examples. These are the current maximum constellation sizes in the current G.fast standard. In another example, for a modulo value of 8, symbol positions (constellation points) for 16-QAM (are not needed to be scaled) and 4-QAM (which needs to be scaled by factor of 2, is again effectively represented by a shift), with reference now being made to FIG. 22D, which is a schematic diagram showing an example of $\tau=8=2^3$ chosen as a constant modulo for all constellations, generally referenced 746. Such constellations are 16-QAM designated by black points in FIG. 22D, which is not scaled, since it is in its natural size, and the 4-QAM designated by white points/rings. The 4-QAM is scaled by factor of 2 (where the scaling is applied via a shift and there's no need in multiplication). Specifically, for modulo values of 2, processor 702 performs the modulus operation for binary represented values in a very efficient form (e.g., shift operations that do not require use of multiplication operations or associated hardware). The modulus operation performed on complex numbers (representing constellation points), which are outside of the constellation square scales these constellation points into the constellation square. The scaling of constellations to the unit energy is performed by using a scalar gain factor α. For an illustrative example, if τ=128, which corresponds to the maximum number of bits in the constellation of 12-bits, then $\alpha=\sqrt{6}/128$ performs the desired scaling to the unit energy. Similarly, when the maximum number of bits in the constellation is 14, we obtain $\tau=2*\sqrt{2^{14}}=256$ then $\alpha=\sqrt{6}/256$. As an option, the precoder matrix L may incorporate α as a part or the whole.
 2. It simplifies the system since there's no need to take into account the symbol space size (constellation size) for performing modulo operation in decoding and encoding operations. Having the same modulus value for all symbol spaces makes these operations independent from applied permutations, which would otherwise have to be taken into account.

3. It simplifies hardware implementations. For example, if the modulo has a degree of 2: $\tau=2^p$ (where the degree p is a positive integer), the divisions in the above moduli relations may be re-substituted for hardware efficient shift operations. Further hardware specific simplifications, may involve mask techniques.

4. The proposed modulo operation is both applied at the centralized transmission unit (DPU 104, FIG. 1) performing the broadcast (i.e. performing the downlink transmission) as well as at the receivers (CPE units 106$_1$, 106$_2$, 106$_3$, . . . , 106$_{N-1}$, 106$_N$, FIG. 1). The constellations for the NLP group of users and optionally the LP group of users are scaled to the same size and then the same modulo (e.g., $\tau=256$) is applied at the transmitter side (DPU unit) for the NLP group of users. At the receiver side, the NLP group of users employs the same modulo size for any constellation.

5. This implementation is more general than the transmission to the decentralized receivers and it may be used in any up-link or down-link (or both) for virtually any MIMO system that employs the THP (and vector precoding) performing modulo operations at both receiver and transmitter sides.

Note that while "conventional" modulo arithmetic operation may be performed according to $d_{min}*\sqrt{M}$, the system of method of the disclosed technique typically select to perform this operation according to $2\sqrt{M_{max}}$ where $M_{max}$ represents the maximal number of symbol positions M for a modulation scheme (e.g., M-ary QAM) of a communication standard (e.g., 12 or 14 for G.fast).

Reference is now made to FIG. 23, which is a schematic block diagram of a method for nonlinear precoding where the modulus size is constellation-independent, generally referenced 800, constructed and operative in accordance with the embodiment of FIG. 19 of the disclosed technique. Method 800 initiates in procedure 802. In procedure 802 a reference symbol space size that is common to all inputs of nonlinear precoding involving modulo arithmetic is determined. The nonlinear precoding is of an information symbol at a given precoder input, the information symbol is in a symbol space having a given symbol space size. With reference to FIGS. 19, 20, 21, and 22C, controller 704 (FIG. 19) determines a reference symbol space size 744 that is common to all inputs $x(1), x(2), \ldots, x(K)$ (FIGS. 20, and 21) of NLP 708 (FIGS. 19 and 20) and NLP 720 (FIGS. 20 and 21) involving modulo arithmetic (shown by recursive calculation blocks in FIGS. 20 and 21). The information symbol is in a symbol space (e.g., FIGS. 22A, 22B, 22D) having a given symbol space size 744 (FIG. 22C) (constellation size $\tau$).

In procedure 804 a modulus value is determined according to the reference symbol space size). With reference to FIGS. 19 and 22B, controller 704 (FIG. 19) determines a modulus value according to reference symbol space size $\tau$ 744 (FIG. 22C).

In procedure 806, the given symbol space size is adapted according to the reference symbol space size. With reference to FIGS. 19, 20, 21C, and 22D, scaler 706 (FIGS. 19 and 20) adapts (e.g., scales) the given symbol space size according to the determined reference symbol space size in procedure 802. The determined modulus value for all symbol spaces (constellations) is depicted by 746 in FIG. 22D.

In procedure 808, the information symbol is nonlinearly precoded according to the modulus value that is common to all of the inputs. With reference to FIGS. 19, 20, and 21, NLP 708 (FIGS. 19 and 20) and NLP 720 (FIGS. 20 and 21) nonlinearly precode the information symbol (i.e., for each of the inputted information symbols $x(1), x(2), \ldots, x(K)$) according to the determined modulus value that is common to all of the inputs.

System 700 and method 800 are configured and operative for utilization in a multiple-user multiple-input-multiple-output (MIMO) matrix channel environment, employing NLP, for normalizing the given symbol space size according to the determined modulus symbol space size (i.e., fundamentally, based on the boundary and not on energy considerations).

It will be appreciated by persons skilled in the art that the disclosed technique is not limited to what has been particularly shown and described hereinabove. Rather the scope of the disclosed technique is defined only by the claims, which follow.

The invention claimed is:

1. A method for precoding an information symbol conveying data for transmission between a plurality of transmitters and a plurality of active receivers via a plurality of communication channels over a subcarrier frequency, the number of transmitters (N) is different than the number of active receivers (K) for that subcarrier frequency, the method comprising:

receiving by said transmitters information pertaining to supportabilities of said receivers to decode non-linearly precoded data;

determining a precoding scheme defining for which of said receivers said data to be transmitted by said transmitters shall be precoded using at least one of linear precoding and non-linear precoding, according to said supportabilities;

constructing a signal by applying a reversible mapping to said information symbol, said reversible mapping includes elements each respectively associated with a particular one of said receivers, such that those said receivers supporting the decoding of said non-linearly precoded data are capable of reversing said reversible mapping to said information symbol, while for those said receivers not supporting the decoding of said non-linearly precoded data said information symbol is unaffected by said reversible mapping;

constructing a precoder characterized by N≠K such that said precoder is configured to perform regularized generalized inversion of a communication channel matrix.

2. The method according to claim 1, further comprising determining which of said receivers constitutes an active receiver per said subcarrier frequency, wherein each said active receiver is characterized by an activity level defined by one of:

(a) is switched on and ready to receive said data at a particular said subcarrier frequency;

(b) is switched on and is in a process of receiving said data at a particular said subcarrier frequency;

(c) is either one of (a) and (b) but not for other said subcarrier frequency; and (d) is either one of (a), (b), and (c) stipulated by a decision rule determined by at least one criterion related to communication performance.

3. The method according to claim 1, wherein said communication channels facilitate propagation of said signal, and are selected from a list consisting of: wire-lines; and antennas in wireless techniques.

4. The method according to claim 1, wherein said supportabilities further include capability for decoding linearly precoded data.

5. The method according to claim 1, wherein said reversible mapping is a perturbation vector, where said elements in said perturbation vector associated with said receivers not supporting the decoding of said nonlinearly precoded are zero, and said perturbation vector includes at least one nonzero element associated with respective at least one said receivers supporting the decoding of said nonlinearly precoded data.

6. The method according to claim 1, further comprising precoding according to constructed said precoder; and transmitting said signal by said transmitters via said communication channels.

7. The method according to claim 1, further comprising reversing said reversible mapping by said receivers supporting the decoding of said nonlinearly precoded data.

8. The method according to claim 7, wherein said reversing of said reversible mapping is performed by modulo arithmetic.

9. The method according to claim 1, further comprising permuting information symbol elements in said information symbol per said subcarrier frequency, each information symbol element is associated with a particular one of said receivers.

10. The method according to claim 9, wherein said permuting involves grouping said information symbol elements into distinct and successive aggregate groups according to said supportabilities of respective said receivers, wherein said distinct and successive aggregate groups include a linear precoding (LP) group not supporting the decoding of said nonlinear precoded data, and a nonlinear precoding (NLP) group supporting the decoding of said nonlinear precoded data.

11. A hybrid precoder system for precoding an information symbol conveying data for transmission between a plurality of transmitters and a plurality of active receivers via a plurality of communication channels over a subcarrier frequency, the number of transmitters (N) is different than the number of active receivers (K) for that subcarrier frequency, the hybrid precoder system comprising:
a controller configured for receiving information pertaining to supportabilities of said receivers to decode non-linearly precoded data, and for determining a precoding scheme defining for which of said receivers said data to be transmitted by said transmitters shall be precoded using at least one of linear precoding and non-linear precoding, according to said supportabilities; and
a processor configured for constructing a signal for transmission, according to determined said precoding scheme, by applying a reversible mapping to said information symbol, said reversible mapping includes elements each respectively associated with a particular one of said receivers, such that those said receivers supporting the decoding of said non-linearly precoded data are capable of reversing said reversible mapping to said information symbol, while for those said receivers not supporting the decoding of said non-linearly precoded data said information symbol is unaffected by said reversible mapping, said processor constructing a precoder characterized by $N \neq K$ such that said precoder is configured to perform regularized generalized inversion of a communication channel matrix.

12. The system according to claim 11, wherein said controller is further configured for determining which of said receivers constitutes an active receiver per said subcarrier frequency, wherein each said active receiver is characterized by an activity level defined by one of:
(a) is switched on and ready to receive said data at a particular said subcarrier frequency;
(b) is switched on and is in a process of receiving said data at a particular said subcarrier frequency;
(c) is either one of (a) and (b) but not for other said subcarrier frequency; and
(d) is either one of (a), (b), and (c) stipulated by a decision rule determined by at least one criterion related to communication performance.

13. The system according to claim 11, wherein said communication channels are configured to facilitate propagation of said signal, and are selected from a list consisting of: wire-lines; and antennas in wireless techniques.

14. The system according to claim 11, wherein said supportabilities further include capability for decoding linearly precoded data.

15. The system according to claim 11, wherein said reversible mapping is a perturbation vector, where said elements in said perturbation vector associated with said receivers not supporting the decoding of said nonlinearly precoded are zero, and said perturbation vector includes at least one nonzero element associated with respective at least one said receivers supporting the decoding of said nonlinearly precoded data.

16. The system according to claim 11, wherein said system is configured to precode constructed said precoder; and to transmit said signal to said receivers via said communication channels.

17. The system according to claim 11, wherein said receivers supporting the decoding of said nonlinearly precoded data are configured for reversing said reversible mapping.

18. The system according to claim 17, wherein said receivers are configured to employ modulo arithmetic for said reversing said reversible mapping.

19. The system according to claim 16, wherein said processor is further configured for permuting information symbol elements in said information symbol per said subcarrier frequency, each information symbol element is associated with a particular one of said receivers.

20. The system according to claim 19, wherein said permuting involves grouping said information symbol elements into distinct and successive aggregate groups according to said supportabilities of respective said receivers, wherein said distinct and successive aggregate groups include a linear precoding (LP) group not supporting the decoding of said nonlinear precoded data, and a nonlinear precoding (NLP) group supporting the decoding of said nonlinear precoded data.

* * * * *